United States Patent
Harada

(10) Patent No.: US 8,527,890 B2
(45) Date of Patent: Sep. 3, 2013

(54) FILE MANAGEMENT APPARATUS, FILE MANAGEMENT METHOD, AND COMPUTER PROGRAM PRODUCT

(75) Inventor: Takaaki Harada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 542 days.

(21) Appl. No.: 12/632,242

(22) Filed: Dec. 7, 2009

(65) Prior Publication Data

US 2010/0146450 A1    Jun. 10, 2010

(30) Foreign Application Priority Data

Dec. 9, 2008    (JP) ................................ 2008-313761

(51) Int. Cl.
*G06F 3/048* (2013.01)

(52) U.S. Cl.
USPC .......... 715/764; 715/810; 715/835; 715/836; 715/838; 715/850; 715/852; 715/853; 715/854; 715/855; 707/821; 707/828; 707/829; 707/830; 707/831

(58) Field of Classification Search
USPC ......... 707/821, 828, 829, 830, 831; 715/764, 715/810, 835, 836, 838, 848, 850, 852, 853, 715/854, 855
See application file for complete search history.

(56) References Cited

U.S. PATENT DOCUMENTS

| | | | |
|---|---|---|---|
| 2004/0109031 A1* | 6/2004 | Deaton et al. | 345/848 |
| 2004/0193621 A1* | 9/2004 | Moore et al. | 707/100 |
| 2005/0091596 A1* | 4/2005 | Anthony et al. | 715/712 |
| 2006/0156255 A1* | 7/2006 | Bedingfield | 715/854 |
| 2008/0228937 A1 | 9/2008 | Araumi | |
| 2009/0125842 A1* | 5/2009 | Nakayama | 715/835 |
| 2009/0222420 A1 | 9/2009 | Hirata | |
| 2010/0313166 A1* | 12/2010 | Nakayama et al. | 715/810 |

FOREIGN PATENT DOCUMENTS

| | | |
|---|---|---|
| JP | 2003-271432 A | 9/2003 |
| JP | 2005-71332 A | 3/2005 |
| JP | 2006-235760 A | 9/2006 |
| JP | 2006-268295 | 10/2006 |
| JP | 2007-313756 | 12/2007 |
| WO | WO2007/069471 A1 | 6/2007 |

OTHER PUBLICATIONS

Office Action mailed May 30, 2013, in Japanese Patent Application No. 2008-313761, filed Dec. 9, 2008.

* cited by examiner

*Primary Examiner* — Steven Sax
*Assistant Examiner* — David Choi
(74) *Attorney, Agent, or Firm* — Oblon, Spivak, McClelland, Maier & Neustadt, L.L.P.

(57) ABSTRACT

In a screen for displaying thumbnail images, a background image is displayed on an entire portion of a specific area, translucent lanes are displayed on the background, and thumbnail images are displayed on a lane located in the center of the screen. When a mouse pointer is put on a lane on the right side of the lane located in the center, a symbol image that is arranged on the right side of a symbol image corresponding to the thumbnail images on a place map screen, and a file name of the symbol image are displayed on the lane that is specified by the mouse pointer.

5 Claims, 35 Drawing Sheets

FIG. 5

```
<?xml version="1.0" encoding="utf-8"?>
<placeMap updateTime="2007-08-10T12:54:00+09:00"
preCurrentID="My place"

<layer name="NO Name" tag="">
        <place ID="">
        <place ID="">
        <place ID="">
    </layer>

<layer name="FAVORITE" tag="FAVORITE; PHOTO">
        <place ID="">
        <place ID="My place">
        <place ID="">
    </layer>

<layer name="" tag="">
        <place ID="">
        <place ID="">
        <place ID="">
    </layer>
</placeMap>
```

201 → {layer block}, 202 → place ID line

FIG. 6

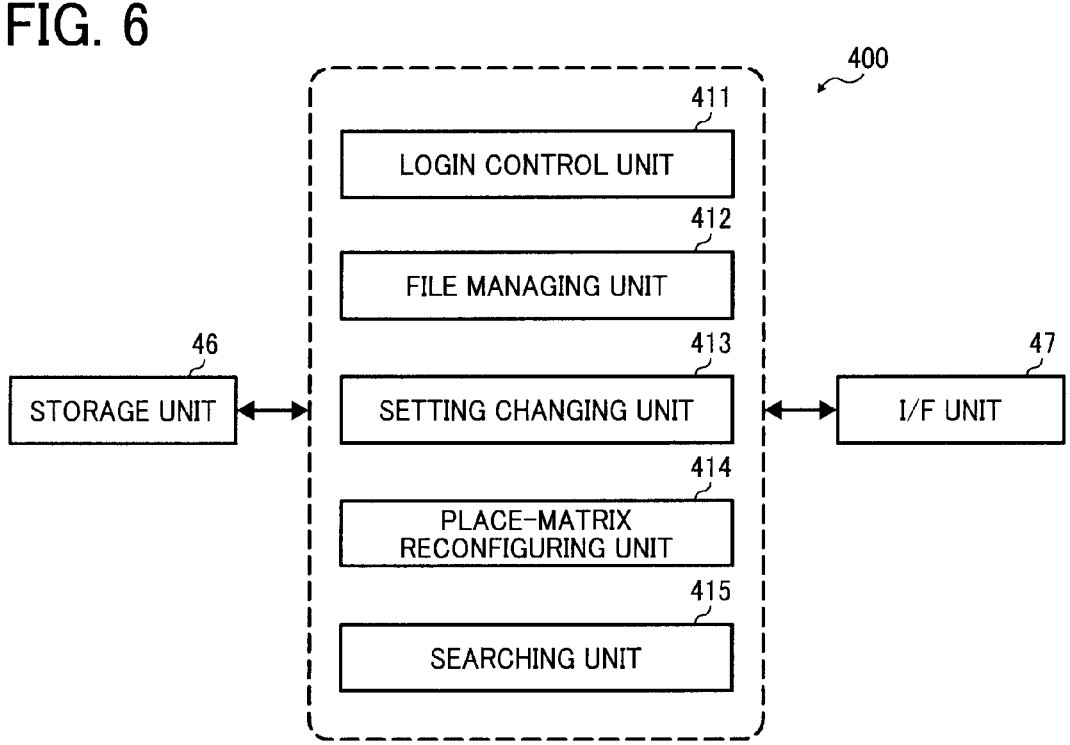

FIG. 28

```
<?xml version="1.0" encoding="UTF-8"?>
<UIHistory>
  ...
  <View>                    1301
    ...
    <Rows3DView>6</Rows3DView>
  </View>
  ...
  <PlaceConfigs>     1201         1202                   1203                   1204
    <PlaceConfig ID=" " BackGroundType=" " CameraHorizontal=" " CameraVertical=" " CameraZoom=" "/>
    <PlaceConfig ID=" " BackGroundType=" " CameraHorizontal=" " CameraVertical=" " CameraZoom=" "/>
    <PlaceConfig ID=" " BackGroundType=" " CameraHorizontal=" " CameraVertical=" " CameraZoom=" "/>
    <PlaceConfig ID=" " BackGroundType=" " CameraHorizontal=" " CameraVertical=" " CameraZoom=" "/>
    <PlaceConfig ID=" " BackGroundType=" " CameraHorizontal=" " CameraVertical=" " CameraZoom=" "/>
  </PlaceConfigs>
</UIHistory>
```

| VALUE OF SLIDER BAR (LEFTMOST POSITION IS 0) | X-COORDINATE | Y-COORDINATE | Z-COORDINATE | |
|---|---|---|---|---|
| 0 | -90 | FIXED | -9.25 | |
| 10 | -80 | FIXED | -5 | |
| 20 | -70 | FIXED | -1.25 | |
| 30 | -60 | FIXED | 2 | |
| 40 | -50 | FIXED | 4.75 | |
| 50 | -40 | FIXED | 7 | |
| 60 | -30 | FIXED | 8.75 | |
| 70 | -20 | FIXED | 10 | |
| 80 | -10 | FIXED | 10.75 | |
| 90 | 0 | FIXED | 11 | INITIAL VALUE |
| 100 | 10 | FIXED | 10.75 | |
| 110 | 20 | FIXED | 10 | |
| 120 | 30 | FIXED | 8.75 | |
| 130 | 40 | FIXED | 7 | |
| 140 | 50 | FIXED | 4.75 | |
| 150 | 60 | FIXED | 2 | |
| 160 | 70 | FIXED | -1.25 | |
| 170 | 80 | FIXED | -5 | |
| 180 | 90 | FIXED | -9.25 | |

| VALUE OF SLIDER BAR (BOTTOM END POSITION IS 0) | X-COORDINATE | Y-COORDINATE | Z-COORDINATE | |
|---|---|---|---|---|
| 0 | FIXED | 0 | FIXED | |
| 10 | FIXED | 2 | FIXED | |
| 20 | FIXED | 4 | FIXED | |
| 30 | FIXED | 6 | FIXED | |
| 40 | FIXED | 8 | FIXED | |
| 50 | FIXED | 10 | FIXED | INITIAL VALUE |
| 60 | FIXED | 12 | FIXED | |
| 70 | FIXED | 14 | FIXED | |
| 80 | FIXED | 16 | FIXED | |
| 90 | FIXED | 18 | FIXED | |
| 100 | FIXED | 20 | FIXED | |

FILE MANAGEMENT APPARATUS, FILE MANAGEMENT METHOD, AND COMPUTER PROGRAM PRODUCT

CROSS-REFERENCE TO RELATED APPLICATIONS

The present application claims priority to and incorporates by reference the entire contents of Japanese Patent Application No. 2008-313761 filed in Japan on Dec. 9, 2008.

BACKGROUND OF THE INVENTION

1. Field of the Invention

The present invention relates to a file management apparatus, a file management method, and a computer program product for managing a plurality of files. The present invention more particularly relates to a file management apparatus, a file management method, and a computer program product that allows a user to manage files visually.

2. Description of the Related Art

With widespread use of information equipments, such as personal computers (PCs), digital cameras, and mobile phones, documents and images are increasingly used in computerized formats (hereinafter, the computerized documents and images are referred to as "files"). The files as the computerized documents and images are managed by the information equipments such that a user can search for and view desired files by operating the information equipments.

For example, WINDOWS (registered trademark) that is used as an operating system (OS) in typical PCs manages files by using a tree structure that represents a hierarchical relationship between folders. Therefore, search for a desired file is generally performed by accessing the folders in the tree structure through top-down search or bottom-up search.

Furthermore, conventionally, there has been proposed a technology for managing files in an intuitive manner by visualizing files or folders that are used for classifying or organizing the files into respective thumbnail images or icon images. For example, Japanese Patent Application Laid-open No. 2006-268295 discloses a conventional user-interface display apparatus that displays icon images of a plurality of upper-layer folders on a top portion of a screen in a horizontal direction, displays in the middle and on a bottom portion of the screen thumbnail images of a plurality of files that are located in layers under one specific folder among the folders that respectively correspond to the icons displayed on the top portion of the screen, and displays a specific thumbnail image in a relatively larger size from among the thumbnail images, so that the user-interface display apparatus enables a user to easily understand a concept of operation and a scroll process for the thumbnail images.

However, in the conventional user-interface display apparatus, a folder in the tree structure is employed as a unit for managing files, so that file management is deployed in a depth direction. Therefore, operation that is more cumbersome is required for files stored in lower layers. Furthermore, a folder corresponding to one node and another folder corresponding to another node are located in different positions (layers) in the tree structure, so that it is difficult to intuitively recognize a relationship between these folders.

The applicant of the present invention has proposed a file management apparatus that displays a plurality of symbol images, each of which serves as a unit for managing files, in a matrix form on a display unit, and, when a command for selecting one symbol image from among the symbol images being displayed is issued, displays on the display unit thumbnail images of files that are registered in association with the selected symbol image, so that the file management apparatus enables a user to intuitively recognize a relationship between the units of managing files and thereby allows the user to effectively manage the files (see Japanese Patent Application No. 2008-124060, which is filed on May 9, 2008).

FIG. 39 is a schematic diagram of an example of a file management screen for displaying files managed by the above-mentioned file management apparatus on a display device of a computer. As shown in the figure, on the display device, areas P (places) in which files are registered are displayed in a matrix form and layer name areas L1 representing layers for managing the places in the same row are displayed in a vertical direction and adjacent to the places P (a place map screen). Here, a matrix of the above-mentioned places, which is formed of layers arranged in multiple stages, in the place map screen is referred to as "a place matrix".

FIG. 40 is a schematic diagram of an example of a place view screen to be displayed on the display device when a desired area is specified on the place map screen shown in FIG. 39. When a user specifies a desired area on the place map screen, files that the file management apparatus manages in association with the specified area are displayed three-dimensionally on a screen of the display device. In this example, twelve thumbnail images "Bc1" to "Bc12" that are registered in a place named "Bc (e.g., Party)" are arrayed and displayed in a matrix of four rows and three columns. Furthermore, a width of a lane L0 is gradually narrowed toward an upper portion of the screen, and sizes of the thumbnail images are adjusted in proportion to the width of the lane L0, so that the thumbnail images are displayed three-dimensionally.

In the place view screen, it is possible to switch thumbnail images to be displayed from the thumbnail images being displayed to thumbnail images of respective files in areas (Ac, Bc, Bb, and Bd) that are respectively arranged above, below, on the left, and on the right of the current place on the place map screen, by using a place switching button (not shown) arranged at a bottom portion of the screen.

SUMMARY OF THE INVENTION

It is an object of the present invention to at least partially solve the problems in the conventional technology.

According to an aspect of the present invention, there is provided a file management apparatus including a storage device that stores therein pieces of file management information, each of which serves as a unit for managing files, and files managed by each piece of the file management information, in an associated manner; a first display control unit that displays respective symbol images of the files in a matrix form on a display unit; a receiving unit that receives information corresponding to operation performed by a user; a second display control unit that displays, upon receiving a command for selecting one symbol image from among the symbol images displayed on the display unit, thumbnail images of respective files that are stored in association with a piece of the file management information that is corresponding to the selected symbol image, on the display unit; and a third display control unit that displays information at a position adjacent to the thumbnail images being displayed on the display unit, wherein the information indicates a symbol image arranged adjacent to a symbol image corresponding to the thumbnail images being displayed among the symbol images displayed by the first display control unit.

According to another aspect of the present invention, there is provided a file management apparatus including a storage device that stores therein pieces of file management information, each of which serves as a unit for managing files, and files managed by each piece of the file management information, in an associated manner; a first display control unit that displays respective symbol images of the files in a matrix form on a display unit; a receiving unit that receives information corresponding to operation performed by a user; a second display control unit that displays, upon receiving a command for selecting one symbol image from among the symbol images displayed on the display unit, thumbnail images of respective files that are stored in association with a piece of the file management information that is corresponding to the selected symbol image, on the display unit; and a background setting unit that stores, upon reception of setting information of a background image of a screen for displaying the thumbnail images, the setting information in association with a corresponding symbol image.

According to still another aspect of the present invention, there is provided a file management apparatus including a storage device that stores therein pieces of file management information, each of which serves as a unit for managing files, and files managed by each piece of the file management information, in an associated manner; a first display control unit that displays respective symbol images of the files in a matrix form on a display unit; a receiving unit that receives information corresponding to operation performed by a user; a second display control unit that displays, upon receiving a command for selecting one symbol image from among the symbol images displayed on the display unit, thumbnail images of respective files that are stored in association with a piece of the file management information that is corresponding to the selected symbol image, on the display unit; and a thumbnail-image-display-number setting unit that stores, upon reception of setting information about maximum number of thumbnail images to be displayed on the display unit, the setting information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of placeMap.xml;

FIG. 6 is a functional block diagram of the file management server;

FIG. 28 is a diagram illustrating an example of UIHistory.xml as setting information of the place map screens shown in FIGS. 27 to 29;

FIG. 33A is a table showing a relationship between a vertical position of the slider bar and a position of the camera;

FIG. 33B is a graph illustrating an orbit of the camera corresponding to the table shown in FIG. 33A, when the orbit is viewed edge-on;

FIG. 35 illustrates a table showing a relationship between the vertical position of the slider bar and a tilt angle of the camera, and a graph illustrating an orbit of the camera corresponding to the table, when the orbit is viewed from edge-on;

DETAILED DESCRIPTION OF THE PREFERRED EMBODIMENTS

Exemplary embodiments of the present invention are explained in detail below with reference to the accompanying drawings.

Figure 1:
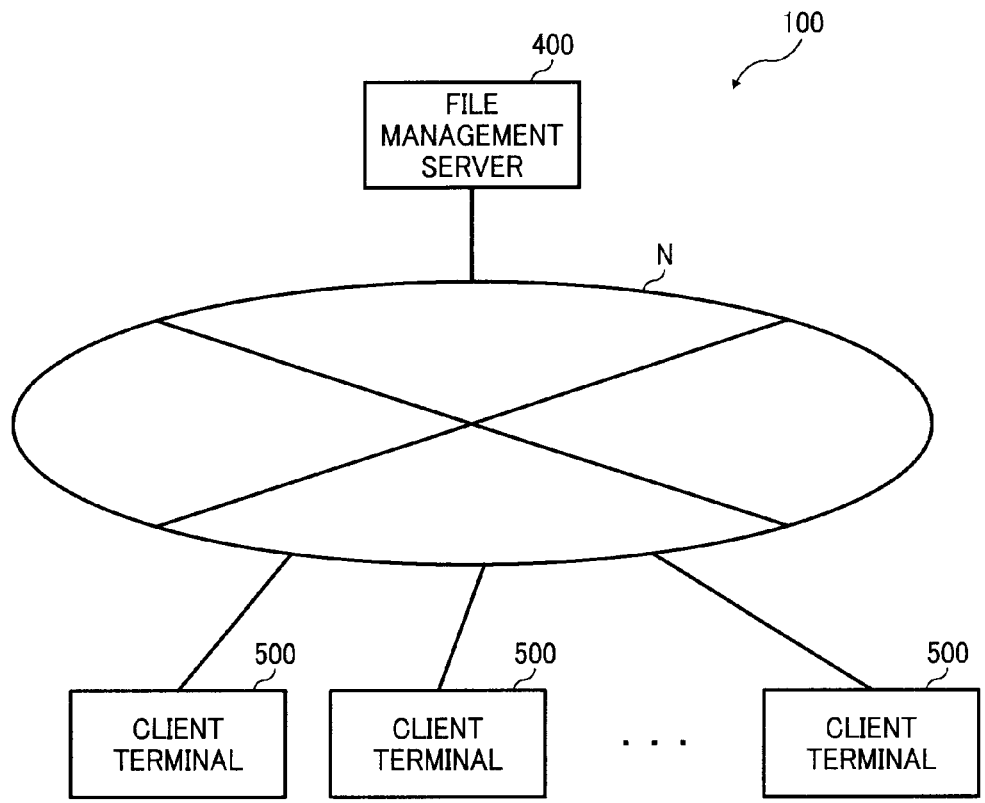
FIG. 1 is a schematic diagram of a configuration of a file management system according to an embodiment of the present invention.

FIG. 1 is a schematic diagram of a configuration of a file management system 100 according to an embodiment of the present invention. The file management system 100 includes a plurality of client terminals 500 such as personal computers (PCs) and multifunction peripherals (MFPs), a file management server 400 as a file management apparatus according to the present embodiment, which manages a file or a folder uploaded from the client terminals 500, and a network N that communicably connects each of the client terminals 500 and the file management server 400 to one another.

Figure 39:
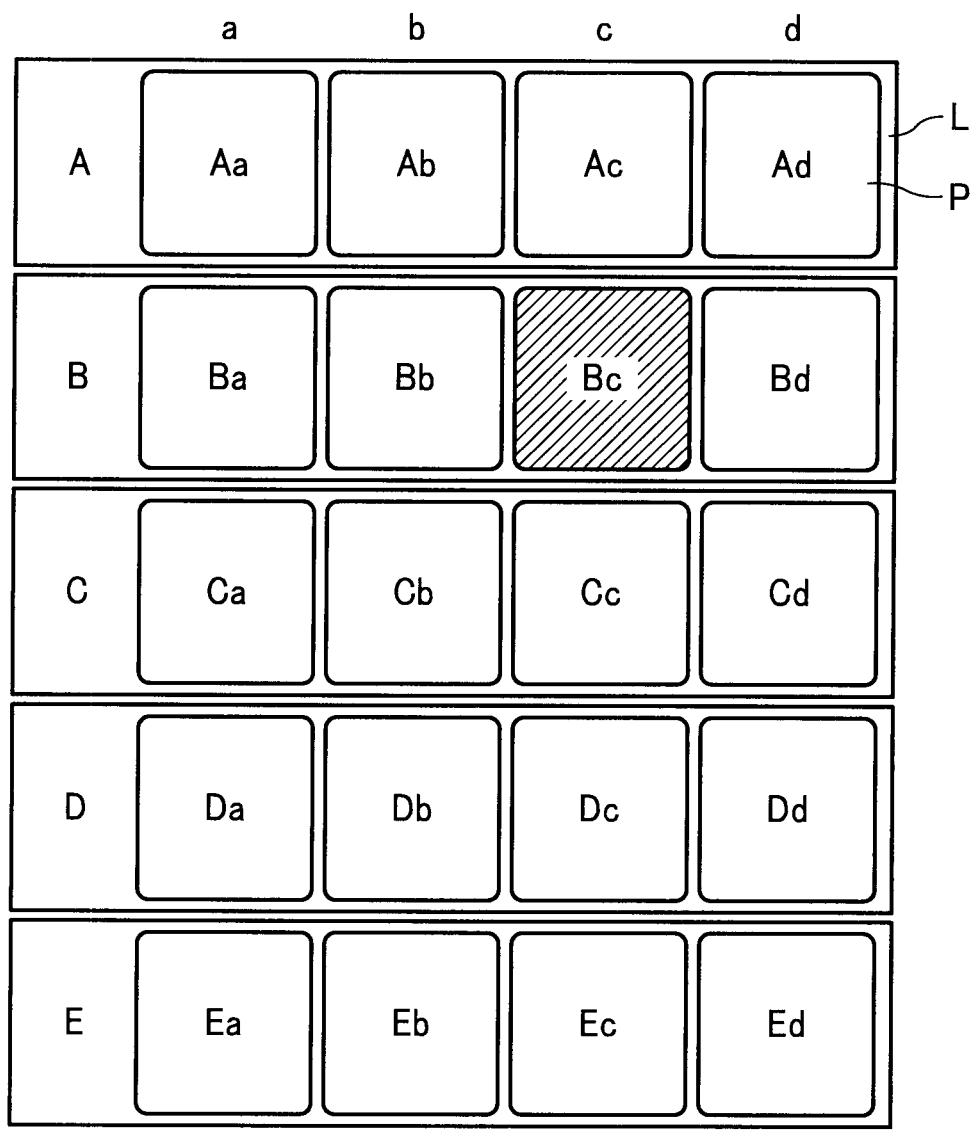
FIG. 39 is a schematic diagram of a place map screen.
Figure 40:
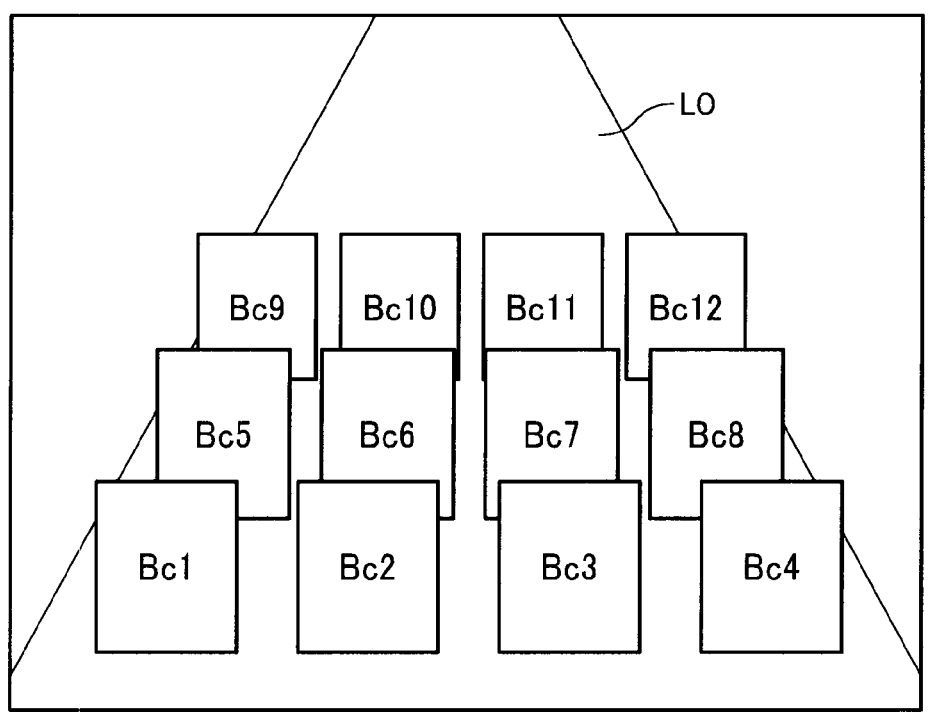
FIG. 40 is a schematic diagram of a place view screen.

The file management server 400 can manage files uploaded from the client terminals 500 with use of places arrayed in a matrix as shown in FIG. 39, similarly to the file management apparatus proposed by the preceding application.

Figure 2:
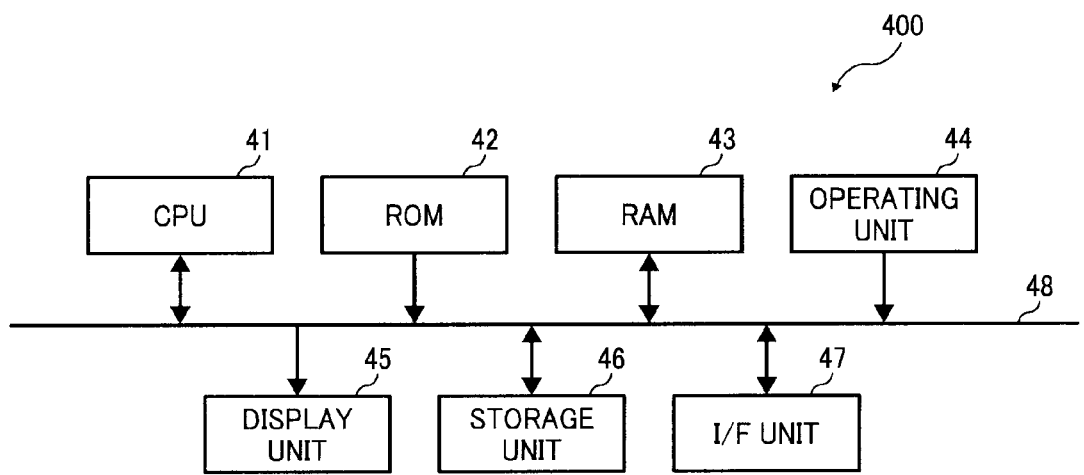
FIG. 2 is a block diagram of a hardware configuration of a file management server shown in FIG. 1.

FIG. 2 is a block diagram of a hardware configuration of the file management server 400. The file management server 400 includes a central processing unit (CPU) 41 that realizes each functional unit (see FIG. 6), which will be described later, by controlling the entire apparatus through execution of a computer program, a read only memory (ROM) 42 that stores therein a computer program and various types of data, a random access memory (RAM) 43 onto which the CPU 41 loads the computer program, an operating unit 44 that includes an input device such as a mouse or a keyboard, a display unit 45 that includes a display device such as a liquid crystal monitor and displays a place map screen as shown in FIG. 39, a storage unit 46 that is a storage device such as a hard disk drive (HDD) and functions as a first storage unit for storing various computer programs and data, an interface (I/F) unit 47 as a sending unit that sends to the client terminal a thumbnail image or comment data, which will be described later, and a bus 48 that connects the above units to one another.

The storage unit 46 manages a file sent from a user (the client terminal 500), and also stores and manages setting information such as file management information (a placeID folder to be described later: see FIG. 3) representing a unit for managing the file by associating the sent file with the setting information in a predetermined folder structure.

Figure 3:
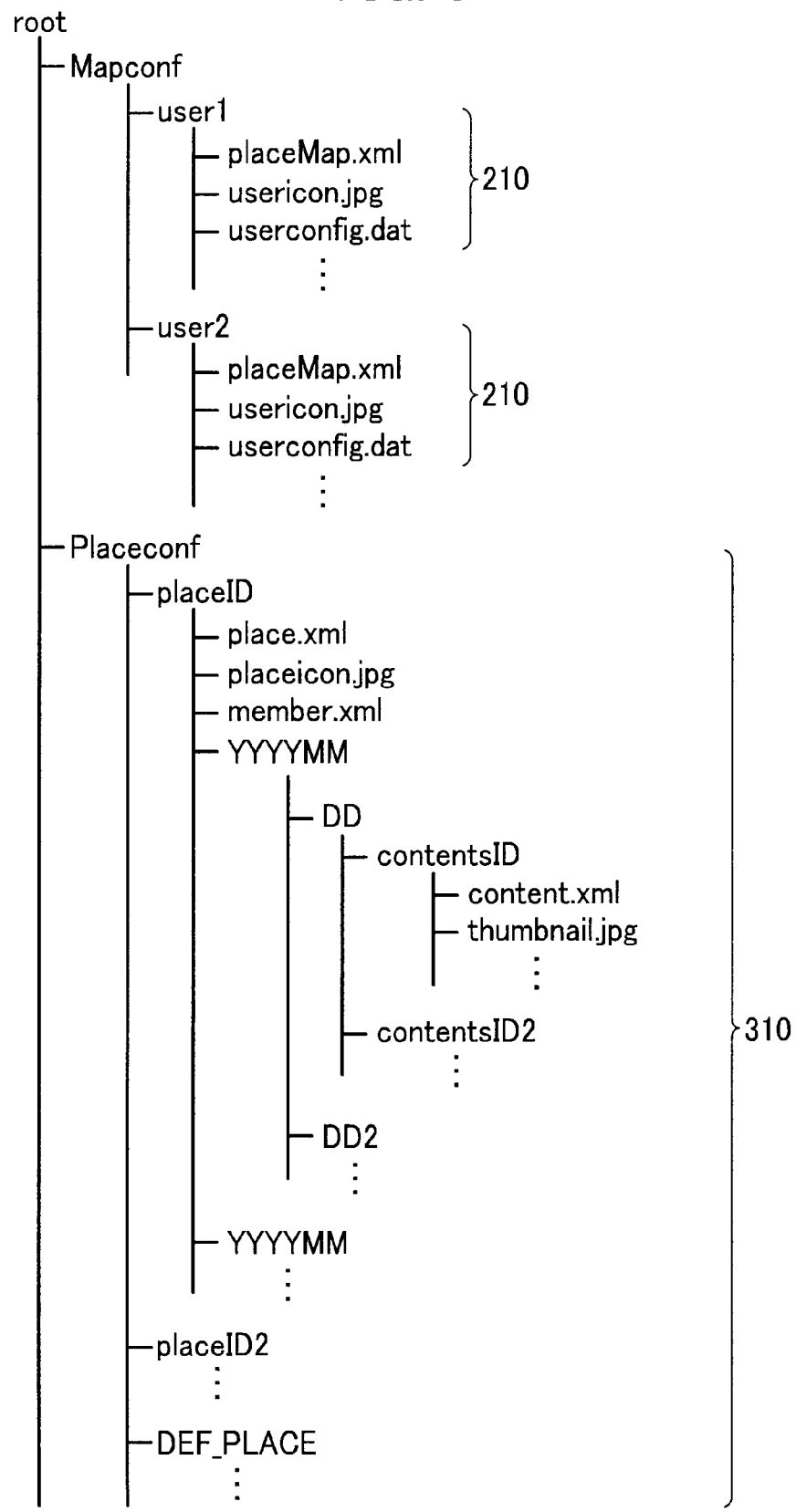
FIG. 3 is a diagram illustrating a folder structure for managing setting information and the like according to the embodiment.

Described next is a structure for managing the setting information such as the file management information (the placeID folder to be described later: see FIG. 3) stored in the storage unit 46. FIG. 3 is a diagram illustrating a folder structure for managing the setting information stored in the storage unit 46. As shown in the figure, the storage unit 46 has a tree folder structure for storing the setting information and the like. The folder structure is composed of a map managing section 200 for storing setting information to display a place map screen, and a place managing section 300 for storing setting information of an area P (place) to be arranged on the place map screen.

A Mapconf folder in the map managing section 200 functions as a root folder of the map managing section 200. The Mapconf folder contains user folders (user 1, user 2, etc.) that are prepared for respective users (user IDs) who use the system. Each of the user folders contains setting information (place map information: placeMap.xml) about a place map screen for a user ID corresponding to a name of each of the user folders, an icon image (usericon.jpg) for the same user ID, and "userConfig.dat" for recording information about a user identified by the same user ID, such as a user name or a contact address (e.g., e-mail address).

Figure 4:
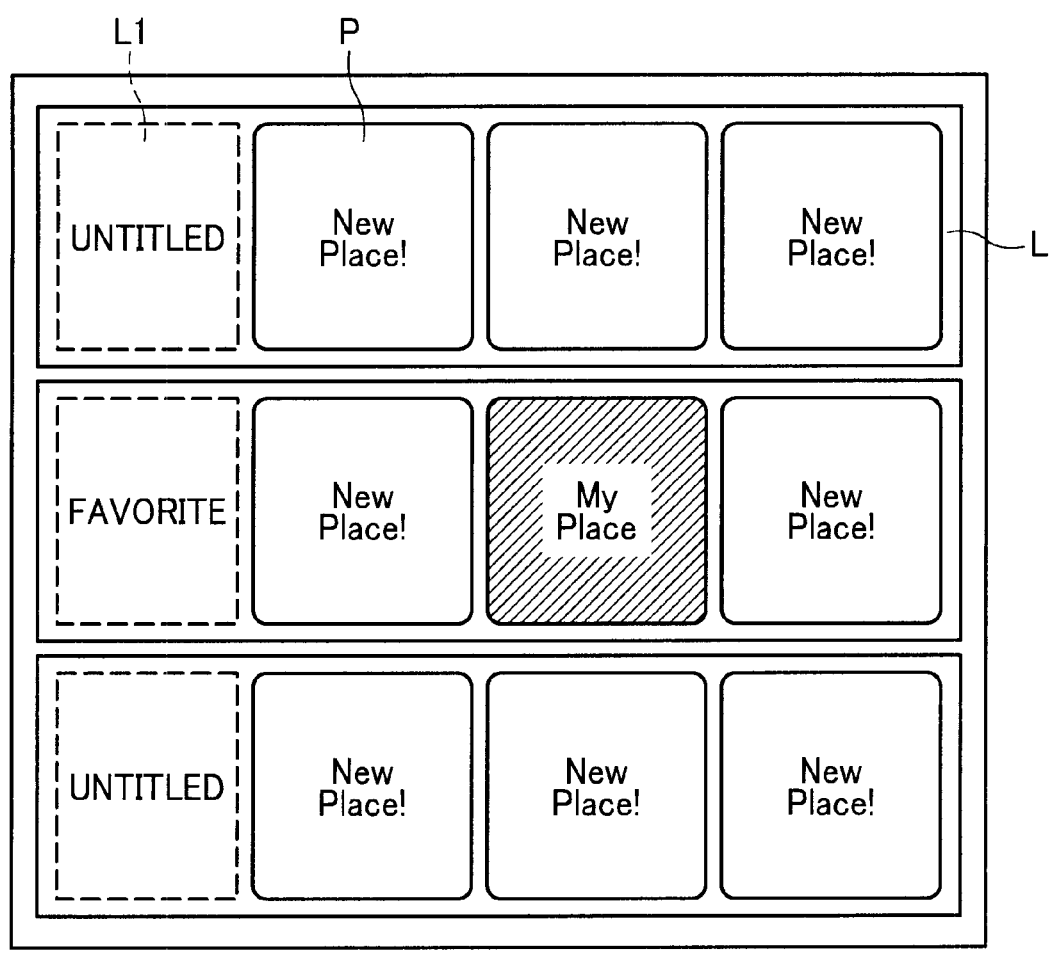
FIG. 4 is a schematic diagram of an example of a place map screen according to the embodiment.

FIG. 4 illustrates an example of the place map screen. FIG. 5 is a diagram illustrating an example of the placeMap.xml as the setting information about the place map screen. As shown in FIG. 5, the placeMap.xml is written in an extensible markup language (XML) format (see the first line). A tag on the second line contains date and time at which the placeMap.xml was updated (updateTime), and a place name (preCurrentID) of the area P (place) that is shown in FIG. 4 and was operated just before the end of a previous operation. The placeMap.xml contains a plurality of layer settings 201, each of which contains a tag <layer name="X", tag="Y"> and a tag </layer>. Here, each of "X" and "Y" is substituted for null or arbitrary character string.

When the place map screen shown in FIG. 4 is displayed by a predetermined display unit, a display control unit sequentially displays layers (areas L) respectively corresponding to the layer settings 201, from top to bottom on the screen in order corresponding to a sequence of the layer settings 201 contained (stored) in the place map information (placeMap.xml). In other words, the order of the layer settings 201 contained in the place map information has a direct relationship with a drawing position (display position) of a layer.

When a layer name is registered in the layer setting 201, that is, when arbitrary character string is registered instead of "X" in "layer name="X"", the character string is drawn in a layer name area L1 arranged in the layer as shown in FIG. 4. For example, in the layer setting 201 at the second highest position in the example shown in FIG. 5, "favorite" is registered in the layer name. In this case, as shown in FIG. 4, "favorite" is drawn in the layer name area L1 arranged in the second layer corresponding to the layer setting 201 at the second highest position. When "X" is null, that is, when the layer name is not registered, it is possible to display character string indicating an unregistered state (e.g., "untitled" as shown in FIG. 4), or display nothing (no display). It is also possible not to display the layer itself. However, it is preferable to display a layer name in the layer name area L1 when any layer name is registered.

Each of the layer settings 201 contains a plurality of place settings 202 that are tags represented by <placeID="Z"> as shown in FIG. 5. It is assumed here that "Z" is substituted for null or arbitrary character string. Each of the place settings 202 corresponds to the area P (place) shown in FIG. 4, and the places are displayed in association with a layer corresponding to the layer setting 201 to which the place settings 202 belong. When the place map screen shown in FIG. 4 is displayed, place images (placeicon.jpg: see FIG. 3) that are symbol images respectively corresponding to the place settings 202 are sequentially displayed from left to right on the layer in order corresponding to a sequence of the place settings 202 contained in the layer setting 201. In other words, the order of the place settings 202 contained in the layer setting 201 indicates positional information for drawing the place images in a matrix form on the place map screen.

When a place name is registered in the place setting 202, that is, when arbitrary character string is registered instead of "Z" in "placeID="Z"", the display control unit draws the character string in a corresponding place. For example, in the layer setting 201 at the second highest position (the second line from the top) in the example shown in FIG. 5, "My Place" is registered as a place name of the place setting 202 on the second line from the top. In this case, as shown in FIG. 4, "My Place" is displayed on a place arranged in the middle of the second layer that corresponds to both the layer setting 201 at the second highest position and the place setting 202 on the second line.

When "Z" is null, that is, when no place name is registered, it is possible to display character string indicating an unregistered state (e.g., "New Place!" as shown in FIG. 4), or display null (no display). Furthermore, when an icon image (placeicon.jpg: see FIG. 3) is registered in association with the place setting 202 as will be described later, the icon image is displayed on a corresponding place.

In the layer setting 201, a layer attribute as a look-up (an index) for characterizing each of the layers (the layer settings 201), which is entered from the client terminal 500 shown in FIG. 1, is registered in "tag="Y"". For example, as shown in the layer setting 201 at the second highest position in the example shown in FIG. 4, arbitrary character string, such as "Favorite" and "Photo", can be registered as the layer attribute. The layer attribute registered in the layer is inherited to places that are displayed on this layer, and functions as a master attribute that is shared by these places.

The place map information in an initial state contains a plurality of the layer settings 201 (e.g., three) in which the layer names and the layer attributes are not registered. Furthermore, each of the layer settings 201 contains the same number of the place settings 202 (e.g., three) in which the place names and the place attributes are not registered.

Explanation about the folder structure shown in FIG. 3, which is stored in the storage unit 46, is continued below. The place managing section 300 contains various types of setting information related to each of the above-mentioned places. In other words, a Placeconf folder of the place managing section 300 functions as a root folder of the place managing section 300, and contains placeID folders (placeID1, placeID2, ... ) corresponding to the file management information, and a DEF_PLACE folder containing setting information about a place for which the attribute and the place name are not registered, i.e., in an unregistered state.

Each placeID folder corresponds to the place settings 202 that are shown in FIG. 5 and contained in the place map information (placeMap.xml) of the map managing section 200, so that the corresponding placeID folder can be referred to from each of the place settings 202. More specifically, when a place name is registered, a folder having the same folder name as the place name is created as a placeID folder, so that correspondence between the placeID folder and each of the place settings 202 is made. Further, the DEF_PLACE folder is referred to for the place setting 202 in which the place name is not registered.

The placeID folder contains file registration information that is information about registration of a file in a place corresponding to this placeID folder (hereinafter, "a corresponding place").

Among the file registration information, in place.xml (place information) are registered information about a place corresponding to the placeID folder that contains the place.xml, e.g., the above-mentioned place attribute as the index for characterizing each place, which is input by a user (the client terminal 500), comment, and the like. Arbitrary character string such as words or symbols can be registered as the place attribute.

The place attribute can be registered independent of the above-mentioned layer attribute. While the layer attribute functions as a master attribute shared by the places, the place attribute functions as a subordinate attribute that is effective only to a corresponding place. In other words, in the place map screen shown in FIG. 4, each file can be systematically managed by using the layer in units of the master attribute and the place (area P) in units of the subordinate attribute.

The placeicon.jpg is an icon image (a symbol image) to be drawn in a place corresponding to a placeID folder that contains the placeicon.jpg on the place map screen shown in FIG. 4. A format of an image to be stored as the icon image is not limited to this example. When the icon image is not registered by a user, it is possible to display an image of default image data that is provided in advance.

A YYYYMM folder is a folder representing a year and a month when a file is registered in a corresponding place, which is created by a setting changing unit 413 shown in FIG. 6 as will be described later with respect to each year and month of registration of the file. The "YYYY" represents a year (A.D.) and "MM" represents a month. The YYYYMM folder contains a DD folder that represents a day when the file is registered in the corresponding place. The DD folder is created by the setting changing unit 413 with respect to each day of registration of the file. In other words, a year, a month, and a date of registration of the file in the place can be identified by data in the YYYYMM folder and the DD folder.

The DD folder contains a contentsID folder corresponding to each of files registered in the place. The contentsID folder is assigned with a folder name identical to a file name of the file registered in the corresponding place (except extension); however, it is not limited to thereto. For example, it is possible to sequentially assign a sequence number to each of the file names.

The contentsID folder contains content.xml that contains information about a file corresponding to the contentsID folder, thumbnail.jpg that is a thumbnail image of the file, original.jpg that is original data of the file, and the like. The content.xml (file information) contains a storage location where the file corresponding to the contentsID folder is actually stored, and information about the file such as a file attribute registered in the file, which will be described later. Further, in addition to the original.jpg, original.png for image data, original.doc for document data, or the like is stored as the original data of the file.

The DEF_PLACE folder contains setting information about a place in the unregistered state, in the same structure as the above-mentioned placeID folder. It is assumed here that the place information is stored in the initial state in which attribute is not written, and the YYYYMM folder and its subordinate folders are not provided.

A place managing section 310 contains member.xml (member list) in which information about an owner of the placeID folder (i.e., a place) and user IDs of users as sharers of the placeID folder, with respect to each placeID folder. When a plurality of user IDs are registered in the member list, a corresponding place is shared by users identified by the user IDs registered in the member list. Hereinafter, a place shared by users is referred to as a shared place.

Among the user IDs registered in the member list, identification information for identifying the owner of the place is appended to a user ID of a user who has created the place corresponding to the placeID folder that contains the member list. Furthermore, access authority, which will be described later, is granted to each of the user IDs of the users who are to be sharers of the place.

As described above, the storage unit 46 manages data for displaying the place map for each user, such as the layer settings 201 and the place settings 202, with use of a map managing section 210, and manages data of the place for displaying each place map, such as file data registered in a place, with use of the place managing section 310. Therefore, the place map as shown in FIG. 4 can be displayed by using the above-mentioned data from the storage unit 46.

FIG. 6 is a functional block diagram of the file management server 400. The file management server 400 includes a login control unit 411 as an authenticating unit that authenticates login from the client terminal 500 (user) shown in FIG. 1; a file managing unit 412 as a file managing unit that manages a file for each user, which is stored in the storage unit 46 shown in FIG. 2; the setting changing unit 413 as a generating unit that changes the setting information stored in the storage unit 46 according to a command or the like received from the client terminal 500 via the I/F unit 47; a place-matrix reconfiguring unit 414 that reconfigures a place matrix based on change of settings when the settings of the place matrix is changed by the setting changing unit 413, i.e., when, for example, contents of the place.xml shown in FIG. 3 are changed; and a searching unit 415 that searches for a file in the storage unit 46 according to a command or the like received from the client terminal 500 via the I/F unit 47. Each of the above units is realized by the CPU 41 through execution of various computer programs stored in the ROM 42 or the storage unit 46.

Each functional unit of the file management server 400 shown in FIG. 6 is described in detail below.

The login control unit 411 receives a login request, which will be described later, from the client terminal 500, and authenticates the validity of a user by comparing a combination of a user ID and a password contained in the login request with a verification data that is stored in the storage unit 46 in advance. The verification data contains a prepared combination of a user ID and a password of a user who is registered as a valid user. The user ID is identification information for identifying each user, and can be, for example, arbitrary character string such as a nickname or arbitrary numbers such as a license number.

The file managing unit 412 extracts the setting information as shown in FIG. 3 for displaying a user interface on a display unit 55 of the client terminal 500 or a file from the storage unit 46, for a user who has been authenticated as a valid user by the login control unit 411, and then sends the setting information or the file to the client terminal 500 to which the user has logged in.

Furthermore, the file managing unit 412 reads out from the storage unit 46 place map information (placemap.xml) in the map managing section 210 and a placeID folder in the place managing section 310, which are shown in FIG. 3 and corresponding to a user ID for which login has been permitted by the login control unit 411, and then sends the place map information and the placeID folder to the client terminal 500. More specifically, upon identifying a user folder ("user1", "user2", and the like: see FIG. 3) corresponding to the user ID for which login has been permitted, the file managing unit 412 reads place map information (place.xml) from the map managing section 210 of the identified user folder, and also reads a placeID folder that corresponds to a placeID (see FIG. 5) contained in this place map information and contains a member list (member.xml: see FIG. 3) having this user ID, from the place managing section 310.

Furthermore, when a user folder ("user1", "user2", and the like: see FIG. 3) corresponding to the user ID for which login has been permitted is not present in the map managing section 210, that is, when a user logs in by using a new user ID, the file managing unit 412 creates a user folder having the same name as the new user ID in the map managing section 210, and then newly creates the map managing section 210 and the place managing section 310 under the created user folder. It is assumed that, in place map information in the newly-created map managing section 210, places are in unset states and a place matrix of, for example, three rows and three columns are set as an initial state.

Moreover, when the setting changing unit 413 and the place-matrix reconfiguring unit 414 update the setting information, the file managing unit 412 sends the updated setting information to the client terminal 500, so that the setting information stored in the client terminal 500 is updated. The setting information to be sent can be differential data containing only updated pieces of the setting information, or can be all pieces of the setting information related to the user ID that is currently logged in.

Furthermore, as will be described later, upon receiving a view request as a command to view a file belonging to a specific place from the client terminal 500, the file managing unit 412 reads a thumbnail image (thumbnail.jpg: see FIG. 3) of the file from the storage unit 46, and then sends the thumbnail image to the client terminal 500 that has sent the view request.

Upon receiving from the client terminal 500 a request as a command to change settings of the place map screen, e.g., a request for registering (uploading) or deleting files, changing settings of layer names or place names, and moving or deleting places, the setting changing unit 413 updates the setting information in the storage unit 46 based on the contents of the request.

The place-matrix reconfiguring unit 414 reconfigures the place matrix by changing the number of layers and places that constitute a place matrix on the place map screen, according to setting contents of the place map information that has been changed by the setting changing unit 413.

The searching unit 415 searches for, upon receiving from the client terminal 500 a search request with a search key, such as attribute information (tag) appended to each of layers, places, and files, or character string (hereinafter, referred to as "keyword"), a file corresponding to the search key from the storage unit 46.

Furthermore, upon retrieving the file corresponding to the search key from the storage unit 46, the searching unit 415 identifies a contentsID folder corresponding to the retrieved file from the place managing section 310 shown in FIG. 3, and copies a tree structure containing a DD folder and a YYYYMM folder to which the contentsID folder belongs and various types of data contained in the contentsID folder into the RAM 43 or a different storage area of the storage unit 46 shown in FIG. 2.

The searching unit 415 then merges the copied contentsID folder based on date indicated by the YYYYMM folder and the DD folder to thereby create a placeID folder containing a group of files as a search result, and sends the placeID folder as the search result of the search request to the client terminal 500. In place information (place.xml) in the placeID folder are written a folder name of each of the contentsID folders and contents of place information in a placeID folder that contains an original (the contentsID folder as a copy source described above) of each of the contentsID folders, in an associated manner.

Described next is the client terminal 500 shown in FIG. 1.

Figure 7:
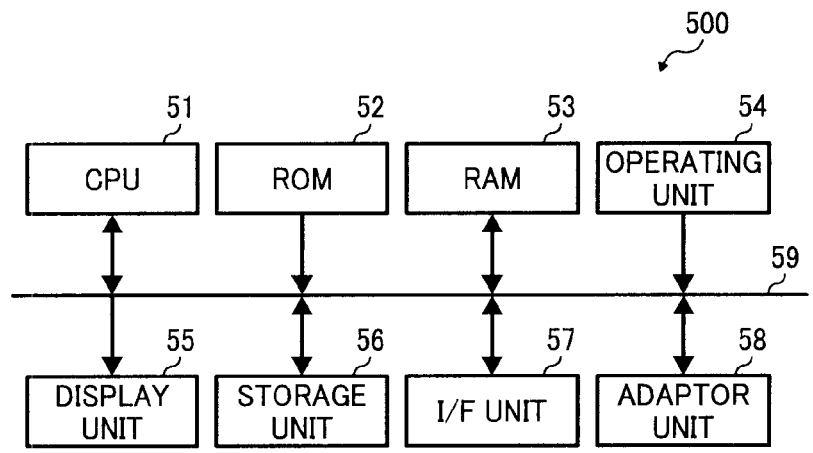
FIG. 7 is a block diagram of a hardware configuration of an arbitrary client terminal shown in FIG. 1.

FIG. 7 is a block diagram of a hardware configuration of an arbitrary one of the client terminals 500. The client terminal 500 includes a CPU 51 that realizes each functional unit (see FIG. 8), which will be described later, by controlling the entire apparatus through execution of a computer program, a ROM 52 that stores therein a computer program and various types of data, a RAM 53 onto which the CPU 41 loads the computer program, an operating unit 54 that includes an input device such as a mouse or a keyboard, the display unit 55 that includes a display device such as a liquid crystal monitor, a storage unit 56 as a storage device, such as an HDD, that stores therein various computer programs and data, an I/F unit 57 that controls communication with an external apparatus, an adaptor unit 58 to which an auxiliary storage device such as a memory card can be detachably mounted, and a bus 59 that connects the above units to one another.

Figure 8:
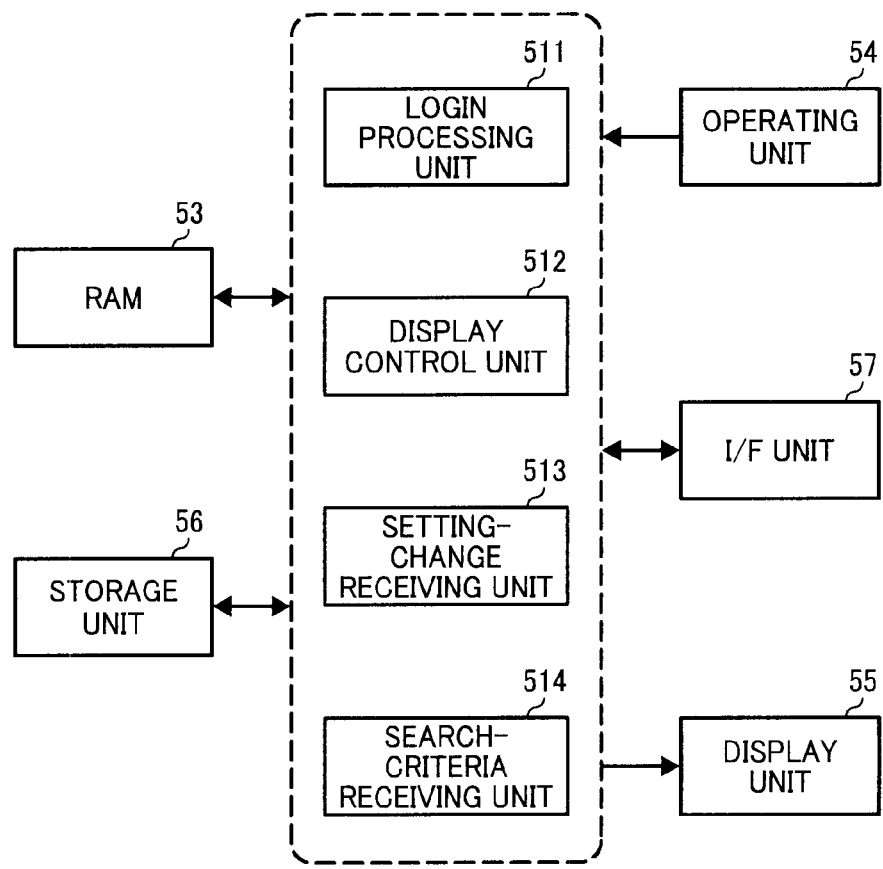
FIG. 8 is a functional block diagram of the client terminal.

FIG. 8 is a functional block diagram of an arbitrary one of the client terminals 500.

The client terminal 500 includes a login processing unit 511 for logging in to the file management server 400, a display control unit 512 that displays a list of thumbnail images of files and the like based on various types of data received from the file management server 400, a setting-change receiving unit 513 as a sending unit that receives from a user a command to change settings of the place map screen or the like (a request for creating a placeID etc.) as described above and sends the command to the file management server 400, and a search-criteria receiving unit 514 that receives a search key or the like input from the operating unit 54.

The login processing unit 511 displays a login screen for logging in to the file management server 400 on the display unit 55. When a user enters a user ID and a password on the login screen, the login processing unit 511 sends a login request containing this information to the file management server 400.

The login screen is displayed on the display unit 55 with control by the login processing unit 511. On the login screen, an area in which a user ID (quanpID) is entered and an area in which a password is entered are displayed. Upon detecting that a button for instructing login to the file management server 400 is pressed, the login processing unit 511 sends to the file management server 400 a login request containing at least the user ID that has entered in the area in which the user ID (quanpID) is entered and the password that has entered in the area in which the password is entered.

In FIG. 8, the display control unit 512 displays a user interface, such as the above-mentioned place map screen, on the display unit 55 based on various types of data received from the file management server 400 via the I/F unit 57.

Furthermore, upon receiving the setting information that is sent from the file management server 400 when login is performed or settings are changed, the display control unit 512 stores the received setting information in the RAM 53 or the storage unit 56 by using the tree structure as shown in FIG. 3.

Moreover, upon receiving operation for displaying a screen from a user via the operating unit 54, the display control unit 512 displays a place map screen, a place view screen, or a file view screen on the display unit 55 based on the setting information stored in the RAM 53 or the storage unit 56.

Figure 9:
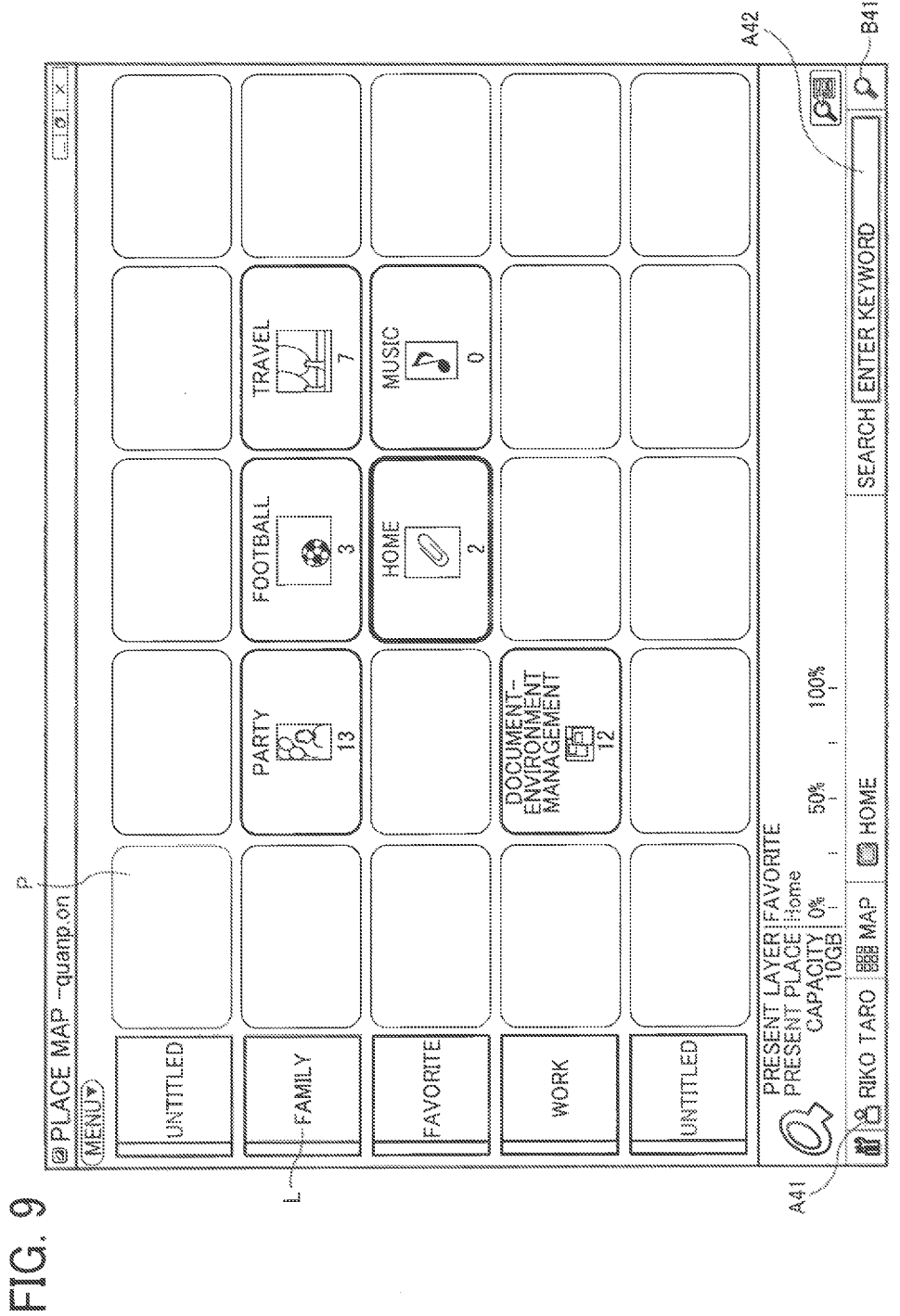
FIG. 9 is a schematic diagram of an example of the place map screen.

FIG. 9 is a schematic diagram of an example of a place map screen displayed on the display unit 55 by the display control unit 512. The figure illustrates a place map screen managed by a user whose user ID is "RIKO TARO", in which the user ID is displayed in an area A41 by the display control unit 512. In the place map screen, three layers having layer names "family", "favorite", "work", respectively, are already set. Furthermore, the layer named "family" contains three places having place names "party", "football", and "travel", respectively; the layer named "favorite" contains two places having place names "home" and "music", respectively; and the layer named "work" contains one place having a place name "document_environmental management". The number displayed at the bottom portion of each of the places corresponds to a total number of files stored (uploaded) in each of the places. The total number of files can be derived from a total number of "contentsID" folders stored under each of "placeID" folders.

An area A42 is an area to which a search key as a keyword for file search is entered. A button B41 is a button for instructing to perform search with respect to a search key entered in the area A42. When the button B41 is pressed, the search key entered in the area A42 is sent to the search-criteria receiving unit 514. When a specific layer is selected from the place map screen, the selected layer is notified as a search area together with the search key to the search-criteria receiving unit 514.

In FIG. 8, the setting-change receiving unit 513 receives a command to change setting of a place map screen or a place view screen, and sends a setting change request corresponding to contents of the command to the file management server 400 to thereby request the file management server 400 to change the setting. Operation that causes the setting to be changed is, for example, registration, change, or deletion of layer names, layer attributes, or place name, as described above. Upon receiving such operation via the operating unit 54, the setting-change receiving unit 513 sends to the client terminal 500 the operation contents and information containing at least a user ID of a user who is currently logging in, as a change request.

The search-criteria receiving unit 514 receives input of a keyword as a search key and search criteria such as a search method to be described later, and sends to the file management server 400 a search request containing at least these search criteria and a user ID of a user who is currently logging in to thereby request the file management server 400 to search for a file.

Operation for a file management process performed by the file management server 400 and the client terminal 500 is described below.

Display of Place Map Screen

Figure 10:
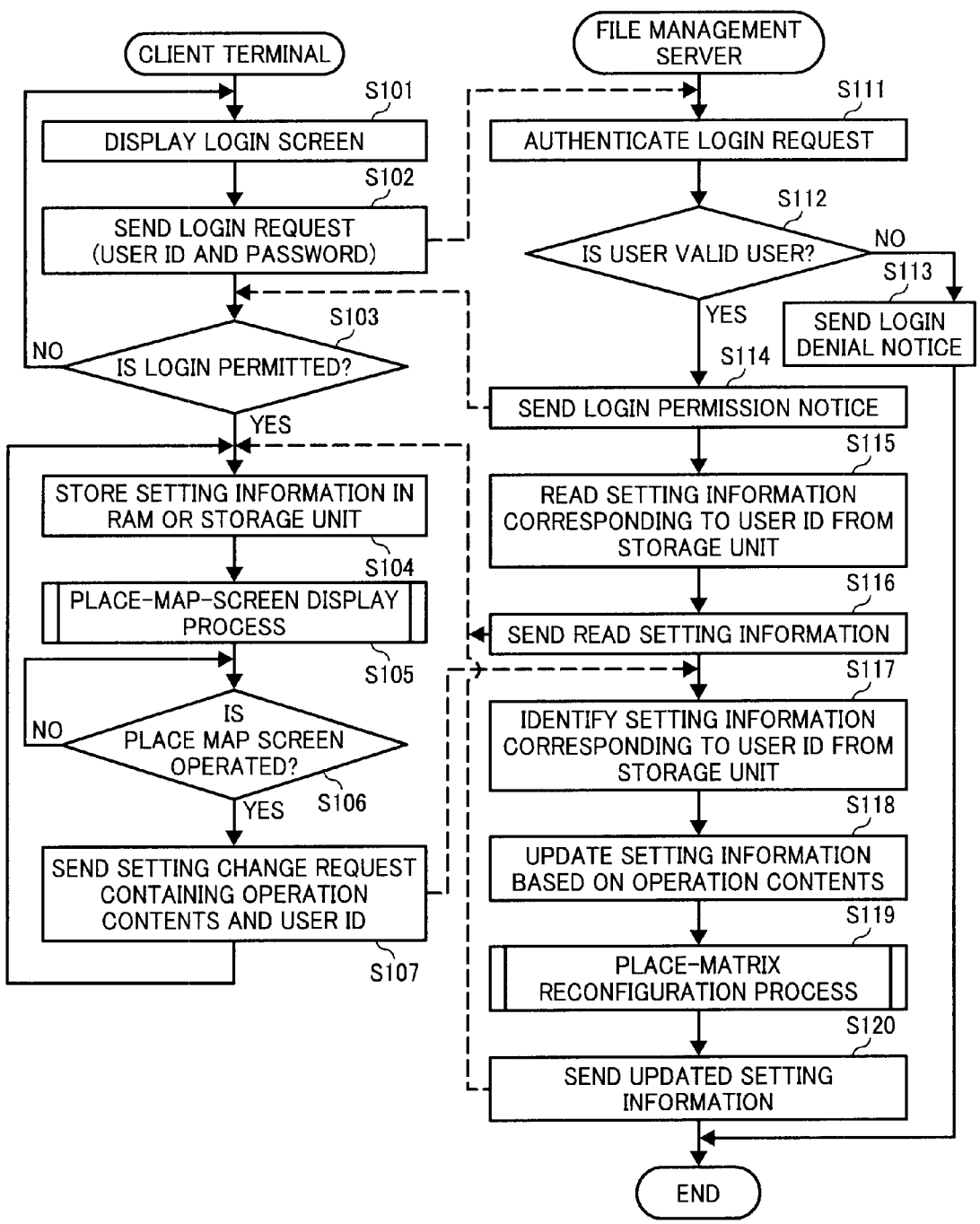
FIG. 10 is a flowchart of a procedure of a process for displaying a place map screen by the file management server and the client terminal.

Operation for displaying a place map screen on the display unit 55 of the client terminal 500 is described below. FIG. 10 is a flowchart of a procedure of a process for displaying a place map screen by the file management server 400 and the client terminal 500. As a premise for the present process, it is assumed that a user ID and a password of a user who operates the client terminal 500 are registered in advance in the file management server 400. It is also assumed that the user who operates the client terminal 500 is not invited to a shared place by other users.

The login processing unit 511 displays the login screen as described above on the display unit 55 before accessing the file management server 400 (Step S101). Upon detecting that the button is pressed and determining that a login to the file management server 400 is instructed, the login processing unit 511 sends a login request containing at least a user ID and a password entered in the login screen to the file management server 400 (Step S102).

In the file management server 400, upon receiving the login request from the client terminal 500, the login control unit 411 authenticates the validity of the user by comparing a combination of the user ID and the password contained in the login request with the verification data stored in the storage unit 46 (Step S111).

As a result of the authentication at Step S111, when determining that the combination of the user ID and the password contained in the login request do not match the verification data stored in the storage unit 46, that is, when determining that the user is not a valid user (No at Step S112), the login control unit 411 returns response information indicating that the login is denied to the client terminal 500 that has sent the login request (Step S113), and process control ends.

On the other hand, at Step S112, when determining that the combination of the user ID and the password contained in the login request match the verification data stored in the storage unit 46, that is, when determining that the user is a valid user (Yes at Step S112), the login control unit 411 returns response information indicating that the login is permitted to the client terminal 500 that has sent the login request (Step S114), and process control proceeds to Step S115.

In the client terminal 500, the login processing unit 511 receives the response information from the file management server 400 and determines whether the response information indicates that the login is permitted (Step S103). When it is determined that the response information indicates that the login is denied (No at Step S103), process control returns to Step S101 and the login processing unit 511 re-displays the login screen on the display unit 55. At this time, it is possible to display information indicating that at least one of the user ID and the password that have been entered is wrong on the display unit 55. On the other hand, when the response information indicates that the login is permitted (Yes at Step S103), process control proceeds to Step S104.

In the file management server 400, when the login control unit 411 determines that the user is a valid user, the file managing unit 412 reads, from the storage unit 46, the setting information (place map information, etc.) corresponding to the user ID that is contained in the login request (Step S115), and sends the read setting information to the client terminal 500 that has sent the login request (Step S116). When the user of the client terminal 500 is invited to a shared place, there occurs a difference between a placeID name contained in the place map information ("Z" in <placeID="Z">) and a folder name of the placeID folder containing a member list in which the user ID of this user is registered, which will be explained later.

In the client terminal 500, upon receiving the setting information from the file management server 400, the display control unit 512 stores the received setting information in the RAM 53 or the storage unit 56 by using the tree structure as shown in FIG. 3 (Step S104). Then, the display control unit 512 performs a place-map-screen display process based on the setting information stored at Step S104 to display the place map screen as shown in FIG. 9 on the display unit 55 (Step S105).

Figure 11:
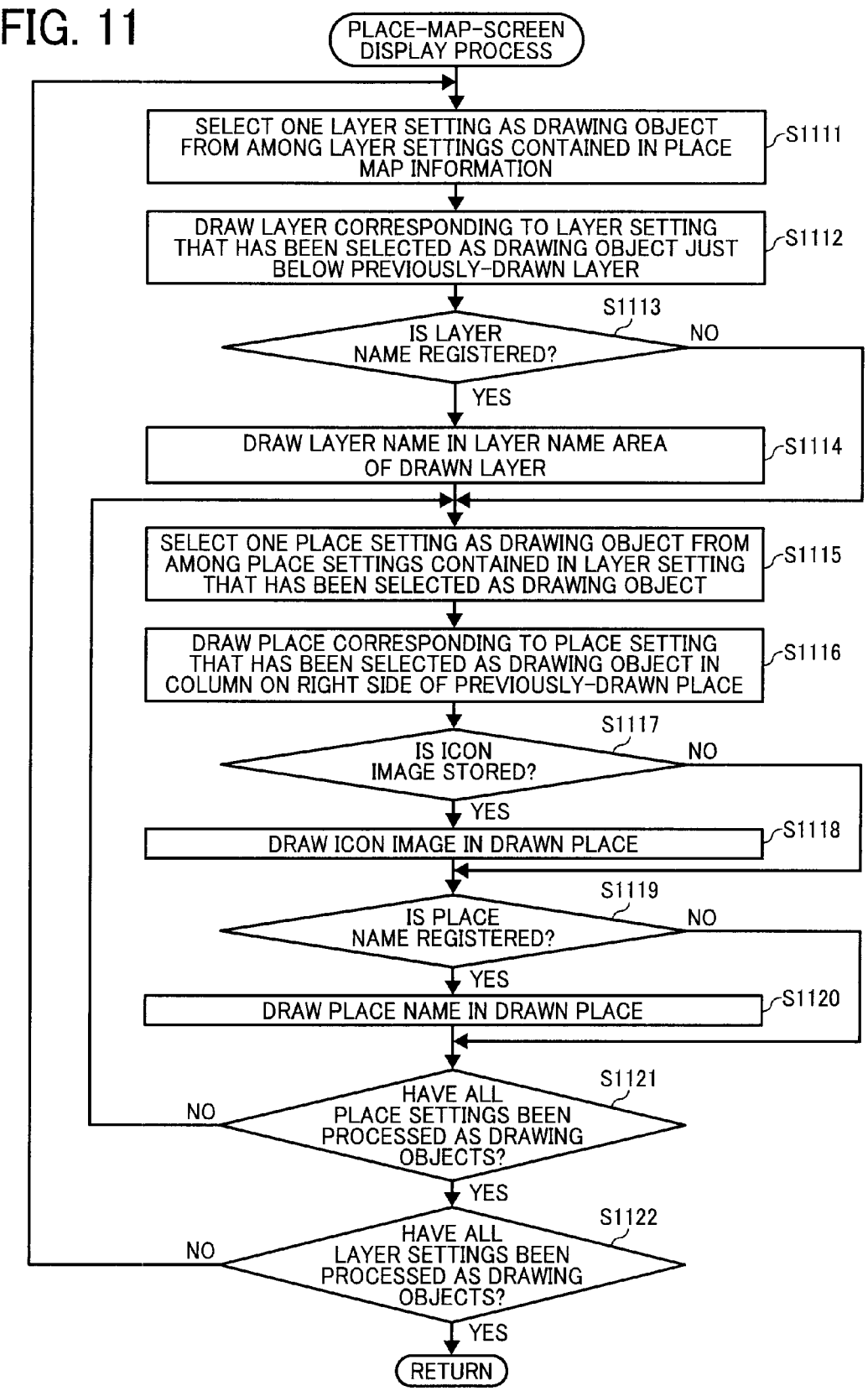
FIG. 11 is a flowchart of a procedure of a place-map-screen display process.

FIG. 11 is a flowchart of a procedure of the place-map-screen display process. The display control unit 512 selects one of the layer settings 201 as a drawing object from among the layer settings 201 contained in the place map information (Step S1111). According to the present embodiment, it is assumed that the layer settings 201 are sequentially selected as the drawing object in order from top to bottom in the place map information; however, the present invention is not limited to this example.

The display control unit 512 then draws a layer corresponding to the layer setting 201 that has been selected as the drawing object just below a previously-drawn layer in the place view screen (Step S1112). At the initial time when no layers have been drawn, a layer as the drawing object is drawn in a predetermined position in the display screen.

Then, the display control unit 512 determines whether a layer name is registered in the layer setting 201 as the drawing object. When it is determined that the layer name is not registered (No at Step S1113), process control directly proceeds to Step S1115. On the other hand, at Step S1113, when determining that the layer name is registered (Yes at Step S1113), the display control unit 512 draws the layer name in the layer name area L1 of the layer drawn at Step S1112 (Step S1114), and process control proceeds to Step S1115.

The display control unit 512 selects one of the place settings 202 as a drawing object from among the place settings 202 contained in the layer setting 201 that has been selected as the drawing object (Step S1115). According to the present embodiment, it is assumed that the place settings 202 are sequentially selected in order from top to bottom in the layer setting 201; however, the present invention is not limited to this example.

The display control unit 512 then draws a place corresponding to the place setting 202 that has been selected as the drawing object in a column on the right side of a previously-drawn place in the layer drawn at Step S1112 (Step S1116). At the initial time when no places have been drawn, a place as the drawing object is drawn in a predetermined position in the layer.

The display control unit 512 then determines whether an icon image is stored in the "placeID" folder corresponding to the place setting 202 as the drawing object (Step S1117). When it is determined that the icon image is not stored (No at Step S1117), process control directly proceeds to Step S1119. On the other hand, when determining that the icon image is stored (Yes at Step S1117), the display control unit 512 draws the icon image in the place drawn at Step S1116 (Step S1118), and process control proceeds to Step S1119.

At Step S1119, the display control unit 512 determines whether a place name is registered in the place setting 202 as the drawing object. When it is determined that the place name is not registered (No at Step S1119), process control directly proceeds to Step S1121. On the other hand, at Step S1119, when determining that the place name is registered (Yes at Step S1119), the display control unit 512 draws the place name in the place drawn at Step S1116 (Step S1120), and process control proceeds to Step S1121.

At Step S1121, the display control unit 512 determines whether all the place settings 202 contained in the layer setting 201 as the drawing object have been processed as the drawing objects (Step S1121). When it is determined that there is the place setting 202 that has not been processed (No at Step S1121), process control returns to Step S1115 to select the unprocessed place setting 202 as the drawing object.

At Step S1121, when determining that all the place settings 202 contained in the layer setting 201 as the drawing object have been processed as the drawing objects (Yes at Step S1121), the display control unit 512 determines whether all the layer settings 201 contained in the place map information have been processed as the drawing objects (Step S1122). When it is determined that there is the layer setting 201 that has not been processed (No at Step S1122), process control returns to Step S1111 to select the unprocessed layer setting 201 as the drawing object. On the other hand, at Step S1122, when it is determined that all the layer settings 201 have been processed as the drawing objects (Yes at Step S1122), process control proceeds to Step S106 of FIG. 10.

At Step S106 of FIG. 10, while the place map screen is being displayed, the setting-change receiving unit 513 keeps monitoring whether operation for instructing to change setting content is input. When determining that operation for instructing to change the setting content is input (Yes at Step S106), the setting-change receiving unit 513 sends to the file management server 400 a setting change request containing at least information for instructing the operation contents and the user ID of the user who is currently logging in (Step S107).

In the file management server 400, upon receiving the setting change request from the client terminal 500, the setting changing unit 413 identifies from the storage unit 46 the setting information corresponding to the user ID contained in the setting change request (Step S117). Then, the setting changing unit 413 updates various types of the setting information identified at Step S117 based on the operation contents contained in the setting change request (Step S118), and performs a place-matrix reconfiguration process on the place map information corresponding to the user ID (Step S119).

Figure 12:
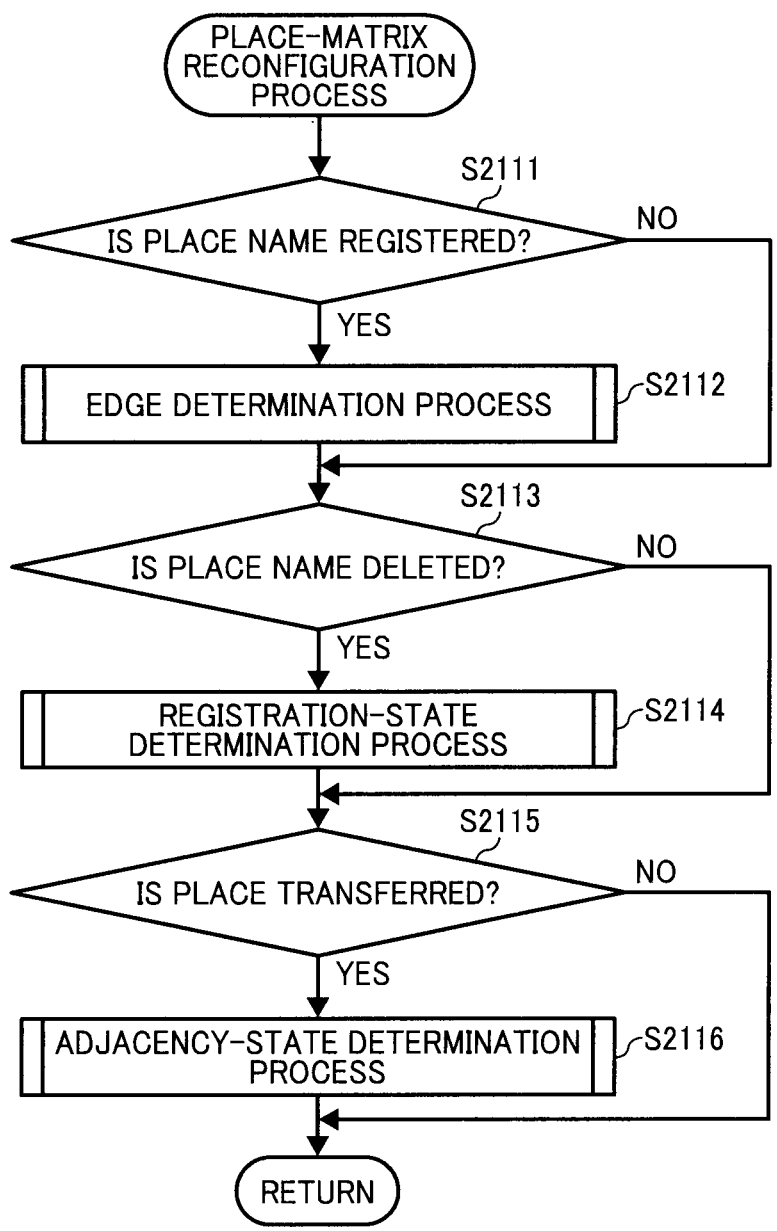
FIG. 12 is a flowchart of a procedure of a place-matrix reconfiguration process.

FIG. 12 is a flowchart of a procedure of the place-matrix reconfiguration process. The place-matrix reconfiguring unit 414 determines whether a place name is registered by a process at Step S2111. When it is determined that a process other than a process for registering the place name is performed (No at Step S2111), process control proceeds to Step S2113.

On the other hand, at Step S2111, when determining that the place name is registered (Yes at Step S2111), the place-matrix reconfiguring unit 414 performs an edge determination process based on the place setting of the place for which the place name has been registered (Step S2112).

Figure 13:
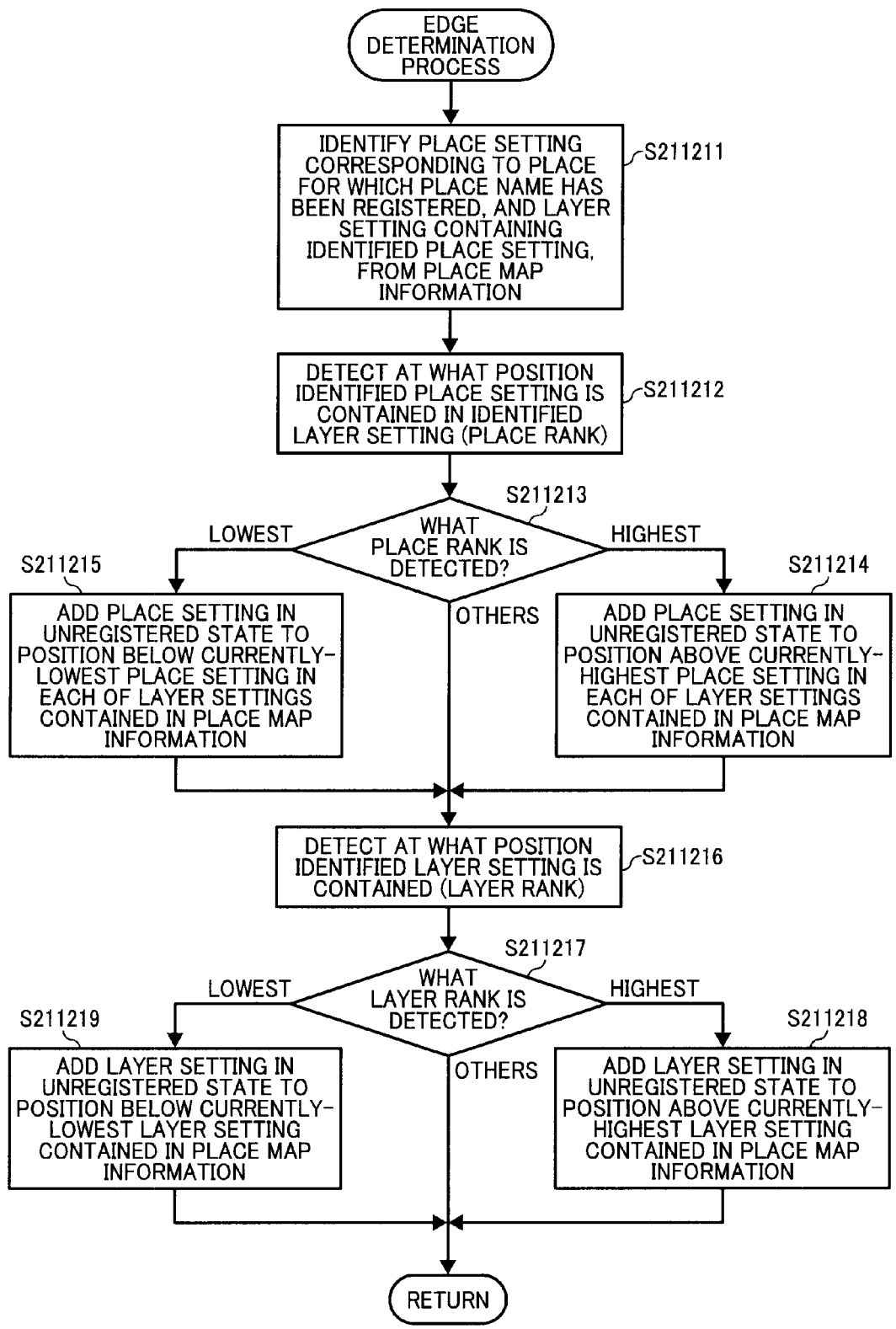
FIG. 13 is a flowchart of a procedure of an edge determination process.

FIG. 13 is a flowchart of a procedure of the edge determination process performed at Step S2112. The place-matrix reconfiguring unit 414 identifies the place setting 202 corresponding to the place for which the place name has been registered, and the layer setting 201 containing this place setting 202, from the place map information (Step S211211).

Then, the place-matrix reconfiguring unit 414 detects at what position the place setting 202 identified at Step S211211 is contained in the layer setting 201 identified at Step S211211, that is, detects a rank of the place setting 202 (Step S211212). Hereinafter, the rank detected at Step S211212 is referred to as "a place rank".

Then, the place-matrix reconfiguring unit 414 checks the place rank detected at Step S211212. When determining that the place rank is the highest (HIGHEST at Step S211213), the place-matrix reconfiguring unit 414 adds the place setting 202 in the unregistered state to a position above the place setting 202 that is currently at the highest position in each of the layer settings 201 contained in the place map information (Step S211214), and process control proceeds to Step S211216.

When determining that the place rank is the lowest (LOWEST at Step S211213), the place-matrix reconfiguring unit 414 adds the place setting 202 in the unregistered state to a position below the place setting 202 that is currently at the lowest position in each of the layer settings 201 contained in the place map information (Step S211215), and process control proceeds to Step S211216.

When it is determined that the place rank is neither the highest nor the lowest (OTHERS at Step S211213), process control directly proceeds to Step S211216.

Then, the place-matrix reconfiguring unit 414 detects at what position the layer setting 201 identified at Step S211211 is contained in the place map information, that is, detects a rank of the layer setting 201 (Step S211216). Hereinafter, the rank detected at Step S211216 is referred to as "a layer rank".

Then, the place-matrix reconfiguring unit 414 checks the layer rank detected at Step S211216. When determining that the layer rank is the highest (HIGHEST at Step S211217), the place-matrix reconfiguring unit 414 adds the layer setting 201 in the unregistered state to a position above the layer setting 201 that is currently at the highest position in the place map information (Step S211218), and process control proceeds to Step S2113 of FIG. 12.

When determining that the layer rank is the lowest (LOWEST at Step S211217), the place-matrix reconfiguring unit 414 adds the layer setting 201 in the unregistered state to a position below the layer setting 201 that is currently at the lowest position in the place map information (Step S211219), and process control proceeds to Step S2113 of FIG. 12.

When it is determined that the layer rank is neither the highest nor the lowest (OTHERS at Step S211217), process control directly proceeds to Step S2113 of FIG. 12.

At Step S2113 of FIG. 12, the place-matrix reconfiguring unit 414 determines whether the place name is deleted. When it is determined that the operation other than deletion of the place name is performed (No at Step S2113), process control proceeds to Step S2115.

On the other hand, at Step S2113, when determining that the place name is deleted (Yes at Step S2113), the place-matrix reconfiguring unit 414 performs a registration-state determination process based on the place setting 202 for which the place name has been deleted (Step S2114).

Figure 14:
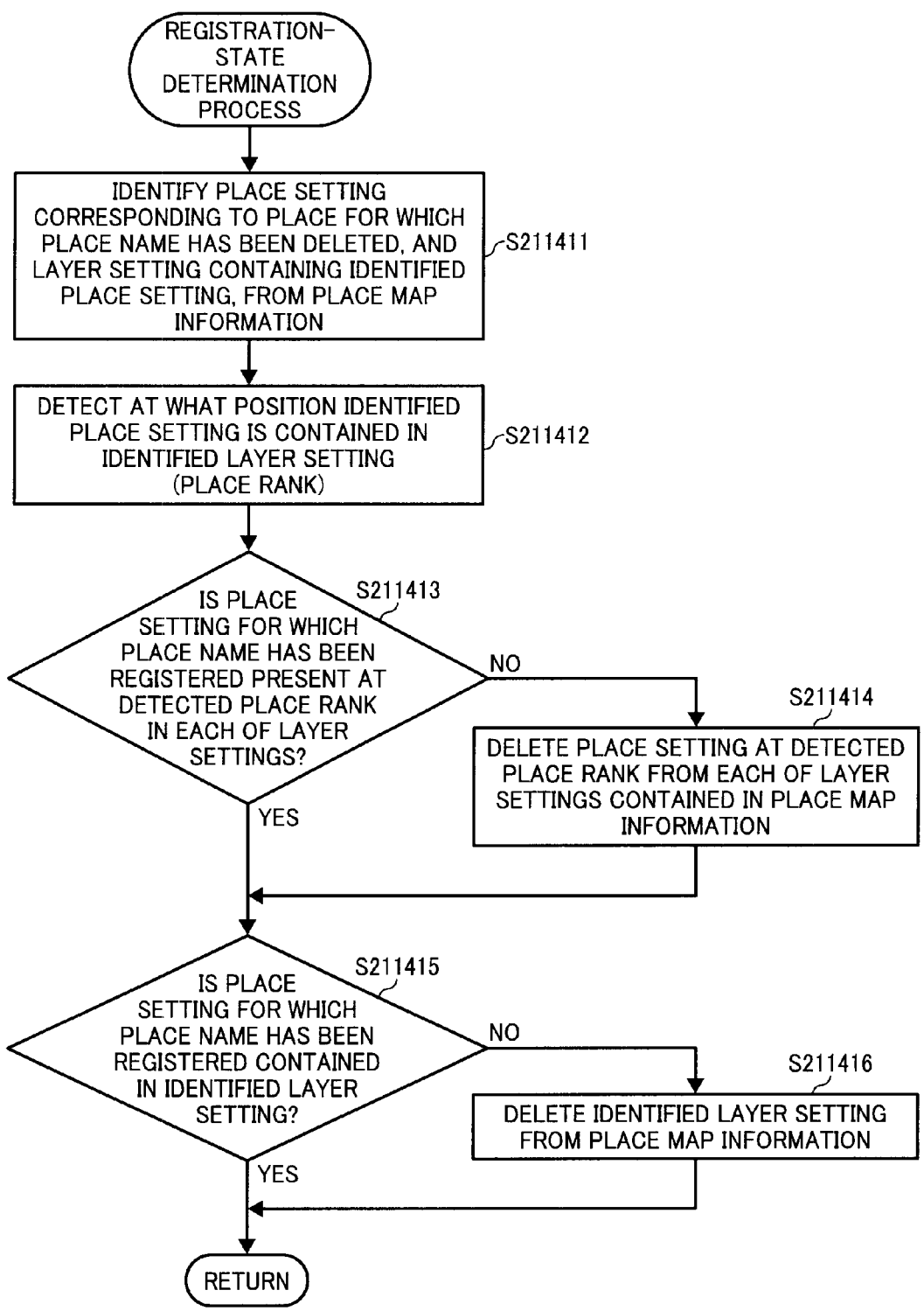
FIG. 14 is a flowchart of a procedure of a registration-state determination process.

FIG. 14 is a flowchart of a procedure of the registration-state determination process. The place-matrix reconfiguring unit 414 identifies the place setting 202 corresponding to the place for which the place name has been deleted, and the layer setting 201 containing this place setting 202, from the place map information (Step S211411).

Then, upon detecting the position of the place setting 202 identified at Step S211411 in the layer setting 201 that has been identified at Step S211411, that is, upon detecting the place rank of the place setting 202 (Step S211412), the place-matrix reconfiguring unit 414 determines whether the place setting 202 for which the place name has been registered is present at the detected place rank in each of the layer settings 201 (Step S211413). When it is determined that the place setting 202 for which the place name has been registered is present (Yes at Step S211413), process control proceeds to Step S211415.

On the other hand, when determining that the place setting 202 for which the place name has been registered is not present (No at Step S211413), the place-matrix reconfiguring unit 414 deletes the place setting 202 at the detected place rank from each of the layer settings 201 contained in the place map information (Step S211414), and process control proceeds to Step S211415.

Then, the place-matrix reconfiguring unit 414 determines whether the place setting 202 for which the place name has been registered is contained in the layer setting 201 identified at Step S211411 (Step S211415). When it is determined that the place setting 202 for which the place name has been registered is contained (Yes at Step S211415), process control directly proceeds to Step S2115 of FIG. 12.

On the other hand, when determining that the place setting 202 for which the place name has been registered is not contained (No at Step S211415), the place-matrix reconfiguring unit 414 deletes the layer setting 201 identified at Step S211411 from the place map information (Step S211416), and process control proceeds to Step S2115 of FIG. 12.

At Step S2115 of FIG. 12, the place-matrix reconfiguring unit 414 determines whether a place is transferred. When it is determined that operation other than transfer of the place is performed (No at Step S2115), process control returns to Step S120 of FIG. 10.

On the other hand, at Step S2115, when determining that the place is transferred (Yes at Step S2115), the place-matrix reconfiguring unit 414 performs an adjacency-state determination process based on place settings respectively corresponding to the place as a transfer source and the place as a transfer destination (Step S2116).

Figure 15:
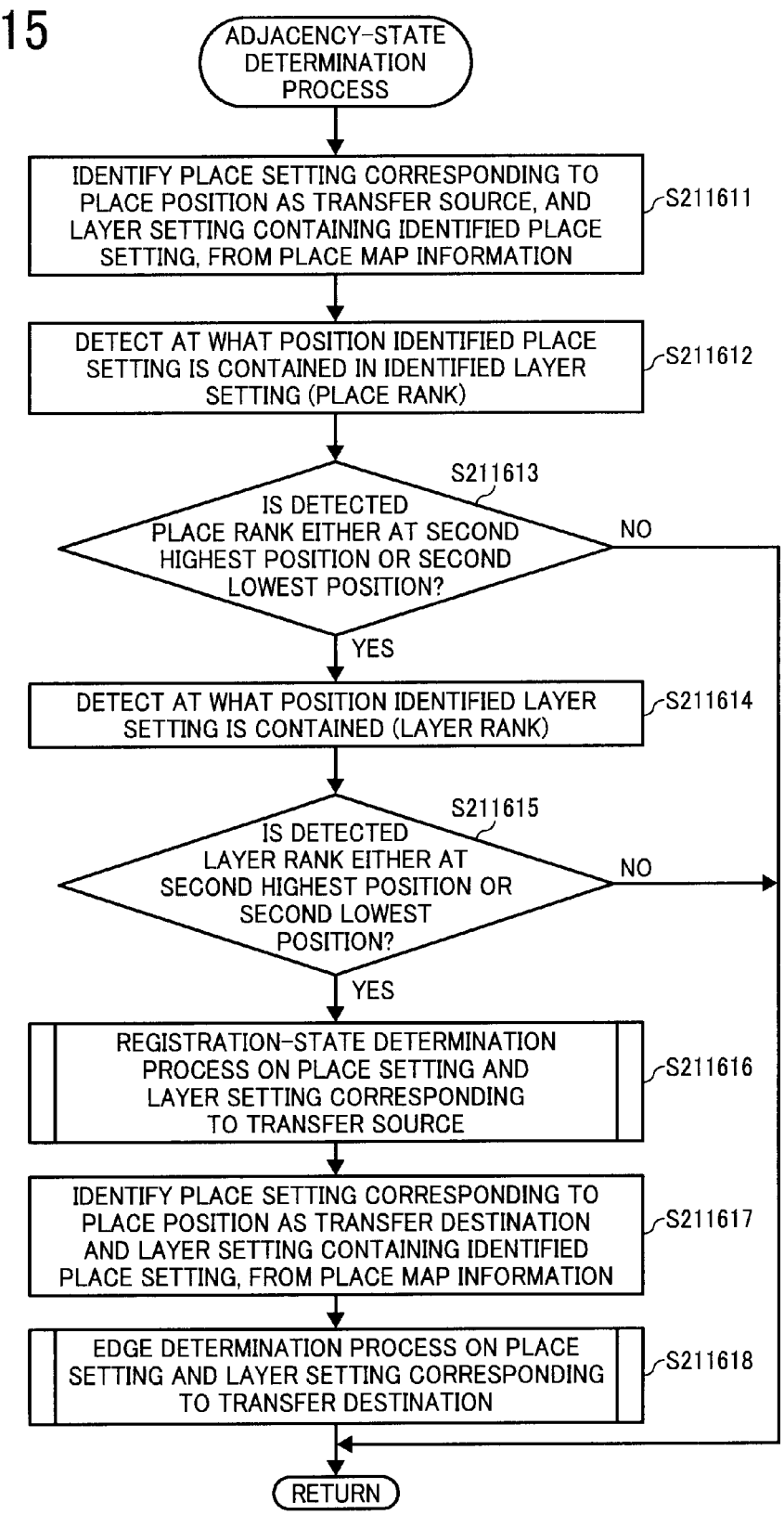
FIG. 15 is a flowchart of a procedure of an adjacency-state determination process.

FIG. 15 is a flowchart of a procedure of the adjacency-state determination process performed at Step S2116. The place-matrix reconfiguring unit 414 identifies the place setting 202 corresponding to a place position as the transfer source, and the layer setting 201 containing this place setting 202, from the place map information (Step S211611).

Then, the place-matrix reconfiguring unit 414 detects at what position the place setting 202 identified at Step S211611 is contained in the layer setting 201 identified at Step S211611, that is, detects the place rank of the place setting 202 (Step S211612).

The place-matrix reconfiguring unit 414 then checks the place rank detected at Step S211612, and determines whether the detected place rank is either at the second highest position or at the second lowest position (Step S211613). When it is determined that the detected place rank is neither at the second highest position nor at the second lowest position (No at Step S211613), process control directly returns to Step S120 of FIG. 10.

On the other hand, at Step S211613, when determining that the detected place rank is either at the second highest position or at the second lowest position (Yes at Step S211613), the place-matrix reconfiguring unit 414 detects at what position the layer setting 201 identified at Step S211611 is contained in the place map information, that is, detects the layer rank of the layer setting 201 (Step S211614).

Then, the place-matrix reconfiguring unit 414 checks the layer rank detected at Step S211614, and determines whether the detected layer rank is either at the second highest position or at the second lowest position (Step S211615). When it is determined that the detected layer rank is neither at the second highest position nor at the second lowest position (No at Step S211615), process control returns to Step S120 of FIG. 10.

On the other hand, at Step S211615, when determining that the detected layer rank is either at the second highest position or at the second lowest position (Yes at Step S211615), the place-matrix reconfiguring unit 414 performs the registration-state determination process on the place setting 202 and the layer setting 201 corresponding to the transfer source, which are identified at Step S211611 (Step S211616). The registration-state determination process performed at Step S211611 is the same as that performed at Step S2114 of FIG. 12, i.e., the process shown in FIG. 14, and therefore, the same explanation is not repeated.

Then, the place-matrix reconfiguring unit 414 identifies the place setting 202 corresponding to a place position as the transfer destination, and the layer setting 201 containing this place setting 202, from the place map information (Step S211617).

The place-matrix reconfiguring unit 414 then performs the edge determination process on the place setting 202 and the layer setting 201 corresponding to the transfer destination, which are identified at Step S211617 (Step S211618), and process control proceeds to Step S120 of FIG. 10. The edge determination process performed at Step S211618 is the same as that performed at Step S2112 of FIG. 12, i.e., the process shown in FIG. 13, and therefore, the same explanation is not repeated.

The place map information for which the setting content has been changed by the place-matrix reconfiguration process at Step S119 is re-read in the process at Step S120. As a result, the updated place map information is displayed on the display unit 55.

In this manner, the place settings 202 contained in each of the layer settings 201 are displayed as places, each of which serves as a unit for managing files, in the same hierarchy. When one place is selected from the displayed places, thumbnail images of files stored in association with the place setting 202 of the selected place are displayed on the display screen.

Consequently, a relationship between the units for managing files can be intuitively recognized, enabling to effectively manage the files. Furthermore, because the places are displayed in a matrix form, a relationship between the units for managing files can be viewed in an ordered manner. Therefore, the relationship between the units for managing the files can be more effectively and intuitively recognized.

After Step S119 of FIG. 10, the file managing unit 412 reads the setting information updated at Step S118 from the storage unit 46, and sends the updated setting information to the client terminal 500 that has sent the setting change request (Step S120), and then process control ends.

For example, at Step S106, when receiving an instruction to transfer a place named "music" that is contained in the layer named "favorite" to a place on the left side of the place named "home" in the place map screen shown in FIG. 9, the setting-change receiving unit 513 sends a setting change request containing at least information for instructing the transfer of the place position (e.g., information for specifying a transfer-source place and a transfer-destination place) and a user name "RIKO TARO" to the file management server 400.

In this case, at Step S117, the setting changing unit 413 exchanges the place setting of the transfer-source place and the place setting of the transfer-destination source with each other among the place settings associated with the user name "RIKO TARO" to thereby transfer the place. In the place-matrix reconfiguration process at Step S119, the same edge determination process as performed at Step S2116 is performed; however, in the present example, the place map is neither expanded nor reduced.

Furthermore, when receiving a request for registering a new place with a place name "movie" in a column on the right side of the place named "home" in succession to the above-mentioned operation, the setting-change receiving unit 513 sends a setting change request containing at least information for instructing to register the place with the place name "movie" in the requested position and the user name "RIKO TARO" to the file management server 400. When a place name is registered, it is possible to display a screen as shown in FIG. 16 for supporting registration of the place name by the setting-change receiving unit 513.

Figure 16:
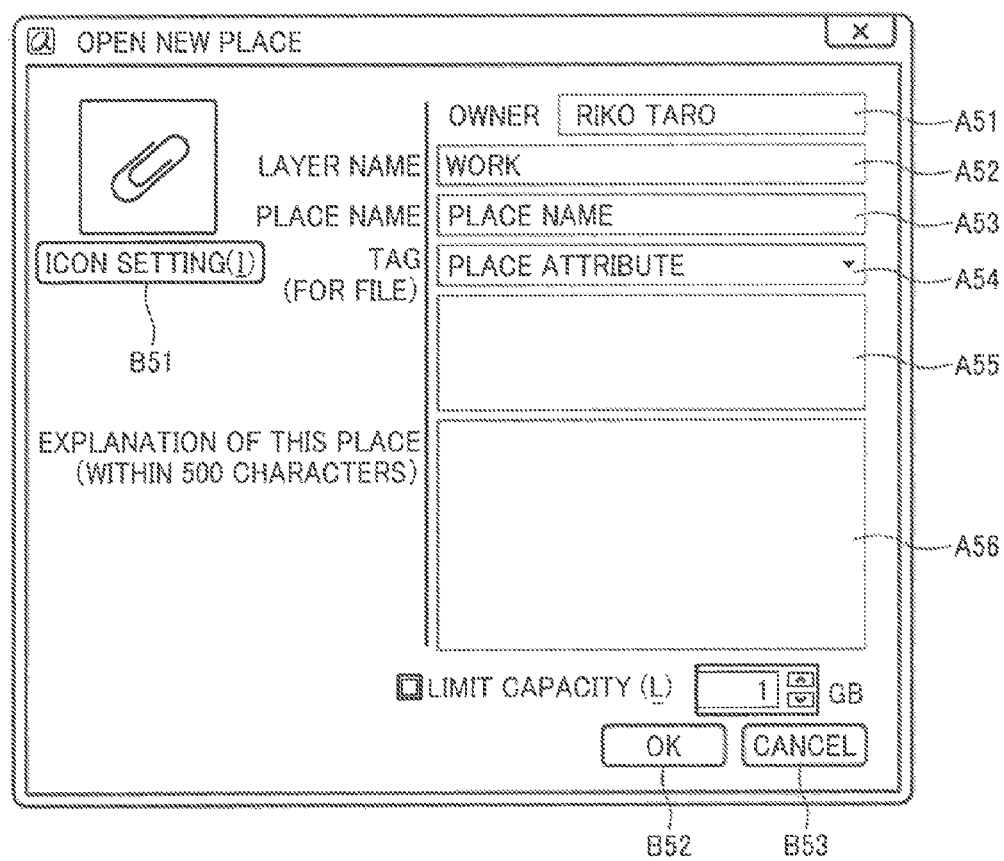
FIG. 16 is a diagram illustrating an example of a screen for supporting registration of a place name.

In FIG. 16, an area A51 is an area for displaying the user ID of an owner of the place. Specifically, the user ID of a user who is currently logging in is displayed in the area A51 in an uneditable manner. An area A52 is an area for displaying a layer name of a layer to which the place belongs. Specifically, the layer name of a layer containing the place for which change is instructed is displayed in the area A52 in an uneditable manner. An area A53 is an area for entering a place name. An area A54 is an area for entering a place attribute. When the place attribute is already set, the set place attribute is displayed in an area A55. An area A56 is an area for entering arbitrary character string such as a comment that the user wants to associate with the place.

A button B51 is a button for displaying a screen for supporting selection of an icon image to be displayed on the place. Specifically, when the button B51 is pressed, the setting-change receiving unit 513 displays the screen for supporting the selection of an icon image. In the screen, a user is allowed to select an arbitrary icon image from among image files stored in the storage unit 56 or icon images that are installed in advance. When an icon image is selected and then an OK button is pressed, contents entered and set in the screen are sent to the setting-change receiving unit 513. In this case, the setting-change receiving unit 513 adds the selected icon image to the setting change request and then sends this setting change request. When a cancel button is pressed, the setting-change receiving unit 513 closes the screen for supporting the selection of an icon image.

When a button B52 shown in FIG. 16 is pressed, contents entered and set in the screen is sent to the setting-change receiving unit 513. On the other hand, when a button B53 is pressed, the setting-change receiving unit 513 closes the screen. The screen shown in FIG. 16 is merely an example and a structure of the screen is not limited thereto.

Meanwhile, upon receiving the setting change request containing at least the information for instructing to register the place name "Movie" and the user name "RIKO TARO" from the client terminal 500, the setting changing unit 413 registers the place name "Movie" in the place setting at a place position for which the registration of the place name has been instructed, among the place settings associated with the user name "RIKO TARO", and also registers the user ID "RIKO TARO" as an owner in the member list of the same place, so that the information entered and set in the screen shown in FIG. 16 is reflected in the setting information. When the icon image for the place is contained in the setting change request, the icon image is stored in a predetermined location (under the placeID folder).

Figure 17:
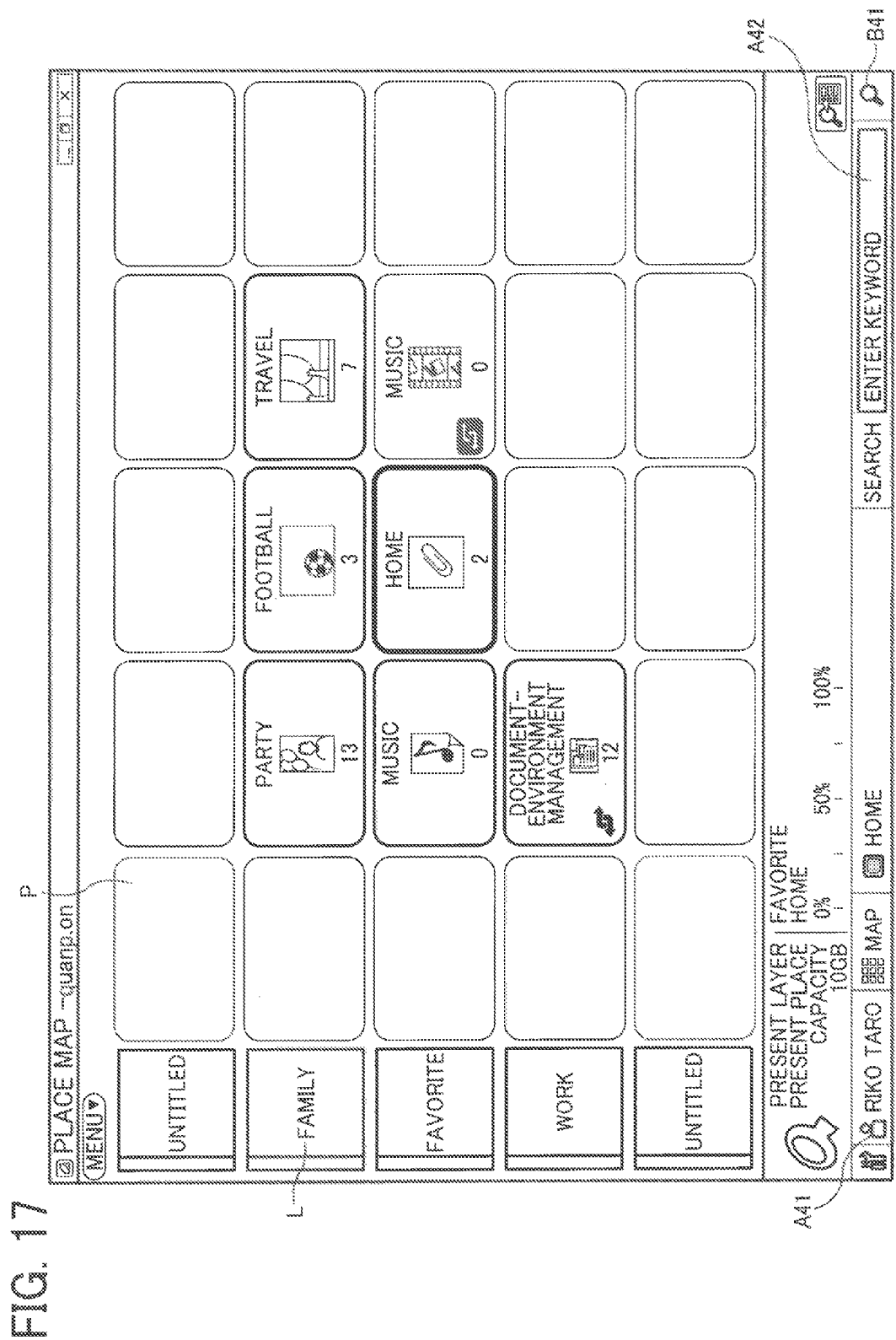
FIG. 17 is a diagram illustrating an example of the place map screen.

FIG. 17 is a diagram illustrating an example of the place map screen displayed on the display unit 55 by the display control unit 512 after the above-mentioned two operations have been performed. As shown in the figure, transfer of the place named "music" and registration of the place name "movie" are reflected in respective instructed places.

In this manner, the place information associated with each of the layer settings is displayed as a place image, which represents a unit for managing files, in the same hierarchy. Therefore, a relationship between the units for managing the files can be intuitively recognized, enabling to effectively manage the files. Furthermore, because the places are displayed in a matrix form, a relationship between the units for managing the files can be viewed in an ordered manner. Therefore, the relationship between the units for managing the files can be more effectively and intuitively recognized.

Setting of Share Members

Figure 18:
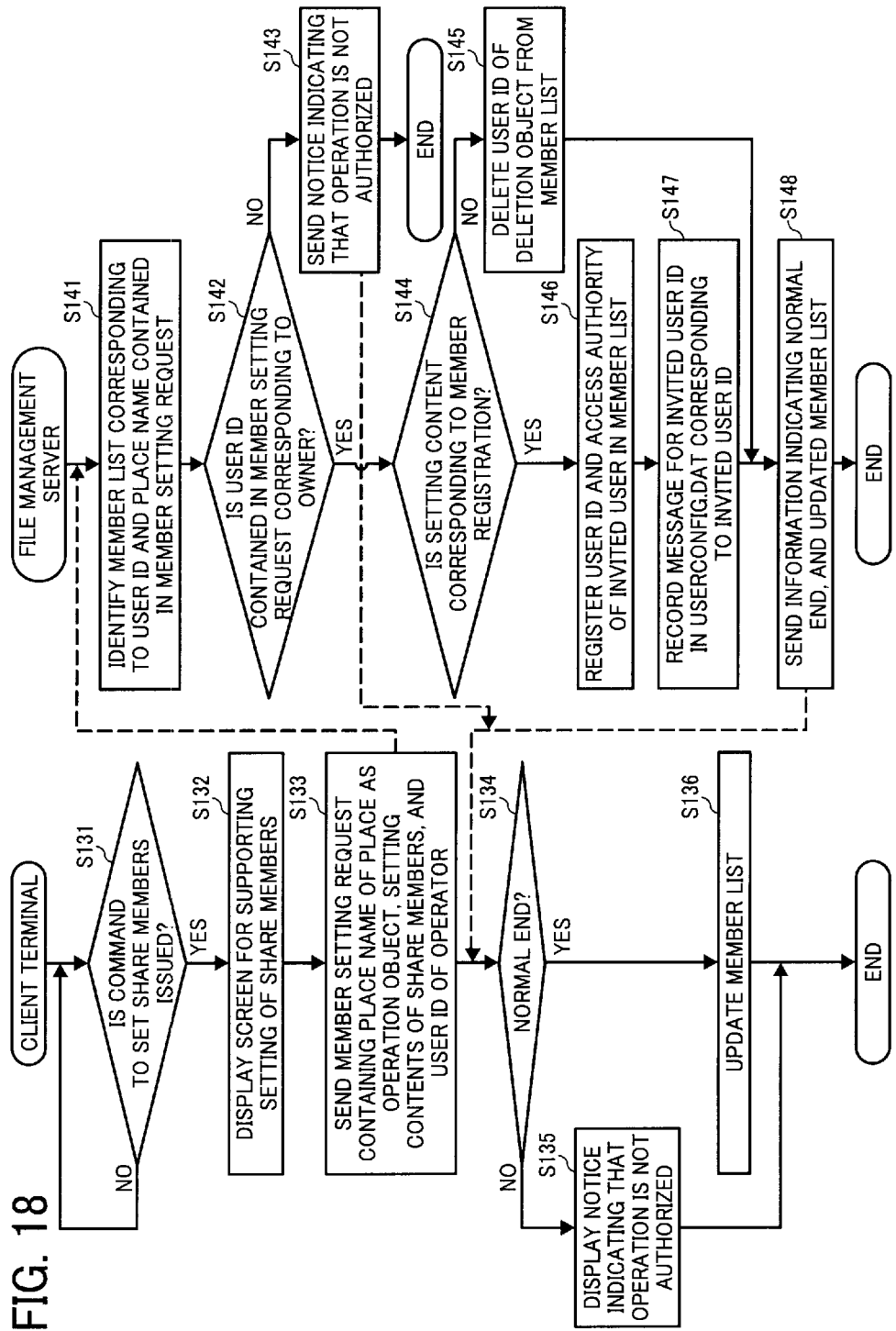
FIG. 18 is a flowchart of a procedure of a process for changing setting of a shared place by the file management server and the client terminal.

Operation for changing setting of the member list is described below. FIG. 18 is a flowchart of a procedure of a process for changing setting of a shared place by the file management server 400 and the client terminal 500. As a premise for the present process, it is assumed that the place map screen is already displayed on the display unit 55 of the client terminal 500.

The setting-change receiving unit 513 waits for reception of a command to change setting of share members of a specific place in the place map screen displayed on the display unit 55 (No at Step S131). The "share members" mean users who are registered in the member list of each place.

At Step S131, when determining that the command to change the setting of the share members is issued (Yes at Step S131), the setting-change receiving unit 513 displays a screen for supporting change of the setting of the share members on the display unit 55, based on the member list of the place for which the change of the setting of the share members has been instructed (Step S132).

Figure 19:
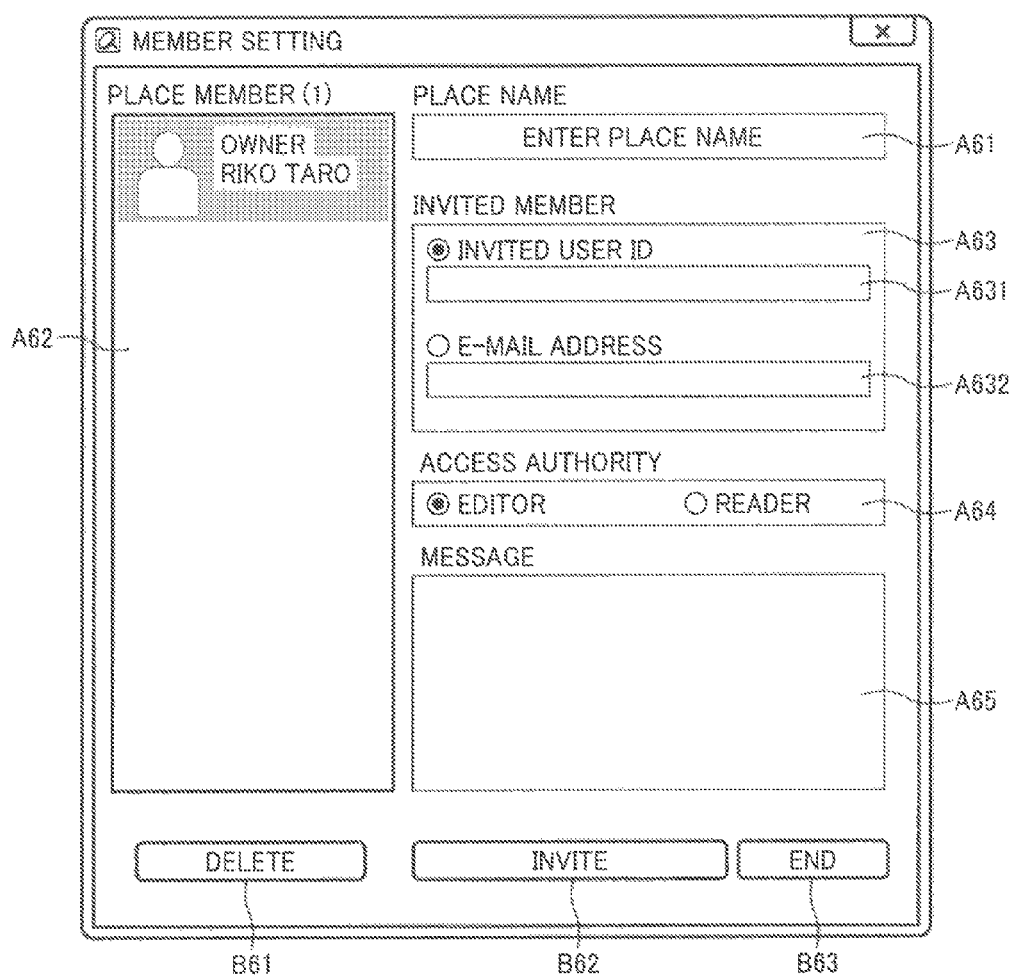
FIG. 19 is a diagram illustrating an example of a screen for supporting setting of a share member.

FIG. 19 is a diagram illustrating an example of the screen for supporting the setting of the share members, which is displayed at Step S132. In the figure, an area A61 is an area for displaying a place name of a place for which the setting of the share members is instructed. When a place name (placeID) is already registered in the place for which the setting of the share members is instructed, the setting-change receiving unit 513 displays the place name in the area A61. When the place name is not registered, it is possible to display a character string for assisting a user to enter a place name so that the place name will be registered at the same time when the setting of the share members is completed.

An area A62 is an area for displaying members (user IDs) who share the place for which the setting of the share members is instructed. The setting-change receiving unit 513 reads a member list of the place for which the setting of the share members is instructed, and displays a list of user IDs registered in the read member list in the area A62. A user of the client terminal 500 is allowed to select any user IDs displayed on the area A62. Specifically, the user can exclude a specified user from the share members of the place by using a button B61, which will be described later.

An area A63 is an area for entering an user ID of a user to be registered in the member list of the place displayed in the area A61, that is, to be invited as a share member of the place (hereinafter, referred to as "an invited user ID"). An area A631 is an area for entering the invited user ID. An area A632 is an area for entering an e-mail address of a user to be invited to the place. The user of the client terminal 500 can selectively use one of two types of invitation methods. When the invitation method using e-mail is selected, a message entered in an area A65, which will be described later, and information for inviting a user to be a share member of the place are sent to the user to be invited, by using an e-mail transmission system installed in the client terminal 500 or the file management server 400.

An area A64 is an area for setting access authority of the invited user for the place displayed in the area A61. The user of the client terminal 500 is allowed to set the access authority by selecting either one of radio buttons indicating "editor" and "reader", which are displayed in the area A64, for the user invited via the area A63 (the area A631). The "editor" means authority that allows a user to write (register and delete) and read files with respect to the place. The "reader" means authority that allows a user only to read files from the place.

The area A65 is an area for entering a message for the user to be invited. The user of the client terminal 500 is allowed to enter an arbitrary message in the area A65, and the entered message is sent to the user to be invited. In the example shown in FIG. 19, it is assumed that a message is limited to 500 words; however, it is not limited thereto.

The button B61 is a button for instructing to delete a specific user ID from the share members. Specifically, when a specific user ID is selected from among the user IDs displayed in the area A62 and then the button B61 is pressed, the setting-change receiving unit 513 sends a member deletion request containing a user ID of the user who is currently operating the client terminal 500, a place name of a place for which the setting of the share members is instructed, and a user ID to be deleted, to the file management server 400. When the selected user ID corresponds to the holder (the owner) of the place, it is possible to inactivate the button B61 to prevent deletion of this user ID.

A button B62 is a button for registering a user invited via the area A63 in the share members of the place displayed in the area A61. Specifically, when information is entered or setting is completed in the areas A63 (A631) to A65 and then the button B62 is pressed, the setting-change receiving unit 513 sends a member registration request containing a user ID of the user who is currently operating the client terminal 500 (hereinafter, referred to as "an operator user ID"), a place name of the place for which the setting of the share members is instructed, and contents entered and set in the areas A63 (A631) to A65, to the file management server 400.

When the invitation method using e-mail is selected in the area A63, an e-mail is sent to the invited user from the client terminal 500. When the file management server 400 has an e-mail transmission function, it is possible to send e-mail to the invited user by using this function. In this case, the setting-change receiving unit 513 sends the member registration request containing the operator user ID of the user who is currently operating the client terminal 500, a place name of the place for which the setting of the share members is instructed, and contents entered and set in the areas A632 to A65, to the file management server 400.

A button B63 is a button for instructing to end the setting of the share members. When the button B63 is pressed, the setting-change receiving unit 513 closes the screen shown in FIG. 19.

Returning to FIG. 18, upon receiving a command to delete or register a user ID with respect to a place as a share-member setting object, the setting-change receiving unit 513 sends a member setting request (the member deletion request or the member registration request) corresponding to contents of the command to the file management server 400 (Step S133).

In the file management server 400, upon receiving the member setting request from the client terminal 500, the setting changing unit 413 identifies a member list corresponding to the operator user ID of the client terminal 500 and a place name of the place as the setting object, which are contained in the member setting request, from the storage unit 56 (Step S141).

The setting changing unit 413 then determines whether the operator user ID of the client terminal 500, which is contained in the member setting request, is set as the owner in the member list identified at Step S141 (Step S142). When determining that the operator user ID is not set as the owner (No at Step S142), the setting changing unit 413 sends information indicating that operation is not authorized to the client terminal 500 that has sent the member setting request (Step S143), and process control ends.

At Step S142, when determining that the operator user ID is set as the owner (Yes at Step S142), the setting changing unit 413 determines whether the member setting request is the member deletion request or the member registration request based on the contents of the member setting request (Step S144).

At Step S144, when determining that the member setting request is the member deletion request (No at Step S144), the setting changing unit 413 deletes the user ID of a deletion object specified by the member deletion request, from the member list identified at Step S141 (Step S145), and process control proceeds to Step S148.

On the other hand, at Step S144, when determining that the member setting request is the member registration request (Yes at Step S144), the setting changing unit 413 registers the invited user ID specified by the member registration request and access authority of the invited user ID in the member list identified at Step S141, in an associated manner (Step S146). Furthermore, the setting changing unit 413 records a message for the invited user ID, which is contained in the member registration request, in "userconfig.dat" stored in the map managing section 210 corresponding to the invited user ID (Step S147), and process control proceeds to Step S148.

At subsequent Step S148, the file management server 400 sends information indicating that the change of the setting of the share members is normally ended and the member list updated at Step S145 or S146 to the client terminal 500 that has sent the member setting request (Step S148), and process control ends.

In the client terminal 500, the setting-change receiving unit 513 determines whether the information indicating that the change of the setting of the share members is normally ended is received from the file management server 400 (Step S134). When determining that information indicating that the operating authority is not granted is received (No at Step S134), the setting-change receiving unit 513 displays information indicating that operation for changing the setting of the share member is not authorized on the display unit 55 (Step S135), and process control ends.

On the other hand, at Step S134, upon receiving information indicating that the change of the setting of the share members is normally ended (Yes at Step S134), the setting changing unit 413 re-stores the updated member list that has been received together with the information in the RAM 53 or the storage unit 56 to thereby update the member list of the requested place (Step S136), and process control ends.

In the present process, the procedure is described in which the invited user ID is sent as the user registration request. However, when an e-mail address of an invited user is received, the following process is applicable to smoothly invite participation in the shared place. That is, when an e-mail address of each user is registered in corresponding "userconfig.dat", "userconfig.dat" containing an e-mail address identical to the e-mail address of the invited user is searched for, and then a user ID corresponding to the retrieved "userconfig.dat" is registered in the member list of the shared place.

When an e-mail address identical to the e-mail address of the invited user is not contained in any "userconfig.dat", there can be a configuration in which the e-mail address of the invited user is stored in association with the shared place where the user is invited, and, when an e-mail address of a new user who has made new user registration matches the stored e-mail address of the invited user, a user ID of the new user is registered in the member list of the place where the user is invited.

Participation in Shared Place

Figure 20:
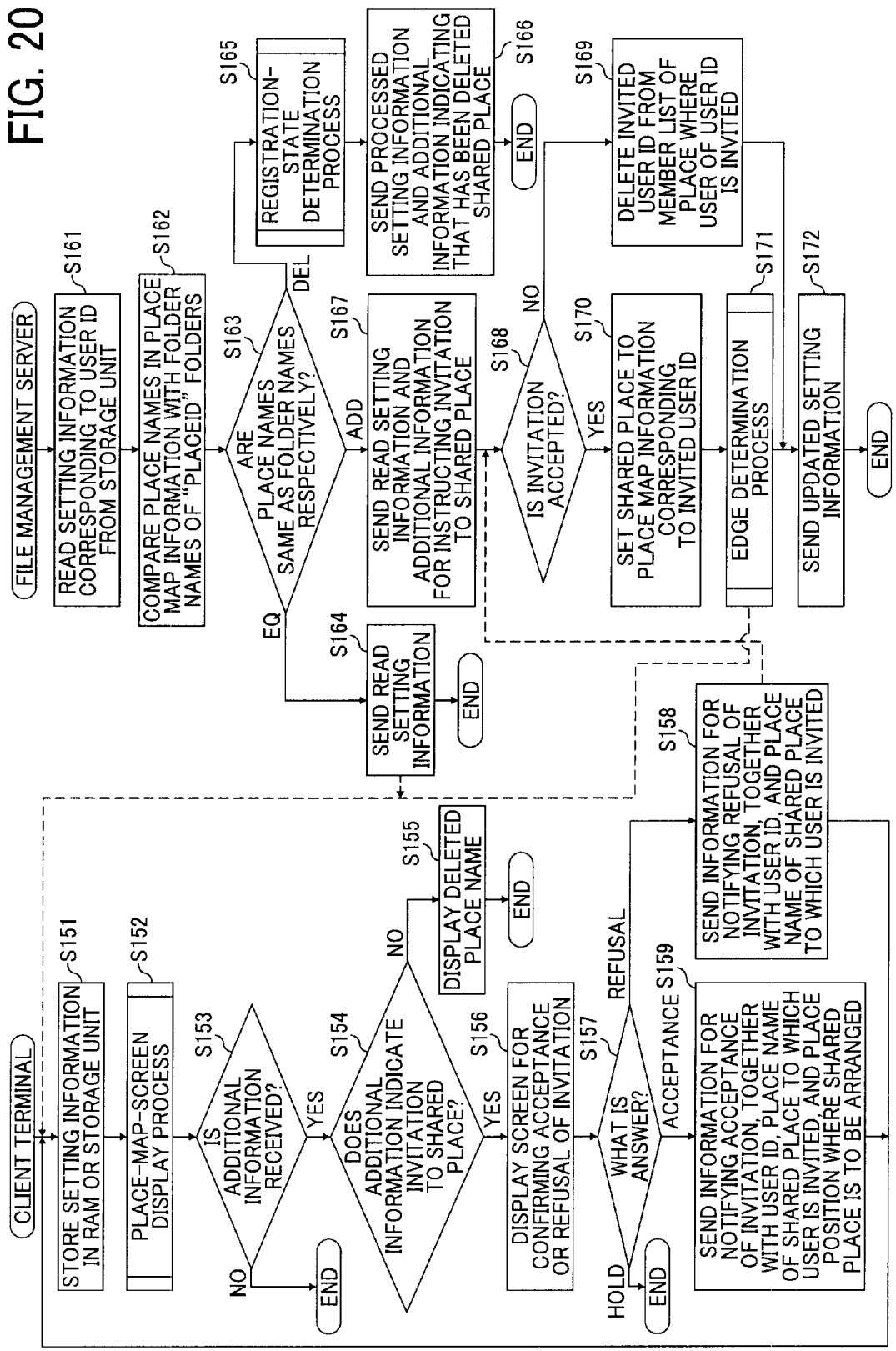
FIG. 20 is a flowchart of a procedure of a process for inviting participation in a shared place by the file management server and the client terminal.

Operation performed by the client terminal 500 that is operated by the user who has invited to the shared place, and the file management server 400 is descried below. FIG. 20 is a flowchart of a procedure of a process for inviting participation in the shared place by the file management server 400 and the client terminal 500. As a premise for the present process, it is assumed that a user ID of a user who operates the client terminal 500 is registered in advance in the file management server 400. It is also assumed that the file management server 400 has permitted login of the user who operates the client terminal 500. In the present process, a process continued from Step S114 of FIG. 10, which is performed by the file management server 400, and a process continued from Step S103 of FIG. 10, which is performed by the client terminal 500 are described.

In the file management server 400, when the login control unit 411 determines that the user is a valid user, the file managing unit 412 reads setting information corresponding to the user ID contained in the login request sent from the client terminal 500 (Step S161).

Then, the file managing unit 412 compares place names registered in the place map information read at Step S161 with folder names of "placeID" folders, each of which stores a member list having the user ID that is contained in the login request (Step S162), and determines whether the place names are respectively the same as the folder names (Step S163). In this case, a place name that is explicitly defined in the place map information is considered as an object to be compared with at Step S162.

At Step S163, when determining that the place names are respectively the same as the folder names (EQ at Step S163), the file managing unit 412 sends the setting information read at Step S161 to the client terminal 500 that has sent the login request (Step S164), and process control ends. The process performed at Steps S163 (EQ) and S164 are the same as those performed at Steps S115 and S116 (FIG. 10) as described above.

On the other hand, at Step S163, when determining that more place names are defined in the place map information than the folder names of the "placeID" folders (DEL at Step S163), the file managing unit 412 determines that the user ID contained in the login request has been deleted from the member list of the shared place or the shared place itself has been deleted, and causes the place-matrix reconfiguring unit 414 to perform the registration-state determination process on the place map information corresponding to the user ID (Step S165). The registration-state determination process performed at Step S165 is the same as the registration-state determination process performed at Step S2114 (FIG. 12), and therefore, the same explanation is not repeated.

Then, the file managing unit 412 sends the setting information read at step S161 and containing the place map information processed at Step S165, and additional information indicating that the shared place has been deleted, to the client terminal 500 that has sent the login request (Step S166), and process control ends. At this time, the additional information contains, as a place name of the shared place that has been deleted, the place name that is left over in the place map information as a result of the comparison at Step S163.

Furthermore, at Step S163, when determining that less place names are defined in the place map information than the folder names of the "placeID" folders (ADD at Step S163), the file managing unit 412 determines that the user ID contained in the login request is invited to a shared place. Then, the file managing unit 412 sends the setting information read at Step S161 and additional information for instructing invitation to the shared place to the client terminal 500 that has sent the login request (Step S167), and process control proceeds to Step S168. At this time, the additional information contains the folder name of the "placeID" folder that is left over as a result of the comparison at Step S163.

In the client terminal 500, upon receiving the setting information from the file management server 400, the display control unit 512 stores the setting information in the RAM 53 or the storage unit 56 (Step S151). Then, the display control unit 512 performs the place-map-screen display process based on the setting information stored at Step S151 to display the place map screen as shown in FIG. 9 on the display unit 55 (Step S152).

Then, the display control unit 512 determines whether the additional information is received together with the setting information (Step S153). When it is determined that the additional information is not received (No at Step S153), process control ends.

At Step S153, when determining that the additional information is received (Yes at Step S153), the display control unit 512 determines whether the additional information indicates invitation to the shared place or deletion of the shared place (Step S154).

At Step S154, when determining that the additional information indicates deletion of the shared place (No at Step S154), the display control unit 512 displays on the display unit 55 a screen for notifying a place name of the shared place that has been deleted based on the additional information (Step S155), and process control ends.

On the other hand, at Step S154, when determining that the additional information indicates invitation to the shared place (Yes at Step S154), the display control unit 512 displays on the display unit 55 a screen for confirming participation in the shared place based on the additional information, the "userconfig.dat" as the setting information stored in advance, and the member list of the shared place (Step S156).

Figure 21:
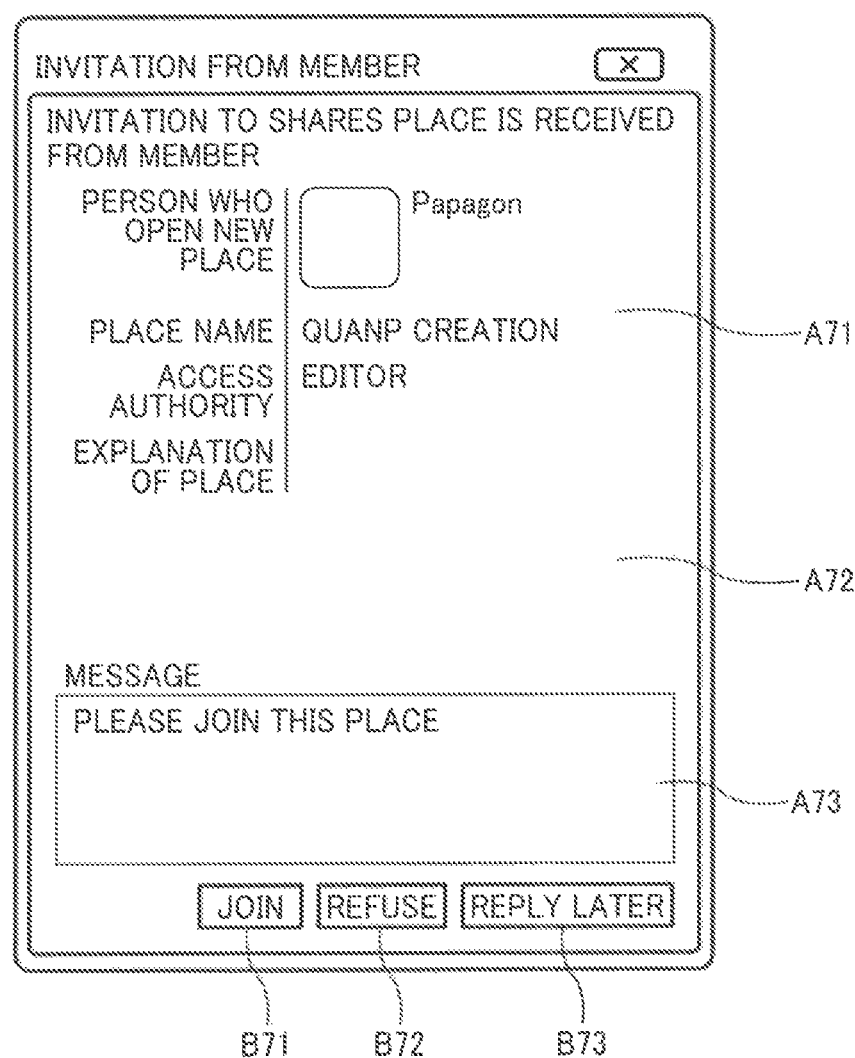
FIG. 21 is a diagram illustrating an example of a screen for confirming participation in a shared place.

FIG. 21 is a diagram illustrating an example of the screen for confirming the participation in the shared place. This screen is displayed on the display unit 55 at Step S156. In this screen, an area A71 is for displaying information about the shared place to which a user who operates the client terminal 500 is invited. The display control unit 512 displays the place name of the shared place, which is contained in the additional information, a user ID of the owner of the shared place (a person who opened the shared place), and an access authority of the invited user in the area A71, based on the member list of the shared place. An area A72 is for displaying information about the shared place, other than the information displayed in the area A71.

An area A73 is an area for displaying a message for the user (the invited user ID) who operates the client terminal 500. Specifically, information entered in the area A65 of FIG. 19 is displayed, that is, the display control unit 512 displays in the area A73 the message that has been written in the "userconfig.dat" by the owner of the shared place.

The invited user is allowed to notify whether to accept the invitation by pressing one of buttons B71 to B73 via the operating unit 54. The button B71 is a button for notifying acceptance of the invitation. When the button B71 is pressed, the user is continuously led to enter a place position where the shared place is to be arranged in the place map screen. Upon receiving a command indicating that the button B71 is pressed, the setting-change receiving unit 513 sends information for notifying the acceptance of the invitation and response information as information for specifying the user ID of the user who is operating the client terminal 500, the place name of the shared place to which the user is invited, and the place position where the shared place is to be arranged, to the file management server 400.

The button B72 is a button for notifying refusal of the invitation. Upon receiving a command indicating that the button B72 is pressed, the setting-change receiving unit 513 sends information for notifying the refusal of the invitation and response information as information for specifying the user ID of the user who is operating the client terminal 500 and the place name of the shared place to which the user is invited, to the file management server 400. The button B73 is a button for holding an answer. Upon receiving a command indicating that the button B73 is pressed, the setting-change receiving unit 513 closes the screen shown in FIG. 21.

At Step S157 of FIG. 20, when determining that the user has held an answer about acceptance of the invitation based on the screen displayed at Step S156 (HOLD at Step S157), the setting-change receiving unit 513 closes the screen displayed at Step S156, and process control ends.

Furthermore, at Step S157, when determining that the user has refused the invitation based on the screen displayed at Step S156 (REFUSAL at Step S157), the setting-change receiving unit 513 closes the screen displayed at Step S156, and sends the information for notifying the refusal of the invitation and the response information containing the user ID who is operating the client terminal 500 and the place name of the shared place to which the user is invited, to the file management server 400 (Step S158). Then, process control returns to Step S151, at which the display control unit 512 acquires the setting information that is sent from the file management server 400 in response to the response information.

Moreover, at Step S157, when determining that the user has accepted the invitation based on the screen displayed at Step S156 (ACCEPTANCE at Step S157), the setting-change receiving unit 513 closes the screen displayed at Step S156, and sends the information indicating the acceptance of the invitation and the response information containing the user ID who is operating the client terminal 500, the place name of the shared place to which the user is invited, and the place position where the shared place is to be arranged, to the file management server 400 (Step S159). Then, process control returns to Step S151, at which the display control unit 512 acquires the setting information that is sent from the file management server 400 in response to the response information.

In the file management server 400, upon receiving the response information from the client terminal 500, the setting changing unit 413 determines whether the response information indicates the acceptance of the invitation based on the information contained in the response information (Step S168). When determining that the response information indicates the refusal of the invitation (No at Step S168), the setting changing unit 413 deletes the user ID contained in the response information from the member list of the "placeID" folder corresponding to the place name contained in the response information (Step S169), and process control proceeds to Step S172.

On the other hand, at Step S168, when determining that the response information indicates the acceptance of the invitation (Yes at Step S168), the setting changing unit 413 identifies the place map information corresponding to the user ID contained in the response information from the map managing section 210, and sets the place name of the shared place to the place setting 202 at the place position where the shared place contained in the response information is to be arranged (Step S170).

Then, the setting changing unit 413 performs the edge determination process on the place map information for which the setting has been changed at Step S170 (Step S171), and process control proceeds to Step S172. The edge determination process performed at Step S171 is the same as the edge determination process performed at Step S2112 (FIG. 13), and therefore, the same explanation is not repeated.

At subsequent Step S172, the file managing unit 412 sends the setting information in which the setting has been changed, that is, the member list processed at Step S169 or the place map information processed at Steps s170 and S171, to the client terminal 500 that has sent the response information (Step S172), and process control ends. In the client terminal 500, upon receiving the setting information sent at Step S172, the display control unit 512 re-stores the received setting information in the RAM 53 or the storage unit 56 at Step S151, so that the setting information is updated.

In this manner, place images can be provided for each user ID, so that a user is allowed to manage files by using own place images. Furthermore, place images can be shared by a plurality of users, enabling to cope with operation such as exchanging of files. Moreover, a user who is invited to a shared place is allowed to select whether to accept the invitation to the shared place. Therefore, usability of the user can be improved.

Display of Place View Screen

Figure 22:
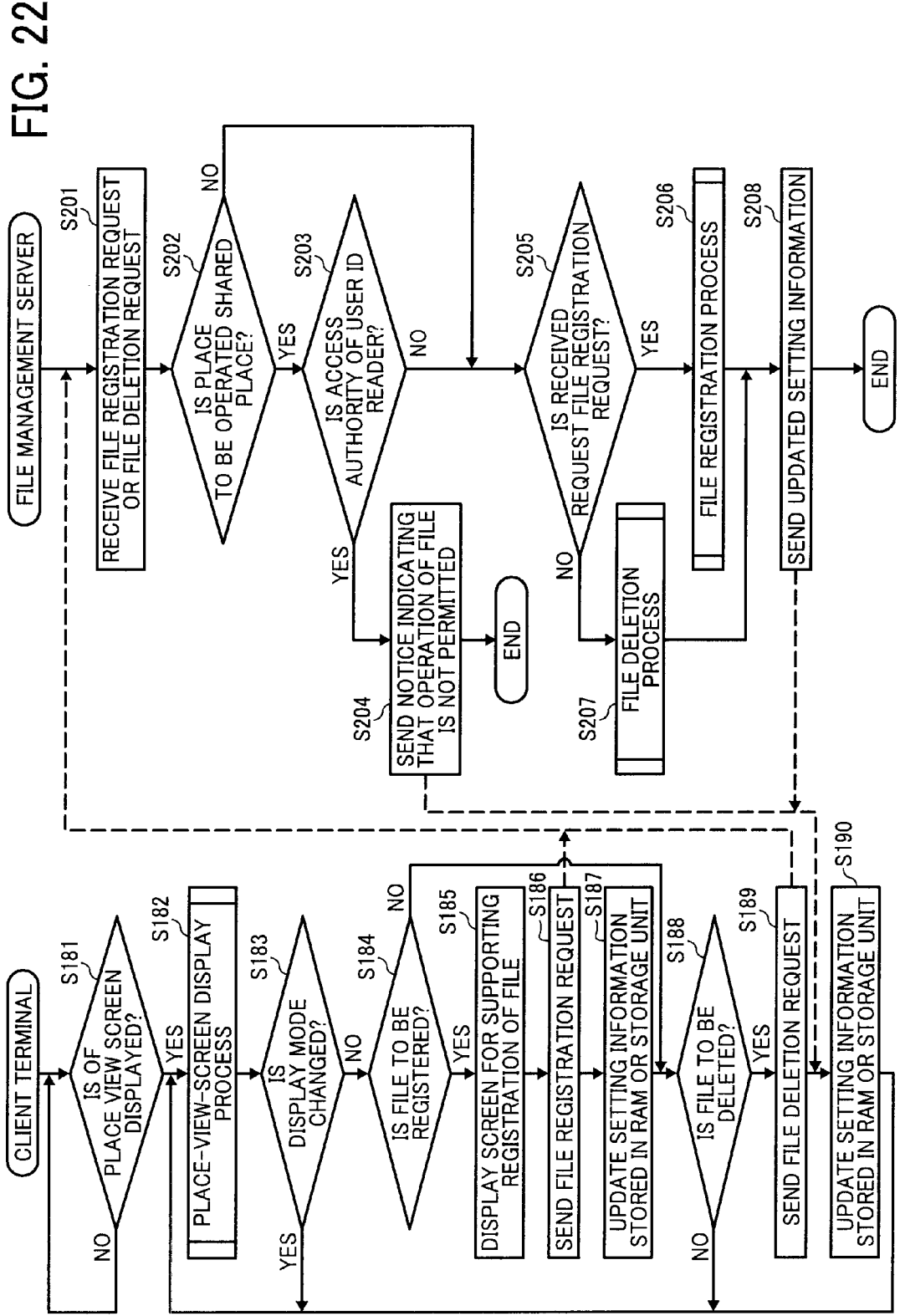
FIG. 22 is a flowchart of a procedure of a process for displaying a place view screen by the file management server and the client terminal.

Operation for displaying the place view screen is described below. FIG. 22 is a flowchart of a procedure of a process for displaying the place view screen by the file management server 400 and the client terminal 500. As a premise for the present process, it is assumed that the place map screen is already displayed on the display unit 55 of the client terminal 500.

The display control unit 512 waits for reception of a command to display a place view screen of a specific place among places displayed on the place map screen (No at Step S181). When determining that the command to display the place view screen is issued (Yes at Step S181), the display control unit 512 performs a place-view-screen display process by referring to a "placeID" folder corresponding to the place to be displayed in the place managing section 310 of the setting information stored in the RAM 53 or the storage unit 56 (Step S182).

Figure 23:
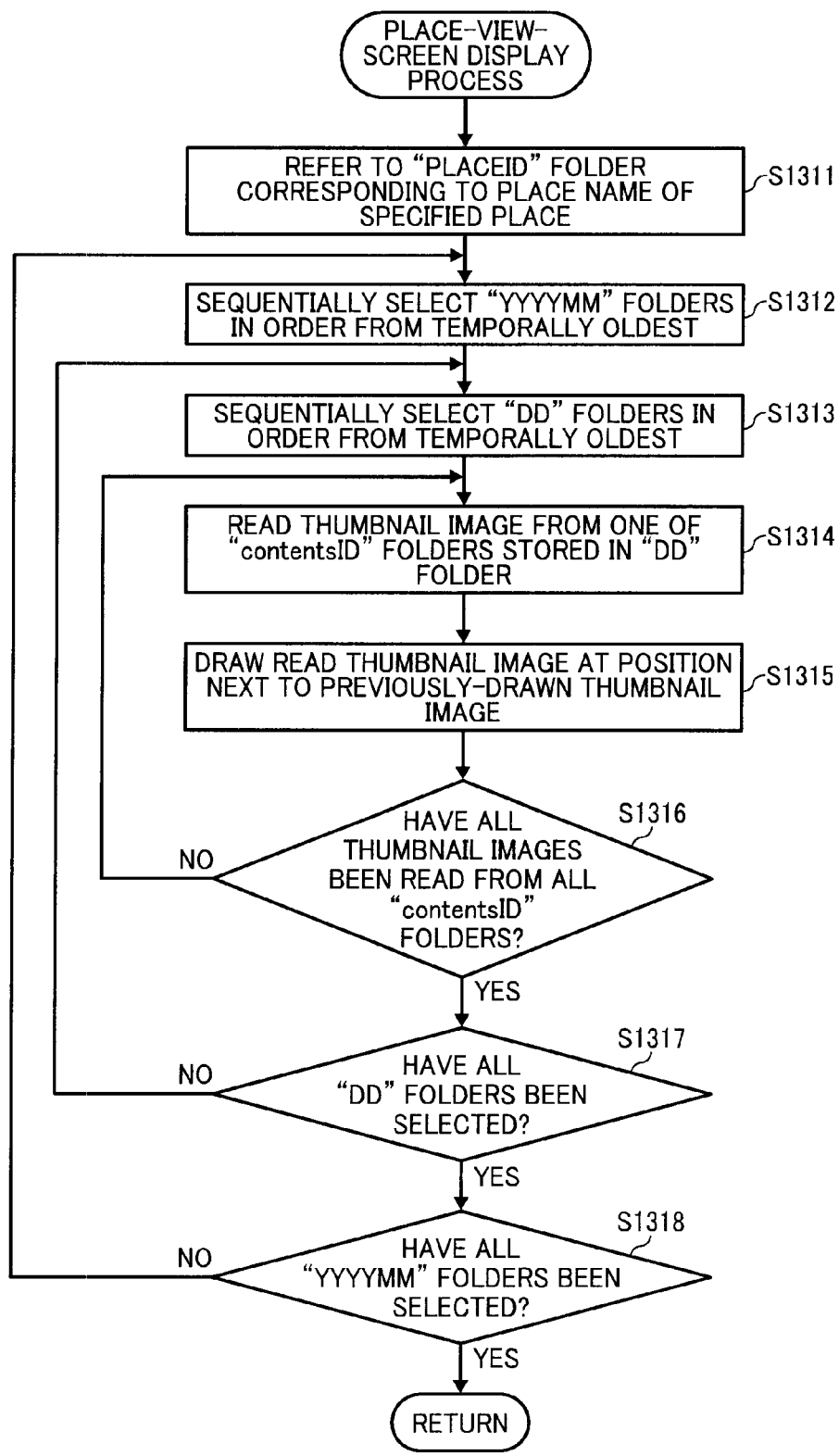
FIG. 23 is a flowchart of a procedure of a place-view-screen display process.

FIG. 23 is a flowchart of a procedure of the place-view-screen display process. The display control unit 512 refers to the "placeID" folder corresponding to a place name of the specified place (Step S1311).

Then, the display control unit 512 sequentially selects the "YYYYMM" folders in order from temporally oldest according to the year and the month indicated by these folders stored in the "placeID" folder (Step S1312). The display control unit 512 then sequentially selects the "DD" folders in order from temporally oldest according to the date indicated by these folders stored in the "YYYYMM" folder selected at Step S1312 (Step S1313).

The display control unit 512 reads a thumbnail image from one of the "contentsID" folders stored in the "DD" folder selected at Step S1313 (Step S1314), and draws the thumbnail image read at Step S1314 at a position next to a previously-drawn thumbnail image in the place view screen (Step S1315). At the initial time when no thumbnail images have been drawn, the read thumbnail image is drawn at a predetermined position in the place view screen.

Then, the display control unit 512 determines whether all the thumbnail images have been read from all the "contentsID" folders in the "DD" folder selected at Step S1313 (Step S1316). When it is determined that there is a "contentsID" folder that has not been processed (No at Step S1316), process control returns to Step S1314 to read a thumbnail image from the "contentsID" folder that has not been processed.

On the other hand, at Step S1316, when determining that all the thumbnail images have been read from all the "contentsID" folders (Yes at Step S1316), the display control unit 512 determines whether all the "DD" folders have been selected from the "YYYYMM" folder selected at Step S1312 (Step S1317). When it is determined that there is a "DD" folder that has not been processed (No at Step S1317), process control returns to Step S1313 to select the "DD" folder that has not been processed.

On the other hand, at Step S1317, when determining that all the "DD" folders have been selected (Yes at Step S1317), the display control unit 512 determines whether all the "YYYYMM" folders stored in the "placeID" folder referred to at Step S1311 have been selected (Step S1318). When it is determined that there is a "YYYYMM" folder that has not been processed (No at Step S1318), process control returns to Step S1312 to select the "YYYYMM" folder that has not been selected. On the other hand, at Step S1318, when it is determined that all the "YYYYMM" folders have been selected (Yes at Step S1318), process control returns to Step S183 of FIG. 22.

At Step S182, the display control unit 512 displays the place view screen. A display mode of the place-view screen is described in detail below.

Figure 24:
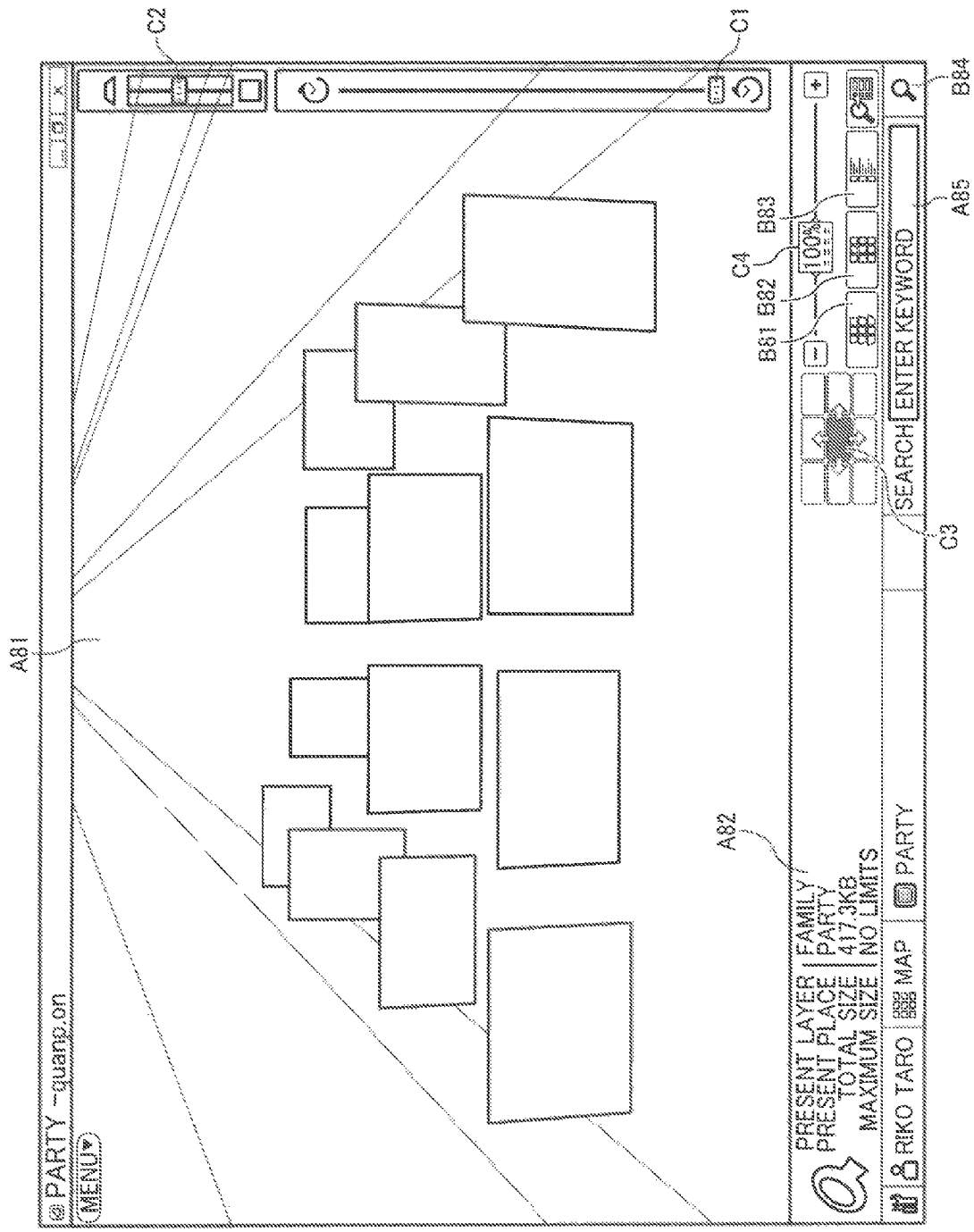
FIG. 24 is a diagram illustrating an example of a place view screen.

FIG. 24 is a diagram illustrating an example of the place view screen, and more specifically, the place view screen of a place named "party" among the places in the place map screen shown in FIG. 17.

An area A81 is an area for displaying thumbnail images of respective files registered in a place specified as a display object. In a display mode shown in FIG. 24, thumbnail images of respective files registered in the place specified as the display object are displayed as projected images in a three-dimensional array (in a steric manner) and in order of the date of registration of the files in the area A81.

A cursor C1 is a cursor button for switching an array of the thumbnail images displayed in the area A81. When the cursor C1 is moved upward or downward, the display control unit 512 moves the array of the thumbnail images displayed in the area A81 rearward (upward) or frontward (downward) with respect to the screen, so that temporally newer or older thumbnail images are displayed on the front face of the place view screen.

A cursor C2 is a cursor button for changing the angle.

A cursor C3 is a cursor button (a place switching button) for switching a place to be a display object in the place view screen. When the cursor C3 is moved to the left or to the right with respect to the screen, the display control unit 512 switches the display object to a place on the left side or on the right side of the place that is currently specified as the display object, based on an arrangement position of each place in the place map screen. Similarly, when the cursor C3 is moved upward or downward with respect to the screen, the display control unit 512 switches the display object to a place above or below the place that is currently specified as the display object, based on an arrangement position of each place in the place map screen. Then, the display control unit 512 performs the place-view-screen display process on the place that is newly specified as the display object.

With use of the cursor C3, upon receiving a command indicating that the cursor C3 is moved either upward, downward, to the left, or to the right while the place view screen is displayed, the display control unit 512 switches the display object from a current place to a place on a corresponding side of the current place depending on the received moving direction. Consequently, thumbnail images of respective files managed in each place can be displayed by operation based on the arrangement position of each place. Therefore, a user can intuitively recognize a relationship between the units for managing the files and can thereby effectively manage the files. It is assumed here that the cursor C3 moves in four directions, that is, upward, downward, to the left, and to the right. However, the cursor C3 can be configured such that it moves in eight directions including four oblique directions, such as a top-right direction or a bottom-left direction, and the above-mentioned four directions.

A cursor C4 is a cursor button for changing a display magnification of the place view screen displayed in the area A81. When the cursor C4 is moved to the left with respect to the place view screen (to the "−" side), the display control unit 512 reduces a display size of a group of thumbnail images displayed in the area A81 in proportion to the amount of move of the cursor C4. Similarly, when the cursor C4 is moved to the right with respect to the place view screen (to the "+" side), the display control unit 512 enlarges a display size of a group of the thumbnail images displayed in the area A81 in proportion to the amount of move of the cursor C4.

An area A82 is an area for displaying a layer name of a layer to which the place as the display object belongs, a place name of the place as the display object, a total size of files registered in the place as the display object, and the like. Such information is displayed by the display control unit 512 based on a folder name of a folder containing the thumbnail images displayed in the area A81, "content.xml" of the folder, the place map information, and the like.

Buttons B81 to B83 are buttons for changing display modes of the place view screen from one to the other. A user who operates the client terminal 500 can change the display modes of the place view screen from one to the other by selectively pressing one of the buttons B81 to B83.

The button B81 is a button for instructing to display a group of thumbnail images three-dimensionally. Upon receiving a command indicating that the button B81 is pressed, the display control unit 512 displays a group of thumbnail images in the place view screen in a three-dimensional display mode as shown in FIG. 24. In FIG. 24, an example is illustrated in which original files of the respective thumbnail images are image files. However, when original files are document files, such as text, contents of the text are displayed as the thumbnail images.

The button B82 is a button for instructing a display mode in which thumbnail images are displayed in a two-dimensional array. Upon receiving a command indicating that the button B82 is pressed, the display control unit 512 displays thumbnail images of respective files registered in a place as the display object, in a two-dimensional array in the area A81.

The button B83 is a button for instructing a display mode in which thumbnail images are displayed in a list format. Upon receiving a command indicating that the button B83 is pressed, the display control unit 512 displays a list of thumbnail images in the area A81.

An area A85 is an area for entering a search key to be a keyword for file search. A button B84 is a button for instructing to perform search by the search key entered in the area A85. When the button B84 is pressed, the search key entered in the area A85 is sent to the search-criteria receiving unit 514.

In a display process at Step S183 of FIG. 22, the display control unit 512 determines whether change of the display mode is instructed by the operation of pressing one of the buttons B81 to B83 (Step S183). When it is determined that the change of the display mode is instructed (Yes at Step S183), process control returns to Step S182, at which the display control unit 512 displays the place view screen in the instructed display mode.

Figure 25:
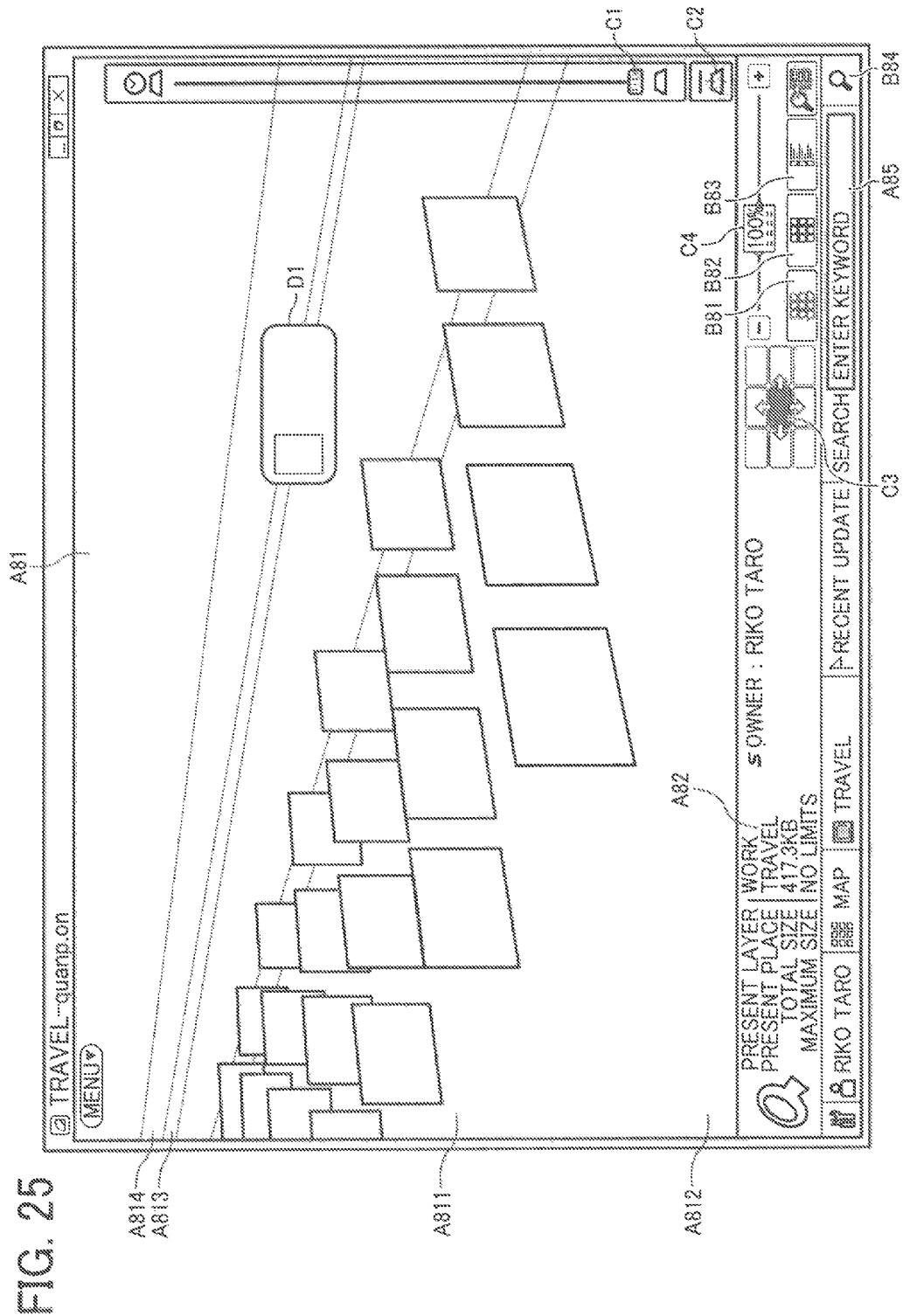
FIG. 25 is a diagram illustrating another example of the place view screen.

FIG. 25 is a diagram illustrating another example of the place view screen. In the figure, portions corresponding to those shown in FIG. 24 are denoted with the same reference symbols as those shown in FIG. 24. It is assumed that whether to display the screen shown in FIG. 24 or the screen shown in FIG. 25 is set in advance by a user via the operating unit 54. In the present screen, a background image (here, sky and cloud) is displayed in the entire area A81. Translucent lanes A811 to A814 are displayed on the background, and thumbnail images are displayed on the lane A811 that is located in the center of the screen. Furthermore, the cursor button C2 for changing a display angle of the thumbnail images displayed in the area A81 is arranged. When the cursor C2 is moved upward or downward with respect to the screen, the display control unit 512 moves a viewpoint position for displaying (drawing) the array of the thumbnail images in a horizontal direction or a vertical direction in proportion to the amount of move to thereby change the display angle. Here, images viewed from a right viewpoint compared to those of FIG. 24 are displayed.

Assuming that the thumbnail images displayed in the screen of FIG. 25 corresponds to a place having a place name "Bc" in the place map screen shown in FIG. 39, when a mouse pointer is put on the lane A813 on the right side of the lane A811 located in the center of the screen, a place name "Bd" of a place located on the right side of the place "Bc" and an image D1 as an icon of this place are displayed on the lane A813. In this state, when the mouse is clicked, the thumbnail images displayed on the lane A811 located in the center of the screen are changed from those corresponding to the files in the place named "Bc" to those corresponding to files in the place named "Bd". Similarly, when the mouse pointer is put on the lane A812 on the left side of the lane A811 located in the center of the screen, a place name "Bb" of a place located on the left side of the place "Bc" and an image as an icon of this place are displayed on the lane A812.

Figure 26:
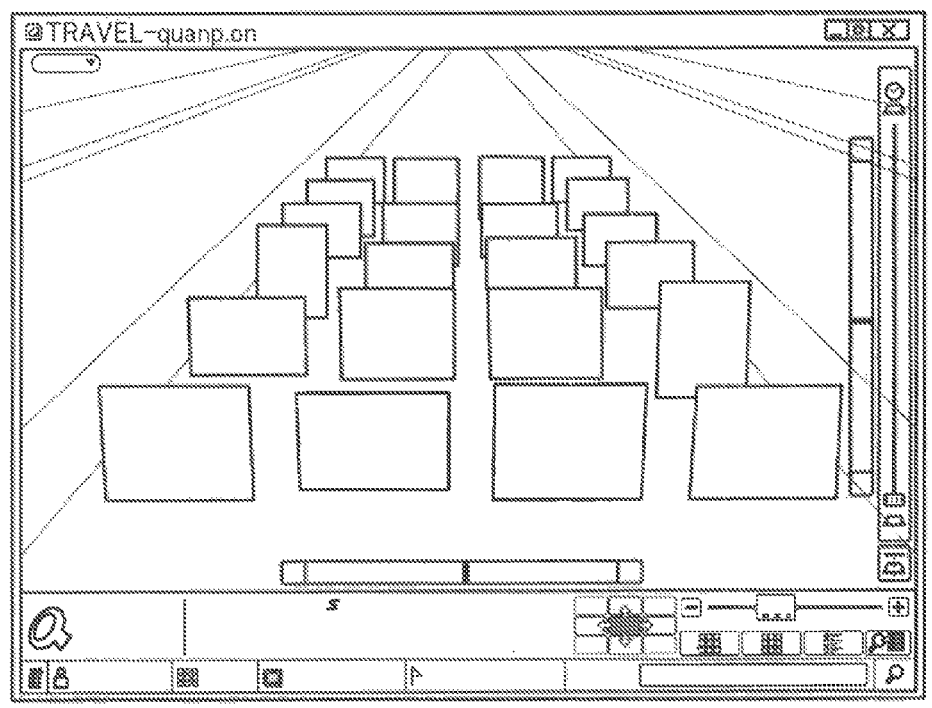
FIG. 26 is a diagram illustrating an example of a place-view display screen in which thumbnail images are displayed in a matrix of four rows and six columns.
Figure 27:
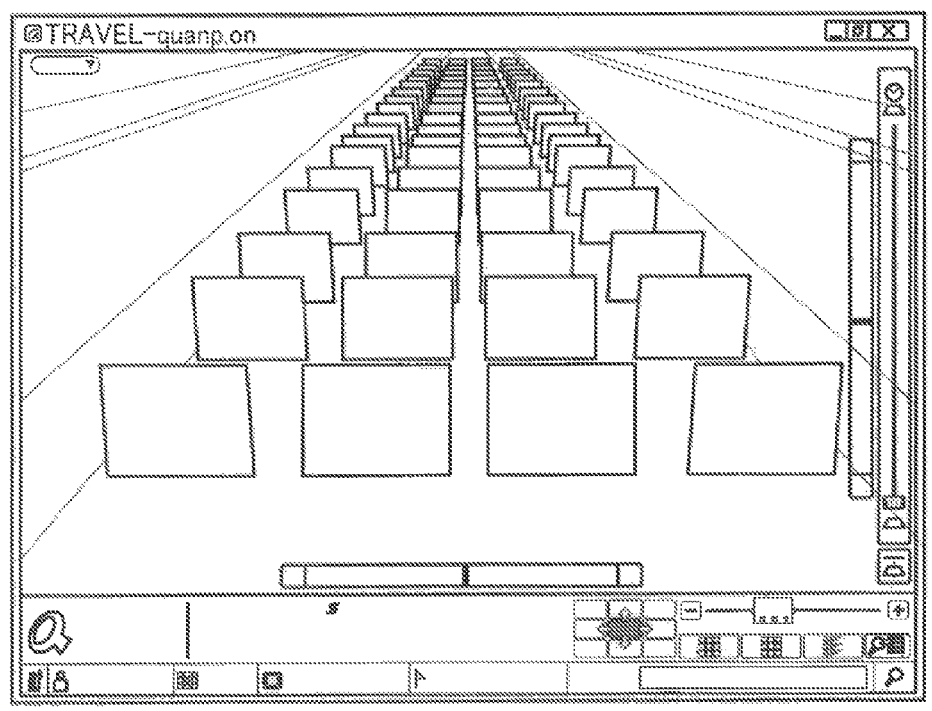
FIG. 27 is a diagram illustrating an example of the place-view display screen in which thumbnail images are displayed in a matrix of four rows and twenty five columns.

FIG. 26 illustrates the place view screen shown in FIG. 25 in which a horizontal position of a viewpoint for displaying the array of the thumbnail images is set to the center in the horizontal direction, similarly to FIG. 24. Further, FIG. 27 illustrates the place view screen shown in FIG. 26 in which the number of the thumbnail images to be displayed is increased in a depth direction of the screen. In the conventional apparatus, only a fixed arrangement with four images in the horizontal direction and six rows in the depth direction is proposed. However, in the present embodiment, the number of rows in the depth direction can be set to an arbitrary value from six rows to twenty-five rows. In this configuration, a size of an image decreases as the image is located farther in the depth direction, while sizes of thumbnail images located in the same row in the same order from the front row are made uniform in both a display arrangement with six rows as shown in FIG. 26 and a display arrangement with twenty-five rows as shown in FIG. 27. Further, in the place view screens shown in FIGS. 26 and 27, when a scroll button of the mouse is rotated while specifying an arbitrary thumbnail image by the mouse pointer, the thumbnail image can be zoomed in (enlarged display) or zoomed out (reduced display).

Figure 29:
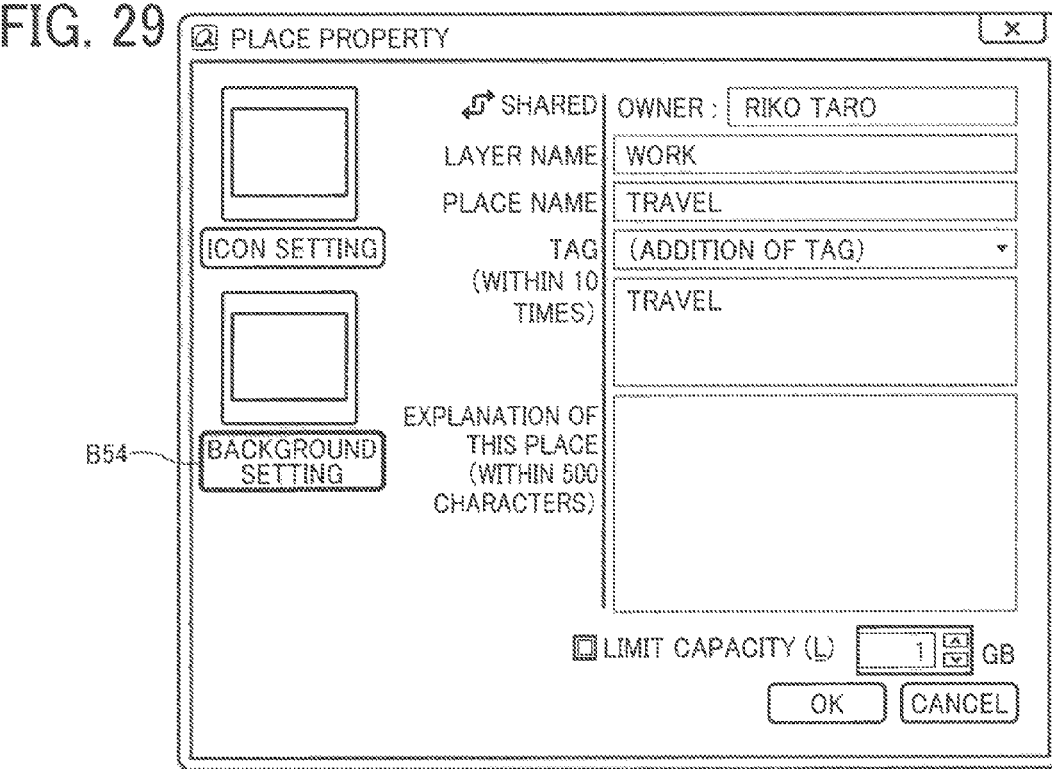
FIG. 29 is a diagram illustrating a screen for displaying property of a place.

FIG. 28 is a diagram illustrating an example of UIHistory.xml as setting information of the place view screens shown in FIGS. 27 to 29. The UIHistory.xml is stored in the storage unit 56. A view setting section 1300 contains a display-row-number setting portion 1301 for thumbnail images. The number of rows to be displayed can be set in a range from six rows to twenty-five rows, and in this example, is set to six rows. A place setting section 1200 contains a place-ID setting portion 1201, a background-image setting portion 1202, a camera-horizontal-directional-angle setting portion 1203, a camera-vertical-directional-angle setting portion 1204, and the like. A file name is set in the place-ID setting portion 1201. The background-image setting portion 1202, the camera-horizontal-directional-angle setting portion 1203, and the camera-vertical-directional-angle setting portion 1204 are set for each placeID, so that correspondence among each of places, a background image, and an angle of a viewpoint of a thumbnail image in both the horizontal direction and the vertical direction can be made with respect to each placeID. A procedure of generating the above-mentioned setting information is described below.

Setting of Background Image

Figure 30:
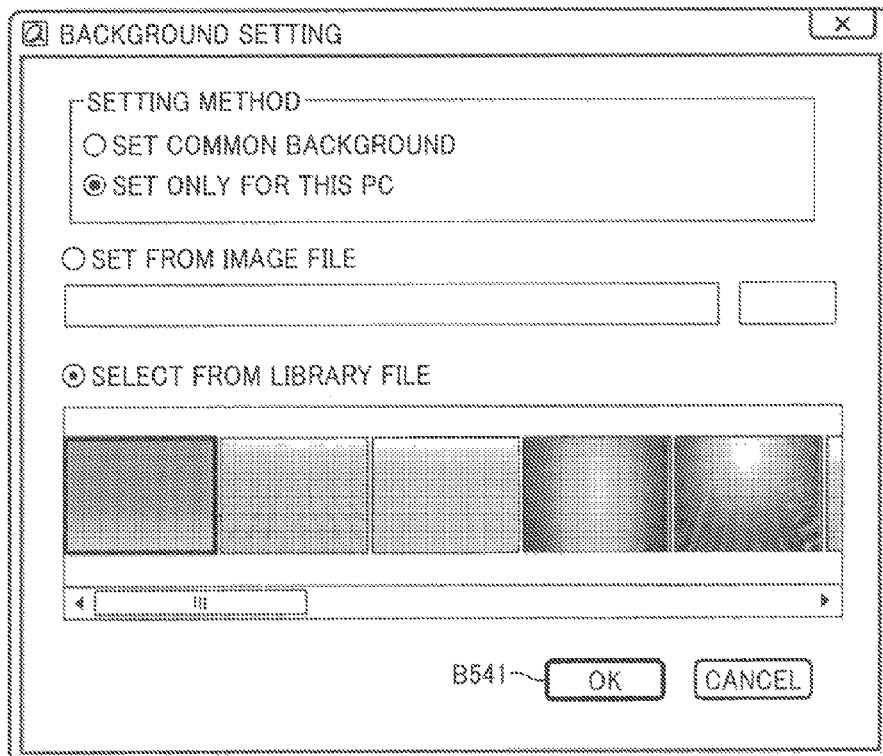
FIG. 30 is a diagram illustrating a screen for setting a background of a place.

FIG. 29 illustrates a screen for displaying property of a place. FIG. 30 illustrates a screen for setting a background of a place, which is displayed when a background setting button 54B shown in FIG. 29 is pressed. The screen shown in FIG. 29 is structured by adding the background setting button B54 to the screen for supporting opening of a new shared place, which is shown in FIG. 16. In the screen for setting the background of the place as shown in FIG. 30, an arbitrary background image is selectable from among background images stored in the storage unit 56 or background images that are prepared in advance. Further, as "a method for setting a background of a place", a user is allowed to select whether the selected background image is employed as a background image to be shared by the share members of the shared place or as a background image to be specific to own personal computer (the client terminal), by using radio buttons.

When a user selects a background image and performs "the method for setting the background of the place" by using the operating unit 54 while looking at the setting screen shown in FIG. 30, and then presses an OK button B541, the setting is completed. The set background information is sent to the display control unit 512. The display control unit 512 stores the background information in the storage unit 56 (the background-image setting portion 1202 of FIG. 28) with respect to each place. When displaying the place view screen, the display control unit 512 acquires the background information, specifies the background image based on the background information, and performs corresponding display on the display unit 55.

Setting of Number of Rows to be Displayed

Figure 31:
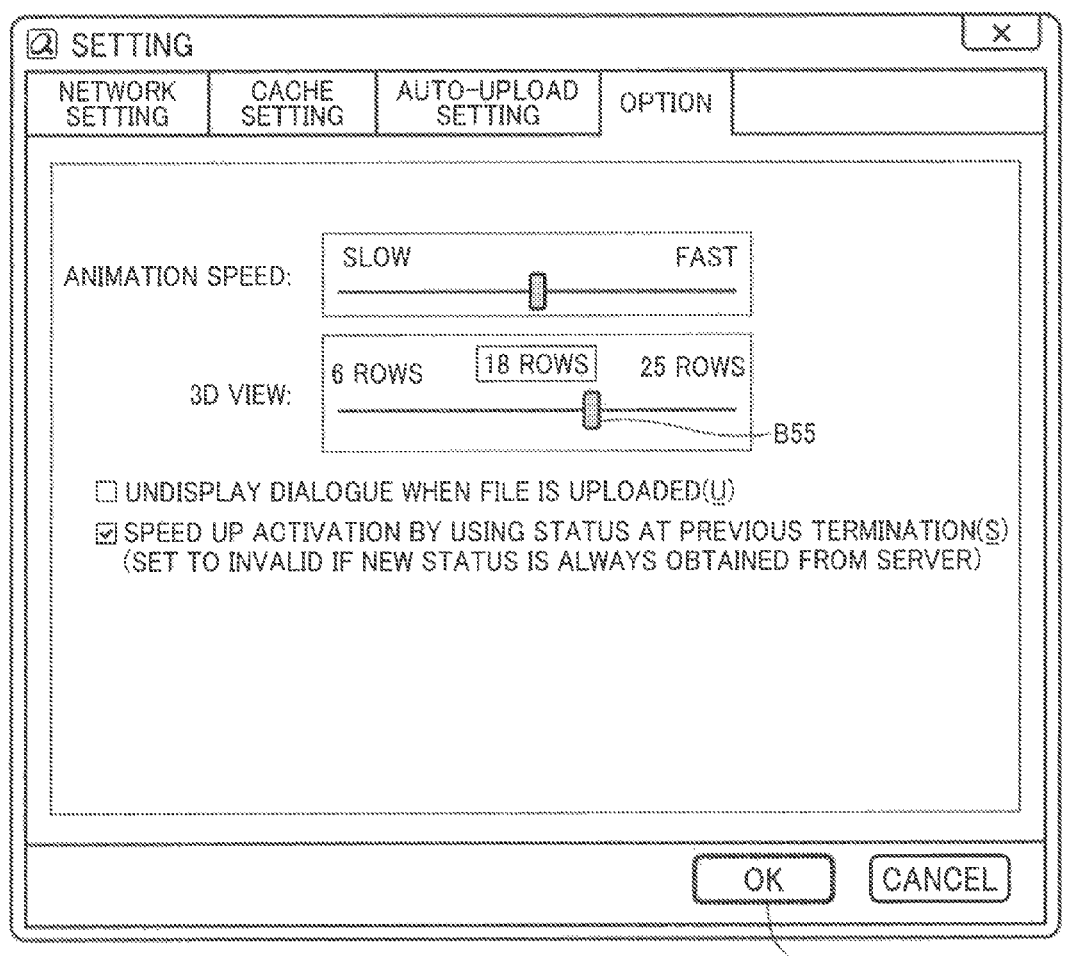
FIG. 31 is a diagram illustrating a screen for setting the maximum number of rows for displaying thumbnail images.

FIG. 31 illustrates a screen for setting the number of rows to be displayed. This screen is displayed when an "option" tag is selected, and the number is selectable by using a slide button B55 in "display row for 3D view" on the screen. When selection is performed and then an OK button B56 is pressed, setting is completed.

When a user sets the number of the rows for displaying thumbnail images in the place view screen by using the operating unit 54 while looking at the setting screen shown in FIG. 31, information abut the number of the rows to be displayed is sent to the display control unit 512. The display control unit 512 stores the information in the storage unit 56 (the setting portion 1301 of FIG. 28). When displaying the place view, the display control unit 512 acquires the information about the number of the rows to be displayed, determines the number of images to be displayed based on the information, and performs corresponding display on the display unit 55.

Setting of Viewpoint Position

As described above, a display angle (viewpoint) can be changed in both the horizontal direction and the vertical direction by operating the cursor C2 in the place view screen shown in FIG. 25. In other words, when a user specifies a display angle (in a longitudinal direction and a transverse direction) by operating the cursor C2 with use of the operating unit 54 while looking at the place view screen, the display unit 55 performs display according to move of the cursor C2. When view is changed from the place view as a result of transfer of a place and the like, the display control unit 512 sends an angle condition to the storage unit 56 (the camera-horizontal-directional-angle setting portion 1203 and the camera-vertical-directional-angle setting portion 1204 of FIG. 28). When displaying the place view screen, the display control unit 512 acquires angle information for displaying a place from the storage unit 56, determines an angle for the display based on the information, and performs corresponding display on the display unit 55.

The display angle is set by an orbit (a transfer pathway) and an orientation of a camera that is arranged to capture thumbnail images shown in FIG. 25 from a front side of each of the thumbnail images. Explanation about parameters for this setting is given below with reference to FIGS. 32A to 35.

Figures 32A, 32B:
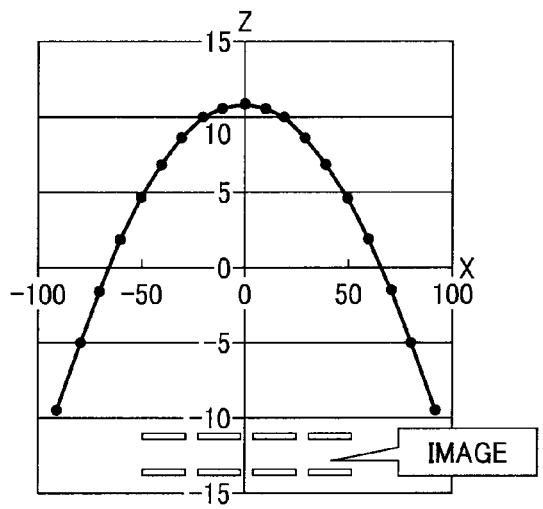
FIG. 32A is a table showing a relationship between a horizontal position of a slider bar and a position of a camera.
FIG. 32B is a graph illustrating an orbit of the camera corresponding to the table shown in FIG. 32A, when the orbit is viewed from directly above.
Figures 33A, 33B:
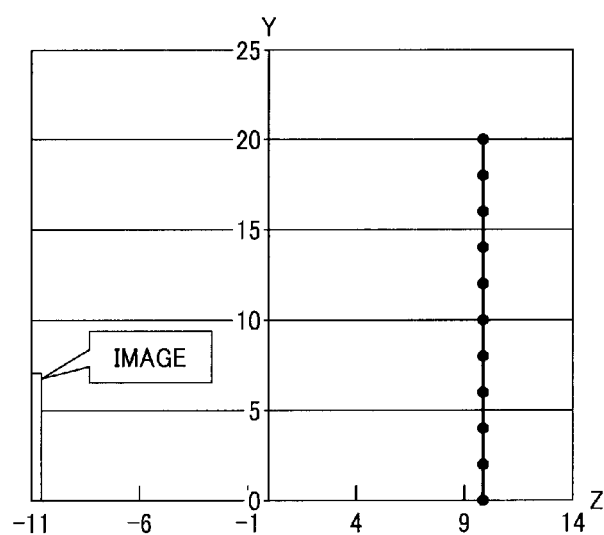

FIG. 32A is a table showing a relationship between a horizontal position of the slider bar (the cursor C2) and a position of the camera. FIG. 32B is a graph illustrating an orbit of the camera corresponding to the table shown in FIG. 32A, when the orbit is viewed from directly above. FIG. 33A is a table showing a relationship between a vertical position of the slider bar (the cursor C2) and a position of the camera. FIG.

Figure 34:
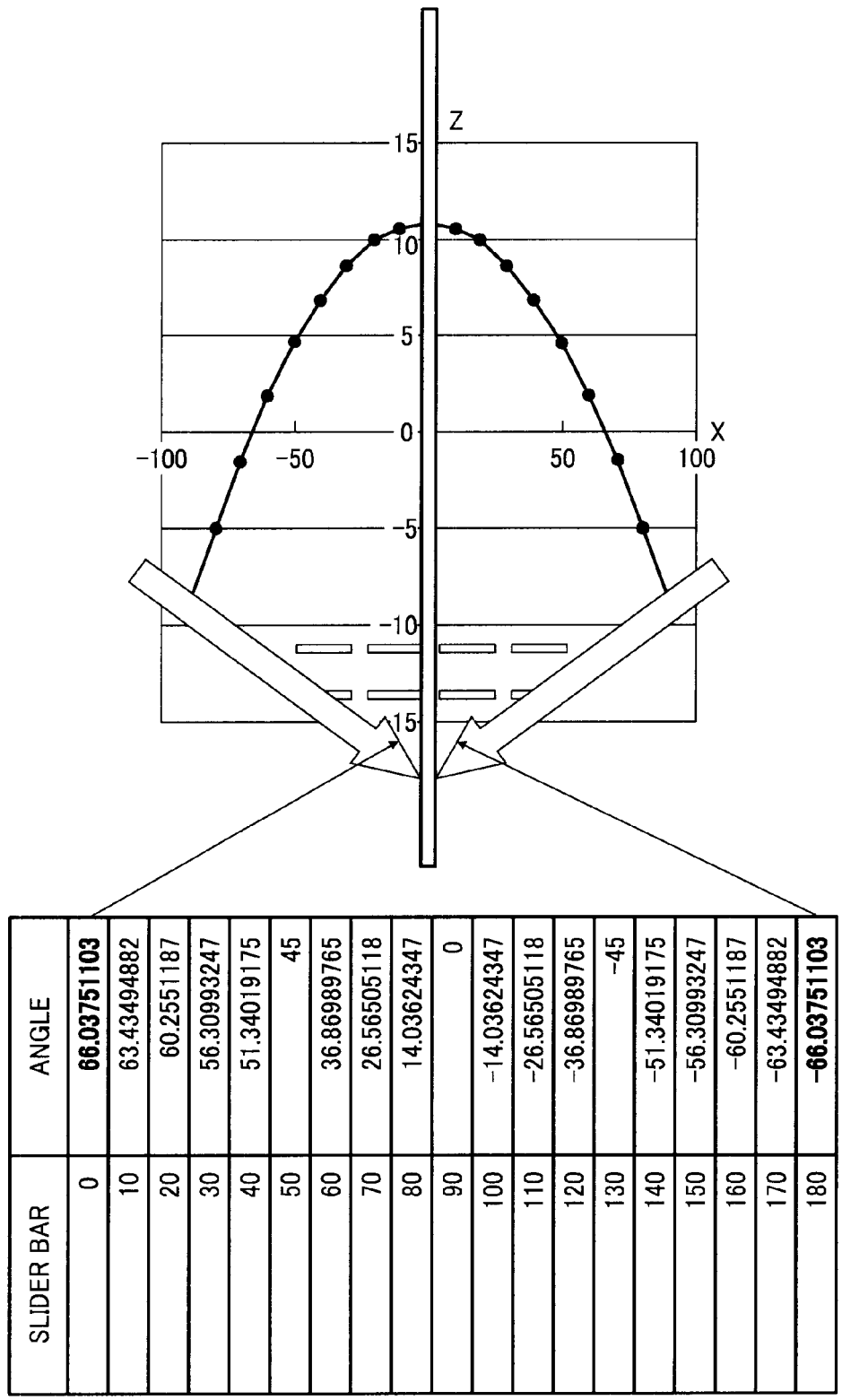
FIG. 34 illustrates a table showing a relationship between the horizontal position of the slider bar and a pan angle of the camera, and a graph illustrating an orbit of the camera corresponding to the table, when the orbit is viewed from directly above.
Figure 35:
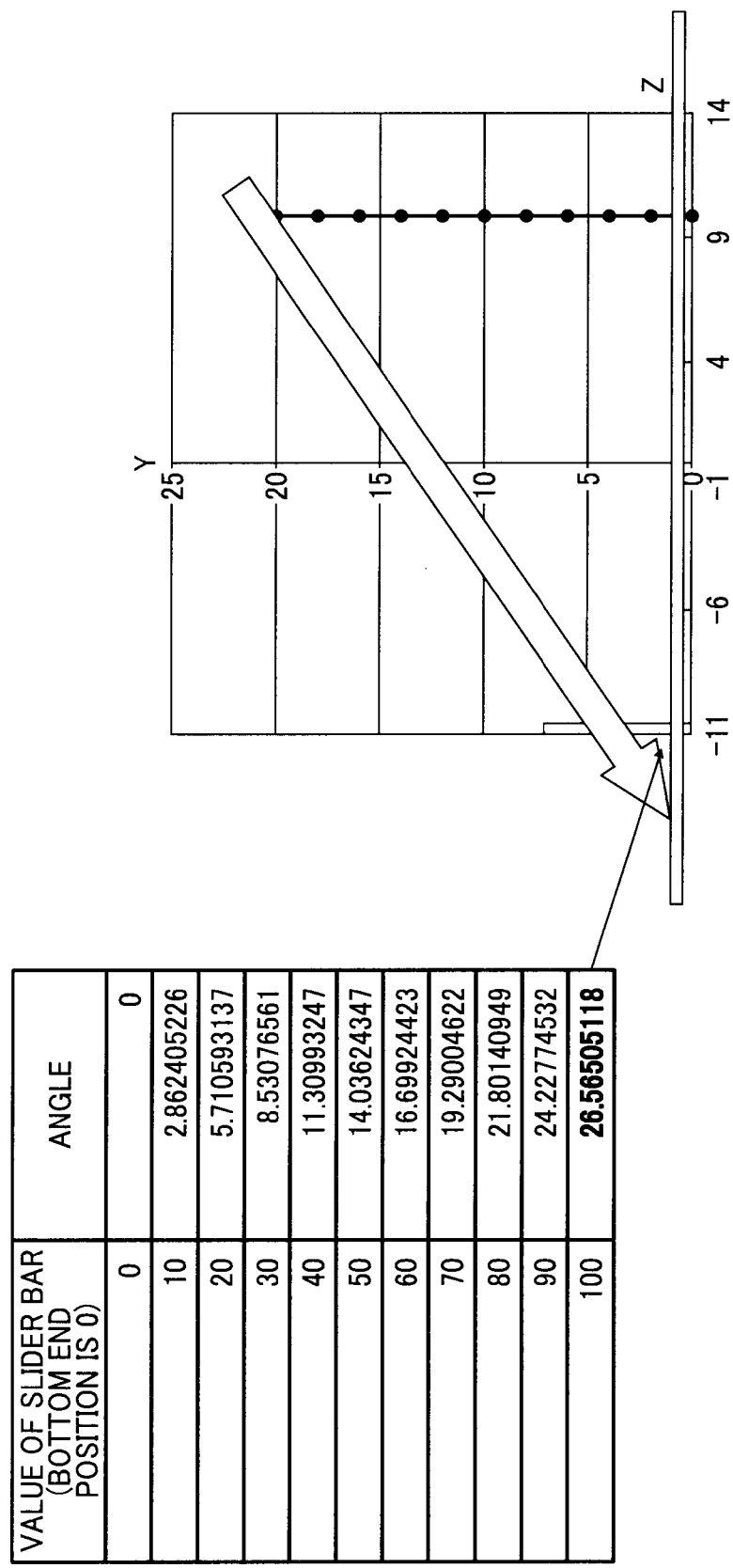

33B is a graph illustrating an orbit of the camera corresponding to the table shown in FIG. 33A, when the orbit is viewed edge-on. FIG. 34 illustrates a table showing a relationship between the horizontal position of the slider bar (the cursor C2) and a pan angle of the camera, and a graph illustrating an orbit of the camera corresponding to the table, when the orbit is viewed from directly above. FIG. 35 illustrates a table showing a relationship between the vertical position of the slider bar (the cursor C2) and a tilt angle of the camera, and a graph illustrating an orbit of the camera corresponding to the table, when the orbit is viewed from edge-on. Here, the X-coordinate represents a horizontal position in the place view screen, the Y-coordinate represents a vertical position in the place view screen, and the Z-coordinate represents a depth position in the place view screen.

As shown in FIG. 32A, a leftmost position of the slider bar is set to 0 and a rightmost position of the slider bar is set to 180 so that the leftmost position of the slider bar becomes such that X=−90, the rightmost position of the slider bar becomes such that X=90, and positions of the slider bar between the leftmost position and the rightmost position linearly correspond to the X-coordinates, respectively. Regarding the Z-coordinate, both ends of the slider bar are set such that Z=−9.25, a center position is set such that Z=11, and positions between the both ends are distributed symmetrically with respect to the center position. The value of the Y-coordinate is fixed. Consequently, as shown in FIG. 32B, the orbit of the camera becomes a quadratic curve that is symmetric with respect to the Z axis. An initial value of the slider bar is set to 90, and at this time, the value of the X-coordinate is 0 and the value of the Z-coordinate is 11. "Images" in an array of four rows and two columns as shown in FIG. 32B respectively indicate positions of the thumbnail images on the first and the second rows shown in FIG. 25, and the thumbnail images on the third and later rows are arranged in the negative coordinate of the Z axis at regular intervals.

When the camera moves along the orbit shown in FIG. 32B, a horizontal angle (a pan angle) of the camera at each position on the orbit becomes as shown in FIG. 34. As illustrated in the graph of the figure, the horizontal angle is set so that the camera can face the Z axis at arbitrary positions on the orbit.

Described above is the horizontal angle, and described next is a vertical angle.

As shown in FIG. 33A, a bottom end position of the slider bar is set to 0 and a top end position of the slider bar is set to 100 so that the bottom end position of the slider bar becomes such that Y=−90, the top end position of the slider bar becomes such that Y=20, and positions of the slider bar between the bottom end position and the top end position linearly correspond to the Y-coordinates, respectively. The value of the X-coordinate and the value of the Y-coordinate are fixed. Consequently, as shown in FIG. 33B, the orbit of the camera becomes a line perpendicular to an X-Z plane. An initial value of the slider bar is set to 50, and at this time, the value of the Y-coordinate is set to 10. An "image" shown in FIG. 33B indicates a position of thumbnail images on the first row shown in FIG. 25, and the thumbnail images on the second and later rows are arranged in the negative coordinate of the Z axis at regular intervals.

When the camera moves along the orbit shown in FIG. 33B, a vertical angle (a tilt angle) of the camera at each position on the orbit becomes as shown in FIG. 35. As illustrated in the graph of the figure, the vertical angle is set so that the camera can face the X axis at arbitrary positions on the orbit.

Returning to the explanation of FIG. 22, at Step S183, when the display control unit 512 determines that the change of the display mode is not instructed (No at Step S183), the setting-change receiving unit 513 determines whether registration of a file in the place as the display object for which the place view screen is displayed is instructed (Step S184). When it is determined that the registration of a file is not instructed (No at Step S184), process control proceeds to Step S188.

On the other hand, at Step S184, when determining that the registration of a file is instructed (Yes at Step S184), the setting-change receiving unit 513 displays the screen for supporting registration of a file on the display unit 55 and waits for reception of input from a user (Step S185).

Figure 36:
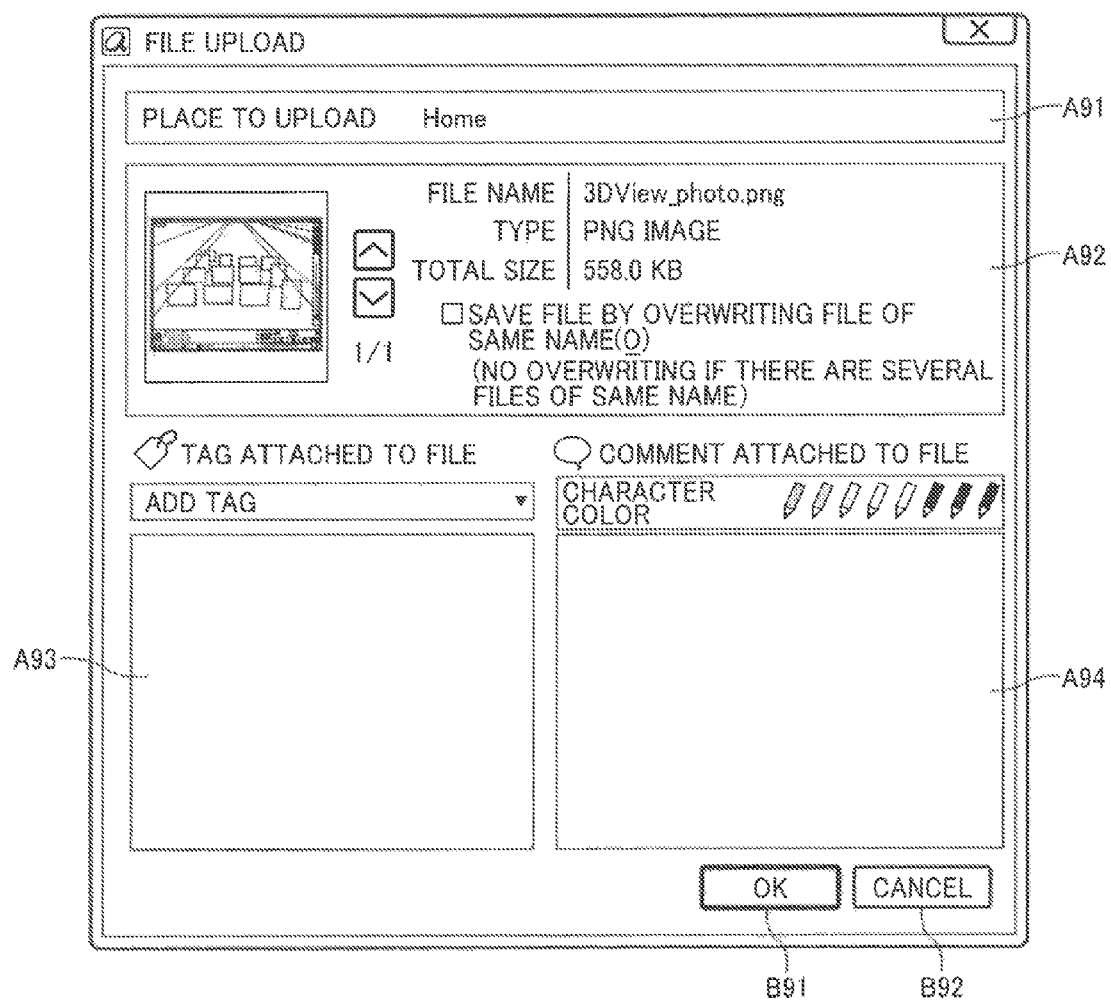
FIG. 36 is a diagram illustrating an example of a screen for supporting registration of a file.

FIG. 36 is a diagram illustrating an example of the screen for supporting registration of a file, which is displayed at Step S185. In the figure, an area A91 is an area for displaying a place name in which a file is to be registered. The setting-change receiving unit 513 displays a place name of a place in which a file is to be registered in the area A91. When registration of a file is instructed via the place view screen, a place currently displayed in the place view screen becomes a destination in which the file is to be registered, so that this place is treated as a registration destination of the file.

An area A92 is an area for displaying information about the file as a registration object. The setting-change receiving unit 513 displays information such as a file name, a file type, and a file size of the file that is specified as the registration object in the area A92.

An area A93 is an area for entering an attribute to be appended to the file as the registration object, and in which a user is allowed to enter any arbitrary character string as an attribute of a file (hereinafter, referred to as "a file attribute"). An area A94 is an area for entering a comment for the file as the registration object, and in which a user is allowed to enter any arbitrary character string as a comment for the file.

A button B91 is a button for instructing registration (upload) of a file. Upon receiving a command indicating that the button B91 is pressed, the setting-change receiving unit 513 sends the information displayed and entered in the areas A91 to A94 and a file registration request containing a file as the registration object and a user ID of a user who is operating the client terminal 500, to the file management server 400. A button B92 is a button for instructing to cancel the registration of a file. Upon receiving a command indicating that the button B92 is pressed, the setting-change receiving unit 513 closes the screen shown in FIG. 36, which is displayed on the display unit 55.

At Step S186 of FIG. 22, upon receiving an instruction to register a file from a user via the screen displayed at Step S185, the setting-change receiving unit 513 sends the above-mentioned file registration request to the file management server 400 (Step S186). When the file registration request is sent, it is possible to display a screen for notifying an upload status of the file on the display unit 55.

After Step S186, upon receiving the setting information about the place in which the file has been registered from the file management server 400 as a response to the file registration request, the display control unit 512 updates the setting information stored in the RAM 53 or the storage unit 56 (Step S187). Upon receiving information indicating that operation is not authorized, which will be described later, the display control unit 512 displays information indicating this fact on the display unit 55.

When determining that deletion of a file (a thumbnail image) displayed on the place view screen is instructed (No at Step S184→Yes at Step S188), the setting-change receiving unit 513 sends a file deletion request containing a folder name (contentsID) of a folder in which the thumbnail image to be deleted is stored, a place name of a place containing the folder, and a user ID of a user who is currently logging in, to the file management server 400 (Step S189).

After Step S189, upon receiving from the file management server 400 the setting information about the place from which the file has been deleted as a response to the file deletion request, the display control unit 512 updates the setting information stored in the RAM 53 or the storage unit 56 (Step S190), and process control returns to Step S182. Upon receiving information indicating that operation is not permitted, which will be described later, the display control unit 512 displays this information on the display unit 55.

When it is determined that the deletion of a file is not instructed (No at Step S188), process control returns to Step S182.

In the file management server 400, upon receiving the file registration request or the file deletion request (Step S201), the setting changing unit 413 refers to a member list corresponding to the place as an operation object for this request to determine whether the place is the shared place (Step S202). When it is determined that the place is not the shared place (No at Step S202), process control directly proceeds to Step S205.

At Step S202, when determining that the place is the shared place (Yes at Step S202), the setting changing unit 413 determines whether an access authority of the user ID contained in the request received at Step S201 is a reader (only read is permitted) (Step S203). When determining that the access authority is the reader (Yes at Step S203), the setting changing unit 413 sends information indicating that operation on the file is not permitted to the client terminal 500 that has sent the file registration request or the file deletion request (Step S204), and process control ends.

At Step S203, when determining that the access authority is an editor (read and write are permitted) (No at Step S203), the setting changing unit 413 identifies whether the request received at Step S201 is the file registration request or the file deletion request (Step S205). When identifying that the request is the file registration request (Yes at Step S205), the setting changing unit 413 performs a file registration process (Step S206).

Figure 37:
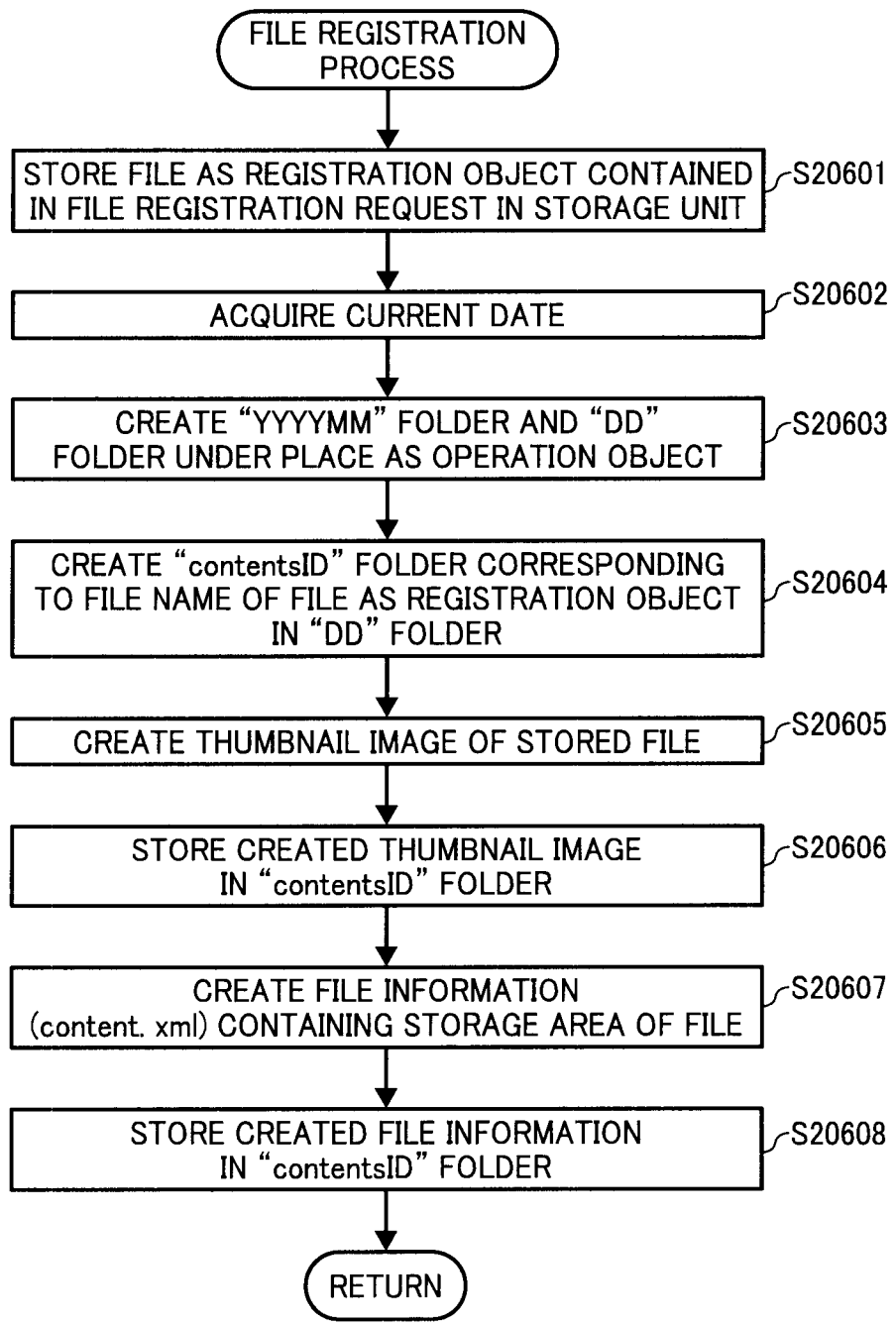
FIG. 37 is a flowchart of a procedure of a file registration process.

FIG. 37 is a flowchart of a procedure of the file registration process. The setting changing unit 413 stores the file as the registration object contained in the file registration request, in a predetermined area in the storage unit 46 (Step S20601). The area where the file is stored can be an arbitrary area. For example, the file can be stored and managed in database, or can be stored in an external storage device other than the storage unit 46.

Then, the setting changing unit 413 acquires a current date from a counting unit (not shown) that counts a date and a time (Step S20602), and creates a "YYYYMM" folder and a "DD" folder corresponding to the current date in a predetermined structure under a place as the operation object (Step S20603). When the "YYYYMM" folder and the "DD" folder corresponding to the current date are already created, this process is omitted.

Then, the setting changing unit 413 creates a "contentsID" folder corresponding to a file name of the file as the registration object under the "DD" folder created at Step S20603 (Step S20604). The setting changing unit 413 creates a thumbnail image from the file created at Step S20601 (Step S20605), and stores the created thumbnail image in the "contentsID" folder created at Step S20604 (Step S20606).

Then, the setting changing unit 413 creates file information (content.xml) containing various types of information (e.g., user ID and information about the file) contained in the file registration information, information about the storage area of the file stored at Step S20601, and the like (Step S20607). When the file stored at Step S20601 is a document file, the setting changing unit 413 creates a summary representing a brief description of the document file by analyzing contexts or phrases in the file, and stores the summary in the file information. The analysis of the contexts or phrases can be performed by using commonly-known techniques.

The setting changing unit 413 then stores the file information created at Step S20607 in the "contentsID" folder created at Step S20604 (Step S20608), and process control proceeds to Step S208 of FIG. 22.

Returning to the explanation of FIG. 22, at Step S205, when determining that the request is the file deletion request (No at Step S205), the setting changing unit 413 performs a file deletion process based on the file deletion request (Step S207).

Figure 38:
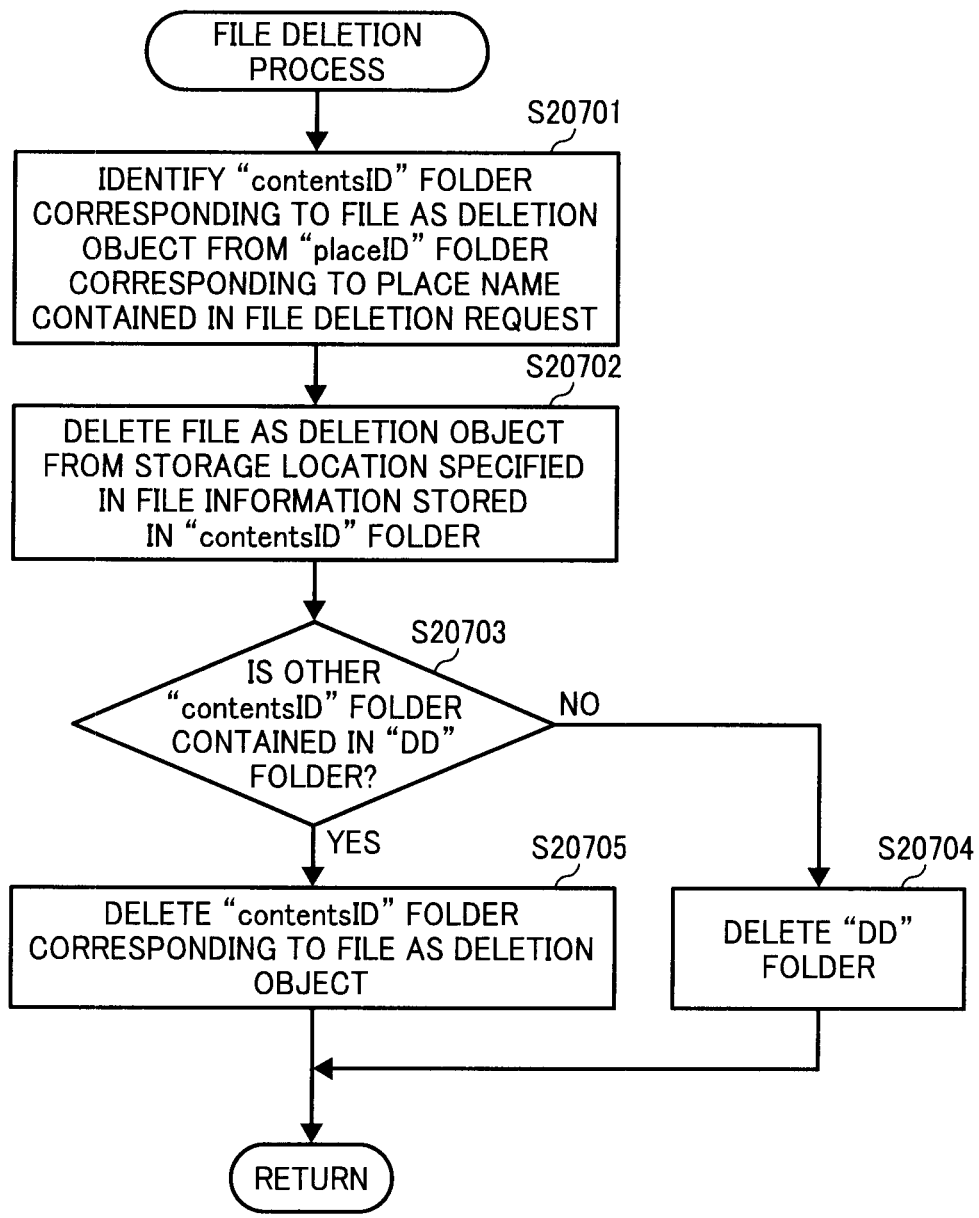
FIG. 38 is a flowchart of a procedure of a file deletion process.

FIG. 38 is a flowchart of a procedure of the file deletion process performed at Step S207. The setting changing unit 413 identifies a "contentsID" folder corresponding to a file name of a file as a deletion object from the "placeID" folder corresponding to the place name contained in the file deletion request (Step S20701).

The setting changing unit 413 refers to the file information stored in the "contentsID" folder identified at Step S20701, and deletes a file as the deletion object from a storage location specified in the file information (Step S20702).

Then, the setting changing unit 413 determines whether other "contentsID" folder is contained in the "DD" folder that contains the "contentsID" folder identified at Step S20701 (Step S20703). When determining that other "contentsID" folder is not contained (No at Step S20703), the setting changing unit 413 deletes the "DD" folder itself (Step S20704), and process control proceeds to Step S208 of FIG. 22.

At Step S20703, when determining that other "contentsID" folder is contained in the "DD" folder (Yes at Step S20703), the setting changing unit 413 deletes only the "contentsID" folder identified at Step S20701 (Step S20705), and process control proceeds to Step S208 of FIG. 22.

As shown in FIG. 22, the setting changing unit 413 sends the setting information updated at Step S206 or S207 to the client terminal 500 that has sent the file registration request or the file deletion request (Step S208), and process control ends. In the client terminal 500, the setting information is updated at Step S190, and then the updated place view screen is displayed on the display unit 55.

In this manner, the file management apparatus of the present embodiment displays place names and icons of adjacent place images displayed in a matrix form when displaying thumbnail images of respective files managed by each place image. Therefore, a user can recognize a relationship between adjacent units for managing files while viewing the thumbnail images, and can thereby more effectively manage files.

Furthermore, the file management apparatus of the present embodiment displays a background image set for each place image when displaying the thumbnail images of files managed by each place image. Therefore, a user can intuitively recognize that the units for managing files are switched from one to the other.

Moreover, the number of the thumbnail images to be displayed at once can be increased and the viewpoint position (the angle of the camera) can be changed when the thumbnail images of files managed by each place image are displayed, so that listing capability can be enhanced, enabling to effectively search for a file.

In the present embodiment described above, the present invention is applied to a client and server system; however, the present invention can be applied to a stand-alone system.

According to one embodiment of the file management apparatus and the file management method of the present invention, when a command for selecting a specific symbol image displayed on the display unit is input, a thumbnail image corresponding to the selected symbol image is displayed on the display unit and information representing a symbol image arranged adjacent to the selected symbol image is also displayed at a position adjacent to the thumbnail image being displayed.

Furthermore, according to another embodiment of the file management apparatus and the file management method, a background image of a thumbnail image is set in association with a symbol image, and, when a command for selecting a specific symbol image displayed on the display unit is input, a thumbnail image corresponding to the selected symbol image is displayed on the display unit together with the set background image.

Furthermore, according to still another embodiment of the file management apparatus and the file management method of the present invention, the maximum number of thumbnail images to be arranged is set, and, when a command for selecting a specific symbol image displayed on the display unit is input, thumbnail images corresponding to the selected symbol image are displayed in rows of up to the set maximum number on the displayed unit.

Moreover, according to still another embodiment of the file management apparatus and the file management method, when a command for selecting a specific symbol image displayed on the display unit is input, a thumbnail image corresponding to the selected symbol image is displayed three-dimensionally on the display unit, and, when the display angle of the thumbnail image being displayed is set, the thumbnail image is displayed at the set display angle.

According to the present invention, a plurality of symbol images, each of which serves as a unit for managing files, is displayed in a matrix form on the display unit, and, when a command for selecting one symbol image from among the displayed symbol images is issued, thumbnail images of respective files registered in association with the selected symbol image are displayed on the display unit in a manner that allows a user to intuitively recognize the unit for managing files and a relationship between the units for managing files.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A file management apparatus comprising:
a storage device that stores therein pieces of file management information, each of which serves as a unit for managing files, and files managed by each piece of the file management information, in an associated manner, the pieces of the file management information being information of a display layout configuration customized for each of a plurality of users, the display layout configuration including a predefined hierarchy of layers and different categories of the files corresponding to each of the layers;
a first display control unit that displays respective symbol images of the files in a matrix form on a display unit in accordance with the display layout configuration;
a receiving unit that receives information corresponding to an operation performed by a user;
a second display control unit that displays, upon receiving a command for selecting one symbol image from among the symbol images displayed on the display unit, thumbnail images of respective files that are stored in association with a piece of the file management information that is corresponding to the selected symbol image, on the display unit;
a third display control unit that displays information at a position adjacent to the thumbnail images being displayed on the display unit, wherein the information indicates a symbol image arranged adjacent to a symbol image corresponding to the thumbnail images being displayed among the symbol images displayed by the first display control unit; and
a background setting unit that stores, upon reception of setting information of a background image of a screen for displaying the thumbnail images, the setting information in association with a corresponding symbol image, and, when a symbol image corresponds to a file that is shared by the plurality of users, the background setting unit sets a background image selected by a user, the background image being identified as one of a shared background image and a user background image, and, in response to the background image being identified as the shared background image, the shared background image being set as a same background image for the plurality of users, wherein
the second display control unit displays the thumbnail images in a three-dimensional manner, and
the second display control unit displays images in a plurality of lanes in a three-dimensional manner, and arranges the thumbnail images on a lane displayed in the center on the display unit.

2. The file management apparatus according to claim 1, wherein
the information that indicates the symbol image corresponds to an icon and a name of the symbol image.

3. The file management apparatus according to claim 1, wherein
the third display control unit operates as a result of reception of a command for specifying a position adjacent to the thumbnail images being displayed on the display unit.

4. A file management apparatus comprising:
a storage device that stores therein pieces of file management information, each of which serves as a unit for managing files, and files managed by each piece of the file management information, in an associated manner, the pieces of the file management information being information of a display layout configuration customized for each of a plurality of users, the display layout configuration including a predefined hierarchy of layers and different categories of the files corresponding to each of the layers;
a first display control unit that displays respective symbol images of the files in a matrix form on a display unit in accordance with the display layout configuration;
a receiving unit that receives information corresponding to an operation performed by a user;
a second display control unit that displays, upon receiving a command for selecting one symbol image from among the symbol images displayed on the display unit, thumbnail images of respective files that are stored in association with a piece of the file management information that is corresponding to the selected symbol image, on the display unit; and a background setting unit that stores, upon reception of setting information of a background image of a screen for displaying the thumbnail images, the setting information in association with a corresponding symbol image, and, when a symbol image corresponds to a file that is shared by the plurality of users, the background setting unit sets a background image selected by a user, the background image being identified as one of a shared background image and a user background image, and, in response to the background image being identified as the shared background image, the shared background image being set as a same background image for the plurality of users, wherein the second display control unit displays the thumbnail images in a three-dimensional manner, and the second display control unit displays images in a plurality of lanes in a three-dimensional manner, and arranges the thumbnail images on a lane displayed in the center on the display unit.

5. A file management apparatus comprising:

a storage device that stores therein pieces of file management information, each of which serves as a unit for managing files, and files managed by each piece of the file management information, in an associated manner, the pieces of the file management information being information of a display layout configuration customized for each of a plurality of users, the display layout configuration including a predefined hierarchy of layers and different categories of the files corresponding to each of the layers;

a first display control unit that displays respective symbol images of the files in a matrix form on a display unit in accordance with the display layout configuration;

a receiving unit that receives information corresponding to an operation performed by a user;

a second display control unit that displays, upon receiving a command for selecting one symbol image from among the symbol images displayed on the display unit, thumbnail images of respective files that are stored in association with a piece of the file management information that is corresponding to the selected symbol image, on the display unit;

a thumbnail-image-display-number setting unit that stores, upon reception of setting information about maximum number of thumbnail images to be displayed on the display unit, the setting information; and a background setting unit that stores, upon reception of setting information of a background image of a screen for displaying the thumbnail images, the setting information in association with a corresponding symbol image, and, when a symbol image corresponds to a file that is shared by the plurality of users, the background setting unit sets a background image selected by a user, the background image being identified as one of a shared background image and a user background image, and, in response to the background image being identified as the shared background image, the shared background image being set as a same background image for the plurality of users, wherein the second display control unit displays the thumbnail images in a three-dimensional manner, and the second display control unit displays images in a plurality of lanes in a three-dimensional manner, and arranges the thumbnail images on a lane displayed in the center on the display unit.

* * * * *